(12) United States Patent
Caswell et al.

(10) Patent No.: US 7,542,555 B2
(45) Date of Patent: Jun. 2, 2009

(54) COMPUTER-BASED MULTIFUNCTIONAL PERSONAL COMMUNICATION SYSTEM WITH CALLER ID

(75) Inventors: Ty J. Caswell, Big Lake, MN (US); Jeffrey P. Davis, Ham Lake, MN (US); Gregory R. Johnson, New Brighton, MN (US); Timothy J. Reinarts, Ramsey, MN (US); Ting Sun, Minneapolis, MN (US)

(73) Assignee: Multi-Tech Systems, Inc., Moundsview, MN (US)

( * ) Notice: Subject to any disclaimer, the term of this patent is extended or adjusted under 35 U.S.C. 154(b) by 726 days.

(21) Appl. No.: 11/339,256

(22) Filed: Jan. 25, 2006

(65) Prior Publication Data

US 2006/0153176 A1 Jul. 13, 2006

Related U.S. Application Data

(63) Continuation of application No. 09/400,607, filed on Sep. 20, 1999, now abandoned, which is a continuation of application No. 08/338,340, filed on Nov. 10, 1994, now Pat. No. 6,009,082, which is a continuation-in-part of application No. 08/002,467, filed on Jan. 8, 1993, now Pat. No. 5,452,289.

(51) Int. Cl.
 *H04M 11/00* (2006.01)
 *H04B 1/38* (2006.01)

(52) U.S. Cl. .............. 379/93.02; 379/142.15; 379/90.01

(58) Field of Classification Search .............. 379/93.02, 379/93.05, 93.06, 90.09, 142.02–142.15, 379/93.17, 93.23, 93.18; 370/270, 204, 280, 370/281, 295, 296; 375/345, 222, 265

See application file for complete search history.

(56) References Cited

U.S. PATENT DOCUMENTS

| | | | |
|---|---|---|---|
| 3,304,372 A | 2/1967 | Filipowsky et al. |
| 3,789,165 A | 1/1974 | Campanella et al. |
| 3,904,830 A | 9/1975 | Every, Sr. et al. |
| 3,973,081 A | 8/1976 | Hutchins |

(Continued)

FOREIGN PATENT DOCUMENTS

CA 2104701 7/1994

(Continued)

OTHER PUBLICATIONS

"1983 Index, IEEE Journal on Selected Areas in Communications vol. SAC-1", pp. 1-13 (1983).
"A history of video conferencing (VC) technology", 2 pages (date unknown).
"A Family of 2-Wire, Duplex Modems Operating at Data Signalling Rates", *CCITT*, V. 32, Facsimile Recommendation (1988).
"Applications of the MT8841 Calling Number Identification Circuit", *Mitel Microelectronics Digital/Analog Communications Handbook*, Doc. No. 9161-001-060-NA, Issue 1, pp. 12-307 (1993).

(Continued)

*Primary Examiner*—Melur Ramakrishnaiah
(74) *Attorney, Agent, or Firm*—Mueting Raasch & Gebhardt, P.A.

(57) ABSTRACT

An interface for personal communications systems is described which provides rapid identification of a caller and limited access based on a variety of parameters obtained from caller identification information encoded by the telephone company. The incoming telephone call information is compared to a preprogrammed access matrix to determine if the caller is authorized to access the personal communications system connected to the interface. A telephone call screening method and apparatus which incorporates the encoded caller identification is also described.

10 Claims, 33 Drawing Sheets

U.S. PATENT DOCUMENTS

| | | |
|---|---|---|
| 3,973,089 A | 8/1976 | Puckette |
| 3,997,732 A | 12/1976 | Every, Sr. et al. |
| 4,040,014 A | 8/1977 | Gehrking |
| 4,045,774 A | 8/1977 | Morrison |
| 4,059,731 A | 11/1977 | Green et al. |
| 4,059,800 A | 11/1977 | Jones, Jr. |
| 4,074,081 A | 2/1978 | Humm |
| 4,100,377 A | 7/1978 | Flanagan |
| 4,107,471 A | 8/1978 | Reed |
| 4,124,773 A | 11/1978 | Elkins |
| 4,178,480 A | 12/1979 | Carbrey |
| 4,205,201 A | 5/1980 | Kahn |
| 4,205,202 A | 5/1980 | Kahn |
| 4,216,354 A | 8/1980 | Esteban et al. |
| 4,284,850 A | 8/1981 | Chingelpeel |
| 4,310,721 A | 1/1982 | Manley et al. |
| 4,320,265 A | 3/1982 | Biggiogera et al. |
| 4,354,273 A | 10/1982 | Araseki et al. |
| 4,363,122 A | 12/1982 | Black et al. |
| 4,377,860 A | 3/1983 | Godbole |
| 4,403,322 A | 9/1983 | Kato |
| 4,425,512 A | 1/1984 | Tomooka et al. |
| 4,425,625 A | 1/1984 | Seligman et al. |
| 4,425,661 A | 1/1984 | Moses et al. |
| 4,445,213 A | 4/1984 | Baugh et al. |
| 4,447,675 A | 5/1984 | Arntsen et al. |
| 4,450,554 A | 5/1984 | Steensma et al. |
| 4,455,649 A | 6/1984 | Esteban et al. |
| 4,476,559 A | 10/1984 | Brolin et al. |
| 4,479,195 A | 10/1984 | Herr et al. |
| 4,479,213 A | 10/1984 | Galand et al. |
| 4,491,945 A | 1/1985 | Turner |
| 4,494,230 A | 1/1985 | Turner |
| 4,495,620 A | 1/1985 | Steele et al. |
| 4,500,987 A | 2/1985 | Hasegawa |
| 4,503,288 A | 3/1985 | Kessler |
| 4,503,533 A | 3/1985 | Tobagi et al. |
| 4,523,055 A | 6/1985 | Hohl et al. |
| 4,524,244 A | 6/1985 | Faggin et al. |
| 4,528,425 A | 7/1985 | Melindo et al. |
| 4,528,659 A | 7/1985 | Jones, Jr. |
| 4,531,023 A | 7/1985 | Levine |
| 4,532,495 A | 7/1985 | Gagnon |
| 4,533,948 A | 8/1985 | McNamara et al. |
| 4,534,024 A | 8/1985 | Maxemchuk et al. |
| 4,535,448 A | 8/1985 | Baxter et al. |
| 4,546,212 A | 10/1985 | Crowder, Sr. |
| 4,549,290 A | 10/1985 | Bell |
| 4,549,308 A | 10/1985 | LoPinto |
| 4,555,599 A | 11/1985 | Hackett-Jones et al. |
| 4,555,805 A | 11/1985 | Talbot |
| 4,578,537 A | 3/1986 | Faggin et al. |
| 4,581,735 A | 4/1986 | Flamm et al. |
| 4,587,651 A | 5/1986 | Nelson et al. |
| 4,589,107 A | 5/1986 | Middleton et al. |
| 4,593,389 A | 6/1986 | Wurzburg et al. |
| 4,597,101 A | 6/1986 | Kishimoto et al. |
| 4,598,397 A | 7/1986 | Nelson et al. |
| 4,609,788 A | 9/1986 | Miller et al. |
| 4,610,022 A | 9/1986 | Kitayama et al. |
| 4,611,323 A | 9/1986 | Hessenmiller |
| 4,611,342 A | 9/1986 | Miller et al. |
| 4,622,680 A | 11/1986 | Zinser |
| 4,625,081 A | 11/1986 | Lotito et al. |
| 4,629,829 A | 12/1986 | Puhl et al. |
| 4,630,262 A | 12/1986 | Callens et al. |
| 4,631,746 A | 12/1986 | Bergeron et al. |
| 4,644,561 A | 2/1987 | Paneth et al. |
| 4,652,703 A | 3/1987 | Lu et al. |
| 4,653,086 A | 3/1987 | Laube |
| 4,660,194 A | 4/1987 | Larson et al. |
| 4,660,218 A | 4/1987 | Hashimoto |
| 4,665,514 A | 5/1987 | Ching et al. |
| 4,670,874 A | 6/1987 | Sato et al. |
| 4,679,190 A | 7/1987 | Dias et al. |
| 4,697,281 A | 9/1987 | O'Sullivan |
| 4,698,803 A | 10/1987 | Haselton et al. |
| 4,700,341 A | 10/1987 | Huang |
| 4,707,831 A | 11/1987 | Weir et al. |
| 4,716,585 A | 12/1987 | Tompkins et al. |
| 4,718,057 A | 1/1988 | Venkitakrishnan et al. |
| 4,718,082 A | 1/1988 | Parker et al. |
| 4,723,238 A | 2/1988 | Isreal et al. |
| 4,725,977 A | 2/1988 | Izumi et al. |
| 4,730,311 A | 3/1988 | Carse et al. |
| 4,740,963 A | 4/1988 | Eckley |
| 4,750,169 A | 6/1988 | Carse et al. |
| 4,751,510 A | 6/1988 | Desaint Michel et al. |
| 4,751,736 A | 6/1988 | Gupta et al. |
| 4,757,497 A | 7/1988 | Beierle et al. |
| 4,757,527 A | 7/1988 | Beniston et al. |
| 4,761,646 A | 8/1988 | Choquet et al. |
| 4,764,955 A | 8/1988 | Galand et al. |
| 4,769,833 A | 9/1988 | Farleigh et al. |
| 4,771,425 A | 9/1988 | Baran et al. |
| 4,782,485 A | 11/1988 | Gollub |
| 4,782,515 A | 11/1988 | Phillips, et al. |
| 4,785,472 A | 11/1988 | Shapiro |
| 4,792,945 A | 12/1988 | Mark |
| 4,794,595 A | 12/1988 | Ohyama |
| 4,797,878 A | 1/1989 | Armstrong |
| 4,802,221 A | 1/1989 | Jibbe |
| 4,807,250 A | 2/1989 | Tanaka |
| 4,809,271 A | 2/1989 | Kondo et al. |
| 4,813,040 A | 3/1989 | Futato |
| 4,817,089 A | 3/1989 | Paneth et al. |
| 4,819,228 A | 4/1989 | Baran et al. |
| 4,821,312 A | 4/1989 | Horton et al. |
| 4,827,085 A | 5/1989 | Yaniv et al. |
| 4,833,673 A | 5/1989 | Chao et al. |
| 4,835,765 A | 5/1989 | Bergmans et al. |
| 4,839,802 A | 6/1989 | Wonak et al. |
| 4,839,906 A | 6/1989 | Leveque et al. |
| 4,845,746 A | 7/1989 | Li |
| 4,847,677 A | 7/1989 | Music et al. |
| 4,847,829 A | 7/1989 | Tompkins et al. |
| 4,847,900 A | 7/1989 | Wakim |
| 4,862,449 A | 8/1989 | Hoefkens et al. |
| 4,864,559 A | 9/1989 | Perlman |
| 4,866,704 A | 9/1989 | Bergman |
| 4,866,732 A | 9/1989 | Carey et al. |
| 4,872,160 A | 10/1989 | Hemmady et al. |
| 4,873,715 A | 10/1989 | Shibata |
| 4,887,265 A | 12/1989 | Felix |
| 4,890,282 A | 12/1989 | Lambert et al. |
| 4,890,316 A | 12/1989 | Walsh et al. |
| 4,890,326 A | 12/1989 | Euler |
| 4,890,327 A | 12/1989 | Bertrand et al. |
| 4,891,806 A | 1/1990 | Farias et al. |
| 4,893,308 A | 1/1990 | Wilson et al. |
| 4,893,326 A | 1/1990 | Duran et al. |
| 4,893,339 A | 1/1990 | Bright et al. |
| 4,901,333 A | 2/1990 | Hodgkiss |
| 4,903,261 A | 2/1990 | Baran et al. |
| 4,905,231 A | 2/1990 | Leung et al. |
| 4,905,282 A | 2/1990 | Mcglynn et al. |
| 4,907,277 A | 3/1990 | Callens et al. |
| 4,912,705 A | 3/1990 | Paneth et al. |
| 4,912,745 A | 3/1990 | Fitzpatrick et al. |
| 4,912,756 A | 3/1990 | Hop |
| 4,912,758 A | 3/1990 | Arbel |
| 4,914,586 A | 4/1990 | Swinehart et al. |
| 4,914,650 A | 4/1990 | Sriram |
| 4,926,448 A | 5/1990 | Kraul et al. |

| Patent No. | Date | Name |
|---|---|---|
| 4,926,482 A | 5/1990 | Frost et al. |
| 4,932,022 A | 6/1990 | Keeney et al. |
| 4,932,048 A | 6/1990 | Kenmochi et al. |
| 4,935,927 A | 6/1990 | Kaewell, Jr. et al. |
| 4,935,954 A | 6/1990 | Thompson et al. |
| 4,942,569 A | 7/1990 | Maeno |
| 4,953,210 A | 8/1990 | Mcglynn et al. |
| 4,965,789 A | 10/1990 | Bottau et al. |
| 4,972,457 A | 11/1990 | O'Sullivan |
| 4,972,462 A | 11/1990 | Shibata |
| 4,972,483 A | 11/1990 | Carey |
| 4,974,099 A | 11/1990 | Lin et al. |
| 4,977,591 A | 12/1990 | Chen et al. |
| 4,981,371 A | 1/1991 | Gurak et al. |
| 4,985,891 A | 1/1991 | Fujiwara et al. |
| 4,989,203 A | 1/1991 | Phinney |
| 4,991,169 A | 2/1991 | Davis et al. |
| 4,991,172 A | 2/1991 | Cidon et al. |
| 4,991,197 A | 2/1991 | Morris |
| 4,994,802 A | 2/1991 | Critchlow et al. |
| 4,995,059 A | 2/1991 | Ishikawa |
| 4,996,697 A | 2/1991 | Critchlow et al. |
| 4,998,241 A | 3/1991 | Brox et al. |
| 4,998,248 A | 3/1991 | Matsuzaki |
| 5,001,710 A | 3/1991 | Gawrys et al. |
| 5,001,729 A | 3/1991 | Tjahjadi et al. |
| 5,001,745 A | 3/1991 | Pollock |
| 5,005,183 A | 4/1991 | Carey et al. |
| 5,007,050 A | 4/1991 | Kasparian et al. |
| 5,008,901 A | 4/1991 | Wallach et al. |
| 5,008,926 A | 4/1991 | Misholi |
| 5,014,232 A | 5/1991 | Andre |
| 5,014,267 A | 5/1991 | Tompkins et al. |
| 5,014,306 A | 5/1991 | Rodgers et al. |
| 5,020,058 A | 5/1991 | Holden et al. |
| 5,022,024 A | 6/1991 | Paneth et al. |
| 5,023,903 A | 6/1991 | Bowen |
| 5,025,443 A | 6/1991 | Gupta |
| 5,034,962 A | 7/1991 | Yamamoto et al. |
| 5,036,513 A | 7/1991 | Greenblatt |
| 5,042,028 A | 8/1991 | Ogawa |
| 5,044,010 A | 8/1991 | Frenkiel et al. |
| 5,046,188 A | 9/1991 | Molnar |
| 5,051,720 A | 9/1991 | Kittirutsunetorn |
| 5,054,055 A | 10/1991 | Hanle et al. |
| 5,062,133 A | 10/1991 | Melrose |
| 5,065,395 A | 11/1991 | Shenoi et al. |
| 5,065,425 A | 11/1991 | Lecomte et al. |
| 5,065,427 A | 11/1991 | Godbole |
| 5,070,526 A | 12/1991 | Richmond et al. |
| 5,072,308 A | 12/1991 | Lin et al. |
| 5,073,926 A | 12/1991 | Suzuki et al. |
| 5,079,769 A | 1/1992 | Ehricke et al. |
| 5,081,647 A | 1/1992 | Bremer |
| 5,083,310 A | 1/1992 | Drory |
| 5,086,425 A | 2/1992 | Le Goffic et al. |
| 5,086,471 A | 2/1992 | Tanaka et al. |
| 5,099,472 A | 3/1992 | Townsend et al. |
| 5,107,519 A | 4/1992 | Ishikawa |
| 5,115,429 A | 5/1992 | Hluchyj et al. |
| 5,119,375 A | 6/1992 | Paneth et al. |
| 5,121,385 A | 6/1992 | Tominaga et al. |
| 5,121,391 A | 6/1992 | Paneth et al. |
| 5,127,001 A | 6/1992 | Steagall et al. |
| 5,127,041 A | 6/1992 | O'Sullivan |
| 5,130,985 A | 7/1992 | Kondo et al. |
| 5,132,966 A | 7/1992 | Hayano et al. |
| RE34,034 E | 8/1992 | O'Sullivan |
| 5,136,586 A | 8/1992 | Greenblatt |
| 5,138,662 A | 8/1992 | Amano et al. |
| 5,146,470 A | 9/1992 | Fujii et al. |
| 5,148,429 A | 9/1992 | Kudo et al. |
| 5,150,357 A | 9/1992 | Hopner et al. |
| 5,150,410 A | 9/1992 | Bertrand |
| 5,151,937 A | 9/1992 | Chujo et al. |
| 5,153,897 A | 10/1992 | Sumiyoshi et al. |
| 5,155,726 A | 10/1992 | Spinney et al. |
| 5,155,847 A | 10/1992 | Kirouac et al. |
| 5,162,812 A | 11/1992 | Aman et al. |
| 5,164,982 A | 11/1992 | Davis |
| 5,170,427 A | 12/1992 | Guichard et al. |
| 5,177,734 A | 1/1993 | Cummiskey et al. |
| 5,179,588 A | 1/1993 | Nowicki |
| 5,182,762 A | 1/1993 | Shirai et al. |
| 5,187,591 A | 2/1993 | Guy et al. |
| 5,187,692 A | 2/1993 | Haneda et al. |
| 5,193,110 A | 3/1993 | Jones et al. |
| 5,195,086 A | 3/1993 | Baumgartner et al. |
| 5,195,130 A | 3/1993 | Weiss et al. |
| 5,206,900 A | 4/1993 | Callele |
| 5,208,812 A | 5/1993 | Dudek et al. |
| 5,208,850 A | 5/1993 | Kino |
| 5,214,650 A | 5/1993 | Renner et al. |
| 5,214,656 A | 5/1993 | Chung et al. |
| 5,228,026 A | 7/1993 | Albrow et al. |
| 5,228,033 A | 7/1993 | Okouchi |
| 5,228,076 A | 7/1993 | Hopner et al. |
| 5,233,660 A | 8/1993 | Chen |
| 5,235,595 A | 8/1993 | O'Dowd |
| 5,247,591 A | 9/1993 | Baran |
| 5,249,218 A | 9/1993 | Sainton |
| 5,257,410 A | 10/1993 | Meszko et al. |
| 5,258,983 A | 11/1993 | Lane et al. |
| 5,260,783 A | 11/1993 | Dixit |
| 5,261,027 A | 11/1993 | Taniguchi et al. |
| 5,263,019 A | 11/1993 | Chu |
| 5,272,695 A | 12/1993 | Makino et al. |
| 5,272,700 A | 12/1993 | Hansen et al. |
| 5,276,703 A | 1/1994 | Budin et al. |
| 5,278,900 A | 1/1994 | Van Gerwen et al. |
| 5,280,519 A | 1/1994 | Nakajima et al. |
| 5,282,197 A | 1/1994 | Kreitzer |
| 5,283,638 A | 2/1994 | Engberg et al. |
| 5,283,819 A | 2/1994 | Glick et al. |
| 5,289,539 A | 2/1994 | Maruyama |
| 5,295,136 A | 3/1994 | Ashley et al. |
| 5,297,203 A | 3/1994 | Rose et al. |
| 5,301,246 A | 4/1994 | Archibald et al. |
| 5,303,236 A | 4/1994 | Kunimoto et al. |
| 5,305,312 A | 4/1994 | Fornek et al. |
| 5,307,413 A | 4/1994 | Denzer |
| 5,309,434 A | 5/1994 | Maekawa |
| 5,309,562 A | 5/1994 | Li |
| 5,313,498 A | 5/1994 | Sano |
| 5,317,604 A | 5/1994 | Osterweil |
| 5,319,682 A | 6/1994 | Clark |
| 5,327,520 A | 7/1994 | Chen |
| 5,329,472 A | 7/1994 | Sugiyama |
| 5,341,374 A | 8/1994 | Lewen et al. |
| 5,343,473 A | 8/1994 | Cidon et al. |
| 5,343,521 A | 8/1994 | Jullien et al. |
| 5,347,572 A | 9/1994 | Avni |
| 5,355,365 A | 10/1994 | Bhat et al. |
| 5,355,406 A | 10/1994 | Chencinski et al. |
| 5,365,576 A | 11/1994 | Tsumura et al. |
| 5,365,577 A | 11/1994 | Davis et al. |
| 5,369,700 A | 11/1994 | Koura et al. |
| 5,371,853 A | 12/1994 | Kao et al. |
| 5,375,068 A | 12/1994 | Palmer et al. |
| 5,377,260 A * | 12/1994 | Long ....................... 379/93.02 |
| 5,379,340 A | 1/1995 | Overend et al. |
| 5,381,412 A | 1/1995 | Otani |
| 5,384,780 A | 1/1995 | Lomp et al. |
| H1413 H | 2/1995 | Gunn |
| 5,388,150 A | 2/1995 | Schneyer et al. |
| 5,390,239 A | 2/1995 | Morris et al. |

| | | | | | | |
|---|---|---|---|---|---|---|
| 5,390,250 | A | 2/1995 | Janse et al. | 5,864,560 A | 1/1999 | Li et al. |
| 5,402,474 | A | 3/1995 | Miller et al. | 6,009,082 A | 12/1999 | Caswell et al. |
| 5,406,557 | A | 4/1995 | Baudoin | 6,012,113 A | 1/2000 | Tuckner |
| 5,406,560 | A | 4/1995 | Kondo et al. | 6,181,784 B1 | 1/2001 | Duran et al. |
| 5,408,401 | A | 4/1995 | Miyazaki | 6,240,085 B1 | 5/2001 | Iwami et al. |
| 5,408,522 | A | 4/1995 | Ikehata et al. | 2002/0075815 A1 | 6/2002 | Sharma et al. |
| 5,408,527 | A | 4/1995 | Tsutsu | 2003/0223461 A1 | 12/2003 | Sharma et al. |
| 5,414,773 | A | 5/1995 | Handelman | | | |
| 5,414,796 | A | 5/1995 | Jacobs et al. | | | |
| 5,416,776 | A | 5/1995 | Panzarella et al. | | | |
| 5,425,089 | A | 6/1995 | Chan et al. | | | |
| 5,426,652 | A | 6/1995 | Heiman | | | |
| 5,438,536 | A | 8/1995 | Salzman | | | |
| 5,438,614 | A | 8/1995 | Rozman et al. | | | |
| 5,440,547 | A | 8/1995 | Easki et al. | | | |
| 5,440,619 | A | 8/1995 | Cann | | | |
| 5,440,698 | A | 8/1995 | Sindhu et al. | | | |
| 5,444,770 | A | 8/1995 | Davis et al. | | | |
| 5,448,555 | A | 9/1995 | Bremer et al. | | | |
| 5,450,425 | A | 9/1995 | Gunn et al. | | | |
| 5,452,289 | A | 9/1995 | Sharma et al. | | | |
| 5,452,329 | A | 9/1995 | Sato | | | |
| 5,453,986 | A | 9/1995 | Davis et al. | | | |
| 5,463,616 | A | 10/1995 | Kruse et al. | | | |
| RE35,104 | E | 11/1995 | Murakami et al. | | | |
| 5,465,267 | A | 11/1995 | Todoroki | | | |
| 5,471,470 | A | 11/1995 | Sharma et al. | | | |
| 5,472,351 | A | 12/1995 | Greco et al. | | | |
| 5,473,676 | A | 12/1995 | Frick et al. | | | |
| 5,477,547 | A | 12/1995 | Sugiyama | | | |
| 5,479,407 | A | 12/1995 | Ko et al. | | | |
| 5,479,475 | A | 12/1995 | Grob et al. | | | |
| 5,483,576 | A | 1/1996 | Staples | | | |
| 5,490,060 | A | 2/1996 | Malec et al. | | | |
| 5,493,609 | A | 2/1996 | Winseck, Jr. et al. | | | |
| 5,500,859 | A | 3/1996 | Sharma et al. | | | |
| 5,502,727 | A | 3/1996 | Catanzaro et al. | | | |
| 5,515,398 | A | 5/1996 | Walsh et al. | | | |
| 5,521,975 | A | 5/1996 | Hashimoto | | | |
| 5,524,047 | A | 6/1996 | Brown et al. | | | |
| 5,526,423 | A | 6/1996 | Ohuchi et al. | | | |
| 5,535,204 | A | 7/1996 | Li | | | |
| 5,541,640 | A | 7/1996 | Larson | | | |
| 5,546,395 | A | 8/1996 | Sharma et al. | | | |
| 5,546,448 | A | 8/1996 | Caswell et al. | | | |
| 5,550,816 | A | 8/1996 | Hardwick et al. | | | |
| 5,559,793 | A | 9/1996 | Maitra et al. | | | |
| 5,574,725 | A | 11/1996 | Sharma et al. | | | |
| 5,577,041 | A | 11/1996 | Sharma et al. | | | |
| 5,592,586 | A | 1/1997 | Maitra et al. | | | |
| 5,596,628 | A | 1/1997 | Klein | | | |
| 5,600,649 | A | 2/1997 | Sharma et al. | | | |
| 5,604,737 | A | 2/1997 | Iwami et al. | | | |
| 5,617,423 | A | 4/1997 | Li et al. | | | |
| 5,619,508 | A | 4/1997 | Davis et al. | | | |
| 5,628,030 | A | 5/1997 | Tuckner | | | |
| 5,631,745 | A | 5/1997 | Wong et al. | | | |
| 5,644,629 | A * | 7/1997 | Chow ................ 379/142.07 | | | |
| 5,673,257 | A | 9/1997 | Sharma et al. | | | |
| 5,673,268 | A | 9/1997 | Sharma et al. | | | |
| 5,675,640 | A | 10/1997 | Tappert et al. | | | |
| 5,699,410 | A | 12/1997 | Imamura et al. | | | |
| 5,699,417 | A | 12/1997 | Khojasteh | | | |
| 5,699,418 | A | 12/1997 | Jones | | | |
| 5,717,742 | A | 2/1998 | Hyde-Thomson | | | |
| 5,745,558 | A | 4/1998 | Richardson, Jr. et al. | | | |
| 5,754,589 | A | 5/1998 | Maitra et al. | | | |
| 5,764,627 | A | 6/1998 | Sharma et al. | | | |
| 5,764,628 | A | 6/1998 | Davis et al. | | | |
| 5,790,532 | A | 8/1998 | Sharma et al. | | | |
| 5,812,534 | A | 9/1998 | Davis et al. | | | |
| 5,815,503 | A | 9/1998 | Li | | | |
| 5,821,987 | A | 10/1998 | Larson | | | |

FOREIGN PATENT DOCUMENTS

| | | |
|---|---|---|
| DE | 3344140 C2 | 6/1984 |
| DE | 3426055 A1 | 1/1985 |
| DE | 3409532 A1 | 9/1985 |
| DE | 3504064 | 8/1986 |
| DE | 3726366 C2 | 2/1988 |
| DE | 3630469 | 3/1988 |
| DE | 3531173 C2 | 3/1989 |
| DE | 3490532 | 4/1989 |
| EP | 0 309 993 A2 | 4/1989 |
| EP | 0 309 993 A3 | 4/1989 |
| EP | 0 364 866 | 1/1990 |
| EP | 0 374 828 B1 | 6/1990 |
| EP | 0 429 054 | 5/1991 |
| EP | 0 443 548 | 8/1991 |
| EP | 0 453 128 | 10/1991 |
| EP | 0 480 634 B1 | 4/1992 |
| EP | 0 488 685 | 6/1992 |
| EP | 0 488 685 A2 | 6/1992 |
| EP | 0 488 685 A3 | 6/1992 |
| EP | 0 488 685 B1 | 6/1992 |
| EP | 0 496 427 A2 | 7/1992 |
| EP | 0 496 427 A3 | 7/1992 |
| EP | 0 510 411 | 10/1992 |
| EP | 0 526 104 | 2/1993 |
| EP | 0 581 528 | 2/1994 |
| EP | 0 582 537 | 2/1994 |
| EP | 0 614 305 | 9/1994 |
| EP | 0 630 141 | 12/1994 |
| EP | 0 650 286 | 4/1995 |
| EP | 0 425 163 B1 | 5/1995 |
| GB | 2 025 735 A | 1/1980 |
| GB | 2 131 654 A | 6/1984 |
| GB | 2 173 070 A | 10/1986 |
| GB | 2 184 327 A | 6/1987 |
| GB | 2 195 866 A | 4/1988 |
| GB | 2 208 986 A | 4/1989 |
| GB | 2 210 237 | 6/1989 |
| GB | 2 212 028 A | 7/1989 |
| GB | 2 227 625 A | 8/1990 |
| GB | 2 260 670 | 4/1993 |
| GB | 2 268 663 | 1/1994 |
| JP | 58-88961 | 5/1983 |
| JP | 59-44140 | 3/1984 |
| JP | 59-081947 | 5/1984 |
| JP | 61077449 | 4/1986 |
| JP | 62-61437 | 3/1987 |
| JP | 62-77730 | 4/1987 |
| JP | 62-221267 | 9/1987 |
| JP | 63-019951 | 1/1988 |
| JP | 63-48030 | 2/1988 |
| JP | 63-54052 | 3/1988 |
| JP | 63-64460 | 3/1988 |
| JP | 63-105533 | 5/1988 |
| JP | 63-155831 | 6/1988 |
| JP | 63-169850 | 7/1988 |
| JP | 64-16043 | 1/1989 |
| JP | 64-18329 | 1/1989 |
| JP | 01068052 | 3/1989 |
| JP | 1-181344 | 7/1989 |
| JP | 1-198144 | 8/1989 |
| JP | 02034077 | 2/1990 |
| JP | 2-67847 | 3/1990 |
| JP | 2-107027 | 4/1990 |

| | | |
|---|---|---|
| JP | 2-145097 | 6/1990 |
| JP | 193489 | 7/1990 |
| JP | 257748 | 10/1990 |
| JP | 03009643 | 1/1991 |
| JP | 3-58582 | 3/1991 |
| JP | 3-157027 | 7/1991 |
| JP | 03153152 | 7/1991 |
| JP | 03162052 | 7/1991 |
| JP | 03237853 | 10/1991 |
| JP | U 3-115458 | 11/1991 |
| JP | 03280797 | 12/1991 |
| JP | 4-35137 | 2/1992 |
| JP | 04319847 | 11/1992 |
| JP | 5-504687 | 7/1993 |
| JP | 2790977 | 7/1995 |
| WO | WO 87/01254 | 2/1987 |
| WO | WO 91/05419 | 4/1991 |
| WO | WO 91/07044 | 5/1991 |
| WO | WO 91/15067 | 10/1991 |
| WO | WO 92/06550 | 4/1992 |
| WO | WO 92/20028 | 11/1992 |
| WO | WO 93/11643 | 6/1993 |
| WO | WO 93/22869 | 11/1993 |
| WO | WO 94/26056 | 11/1994 |
| WO | WO 96/15601 | 5/1996 |
| WO | WO 96/15612 | 5/1996 |

OTHER PUBLICATIONS

CCITT - The International Telegraph and Telephone Consultative Committee - Blue Book. vol. VIII—Fascicle VIII.1—Rec. V42 on pp. 296-370, "Data Communication Over the Telephone Network" Series V Recommendations. IX$^{th}$ Plenary Assembly, Melbourne, Nov. 14-25, 1988. Geneva 1989. ISBN 92-61-03661-9.
CCITT—The International Telegraph and Telephone Consultative Committee—Blue Book. Vol. VIII—Fascicle VIII.2, Data Communication Networks: Services and Facilities, Recommendations X.1-X.32, IX$^{th}$ Plenary Assembly, Melbourne, Nov. 14-25, 1988. Geneva 1989. ISBN 92-61-03671-6. Entire Book.
"Communications for the Information Age", *IEEE Global Telecommunications Conference & Exhibition*, 1 of 3, pp. 34-36 (Nov. 28 - Dec. 1).
"Composite Mini-Packet Switching", IBM Technical Disclosure Bulletin, 32(5A):162-164 (1989).
CYLINK Secured Wireless Network. CYLINK/MICOM at Networld. Illustration. Cylink Booth No. 3574. Micom Booth No. 1839. 1 page. Undated and Labeled MT46808.
"Data Communication Networks: Service and Facilities, Terminal Equipment and Interfaces, Recommendations X.1-X.29", *CCITT Yellow Book*, vol. VIII-Fascicle VIII.2, pp. 100-190 (1981).
"Data Communication Over the Telephone Network", *CCITT Blue Book*, vol. VIII, (1989).
"Data Communication Networks: Transmission, Signalling and Switching, Network Aspects, Maintenance, Administrative Arrangements, Recommendations X.40-X.180", *CCITT Yellow Book*, vol. VIII-Fascicle VIII.3, pp. 142-208 (1980).
"Data Communication Over the Telephone Network: Data Compression Procedures for Data Circuit Terminating Equipment (DCE) Using Error Corrections Procedures", *CCITT Recommendation* V. 42 bis (1990).
"Data Communication Over the Telephone Network: Definitions of Terms Concerning Data Communication over the Telephone Network", *ITU-T Recommendation* V. 7 (1993).
Data Sheet. "High Level Data Link Control (HDLC) and Derivatives" pp. 1-5, [retrieved on Apr. 29, 2004] Retrieved from the Internet http://www.ricksiltshire.com/hdlc.htm.
Data Sheet. Data Networks Resource. "SDLC, HDLC and LLC" pp. 1-9, [retrieved on Apr. 29, 2004] Retrieved from the Internet http://www.rhyshaden.com/hdlc.htm.
Data Sheet. Telescada: CDPD Communications, "Cellular Digital Packet Data" Retrieved on Apr. 29, 2004. Retrieved from the Internet http://www.telescada.com/cdpd.htm.

Data Sheet. Advanced Relay Corporation: Hardware and Software Products. "Physical Layer". 3 pages. Retrieved from the Internet on 04/29/04 (Google Search) http://www.advancedrelay.com/html/products/physical.html.
Data/Voice Internetwork Node. "The Integrated Network". Micom. 6 Pages. Undated and Labeled MT46900-905.
"DEC Sound/Picture Information Network, (DECspin) for ULTRIX, Version 1.0", *Digital Corp.*, 4 pages (1992).
"Dial-up comm server", LAN Technology, 7(12):87 (1991).
"EIA/TIA Interim Standard—Cellular System Dual-Mode Mobile Station—Base Station Compatibility Standard". IS-54-B (Revision of IS/54-A) Apr. 1992. Telecommunications Industry Association. pp. 1-280.
"Error Control for Voice/Data Packet Network", *IBM Technical Disclosure Bulletin*, 29(7):3092-3095 (1986).
"Error-Correcting Procedures for DCES Using Asynchronous-to-Synchronous Conversion", *CCITT* V. 42, vol. VIII, pp. 296-370 (1988).
"Experimental Internet Stream Protocol, Version 2 (ST-II)", *Network Working Group, CIP Working Group*, 148 pages (1990).
"Forthcoming Special Issures and Mini-Special Issures of IEEE Journal on Selected Areas in Communications and IEEE Transactions on Communications for 1984-1985", *IEEE Journal on Selected Areas in Communications*, SAC-1(6):1155-1158 (1983).
"Full Duplex Speakerphone", *IBM Technical Disclosure Bulletin*, 29(12):5599-5602 (1987).
"Go Global Without Leaving Your Office", Artel Technology, 4 pages (date unknown).
"High Speed Data Pump Chip Sets", *AT&T Microelectronics*, pp. 1-91 & F1-F20 (Dec. 1991).
"Information Processing Techniques Program. vol. II. Wideband Integrated Voice/Data Technology", *Massachusetts Inst. of Tech., Lexington, Lincoln Lab*, 36 pages (1978).
"Integrated Voice/Data PABX", *IBM Technical Disclosure Bulletin*, pp. 1537-1538 (Sep. 1986).
"ISDN System: Architecture, Technology, and Applications", Prentice-Hall, Inc., Englewood Cliffs, New Jersey (1990).
ITU—International Telecommunication Union, Telecommunication Standardization Sector of ITU. Q.920 (03/93) Digital Subscriber Signalling System No. 1 (DSS1)—Digital Subscriber Signaling System No. 1 (DSS1)—ISDN User-Network Interface Data Link Layer—General Aspects. ITU-T Recommendation Q.920 (previously CCITT Recommendation). Title page, Table of Contents. pp. 1-20.
ITU—International Telecommunication Union, Telecommunication Standardization Sector of ITU. Q.921 (09/97) "Series Q: Switching and Signalling—Digital subscriber Signaling System No. 1—Data link layer". ISDN User-Network Interface—Data Link Layer Specification. Title page, Table of Contents, pp. 1-256.
"Jane's Military Communications, 1981", Jane's Publishing Company Limited, London (1981).
"Jane's Military Communications, 1982", Jane's Publishing Company Limited, London (1982).
"Jane's Military Communications, 1983", Jane's Publishing Company Limited, London (1983).
"Jane's Military Communications, 1986", Jane's Publishing Company Limited, London (1986).
"Jane's Military Communications, 1987", Jane's Publishing Company Limited, London (1987).
Lewis James Enterprises, Nov. 29, 1993. Illustration. 1 page. Labeled MT46817.
"Mechanism for Integrating Voice and Data on a Transmission Channel", *IBM Technical Disclosure Bulletin*, 30(5):208-209 (1987).
"Method and Apparatus for the Statistical Multiplexing of Voice, Data, and Image Signals", *IBM Technical Disclosure Bulletin*, 35, pp. 409-411 (Nov. 1992).
MICOM Letter (Rev. Oct. 1990). 1 Page. Undated and Labeled MT69478.
MICOM Product Information Sheets. 2 Pages. Undated and Labeled MT69479-80.
MICOM Product Information Sheets. 6 Pages. Undated and Labeled MT69481-86.

MICOM Product Information Sheets. 2 Pages. Undated and Labeled MT69487-88.
MICOM Product Information Sheets. 6 Pages. Undated and Labeled MT46877-82.
MICOM Communications Corp. Corporate Background. 6 Pages. Undated and Labeled MT46779-84.
MICOM Customer Profile, "Continental Cablevision Tunes Into Cost-Savings with Marathon". 2 Pages. Undated and Labeled MT69551-52.
MICOM Customer Profile, "Switch to Marathon Saves Thousands for Sager Electrical Supply Co.", 2 Pages. Undated and Labeled MT69553-54.
MICOM Customer Profile, "Visone Motors Revs Up with Marathon". 2 Pages. Undated and Labeled MT69555-56.
MICOM Brochure. "Warning: There May be an Embezzler in your Company!" Get Marathon and Stop Losing Money. 2 Pages. Undated and Labeled MT46805-06.
MICOM Brochure "Hotline Application Assistance". 4 Pages. Undated and Labeled MT69543-46.
MICOM Reports on Data/Voice Products, Trends and Applications, Networking News, Nov. 1993. "MICOM Announces New DVI Products for Multi-Site Networking". pp. 1-8. Labeled MT46791-800.
MICOM News Release, Sep. 25, 1990 Simi Valley, CA. "Micom Announces the Marathon 5K for Long-Distance Networking". 4 Pages. Labeled MT69474-77.
MICOM News Release, Oct. 5, 1993. Live at Networld Dallas, Booth #1839. "Multi-Site Integrated Internetworking for Seamless LAN/Voice/FAX Connectivity, and Industry First". 3 pp. Labeled MT69518-20.
MICOM News. Up-Close with Pete Oliver of PremierePage. Network. Mar./Apr. 1994. 4 Pages. Labeled MT69513-16.
MICOM Product Sheet. Marathon 1K "Data/Voice Network Feeder". 1 p. Undated and Labeled MT69512.
MICOM Brochure. In the Last Year, Companies like your have saved millions of dollars . . . Find out How Network Integration can Save you Big Money. 3 Pages. Undated and Labeled MT69509-11.
MICOM Brochure. "Run Our Marathon" Marathon 5K.A Supplement to the Oct. 1990 Issue. 3 Pages. Labeled MT46747-49.
MICOM Brochure—Marathon 5K. Locations. 11 Pages. Undated and Labeled MT69463-73.
MICOM Brochure. "Netrunner" 10 Pages. Undated and Labeled MT69450, MT69453-61.
MICOM Brochure. "Cell Relay for Sub T1/E1" Data, Voice, Fax and LAN Integration. 2 Pages. Undated and Labeled MT69597-98.
MICOM Brochure "MICOM Digital Direct Series T1", Marathon and NetRunner Integration Products. 4 Pages. Undated and Labeled MT69591-94.
MICOM Brochure, "Software Release 5.0" Voice, Fax, Data, LAN Integration. 2 Pages. Undated and Labeled MT69595-96.
MICOM Brochure, "NetRunner Integration Routers" The Next Step in Multiprotocol Routing. 17 Pages. Undated and Labeled MT69576-601.
MICOM General Price List Domestic, Dec. 1993. Labeled MT47070-88.
MICOM—Marathon—Remote LAN Bridge User's Manual. Model 5000RLB/3, Stock No. 800-1768-30. Rev. A. June 1993. Labeled MT68881-69000.
MICOM Brochure. A New Era of Wide Area Networking. "Free Voice and Fax Over Low-Cost Wans". 11 Pages. Undated and Labeled MT69850-60.
MICOM Applications Guide. "Integrated Networking Over Low Cost Wans". 1991 MICOM Communications Corporation. Labeled MT69774-804.
MICOM Brochure. "Voice over Frame Relay". 4 Pages. Undated and Labeled MT69805-08.
MICOM. Marathon. Voice/Fax Module. Users Manual. Stock Number 800-1747, Rev. C. Dec. 1991. MT69359-448. •Addendum Stock Number 801-1747-103, Rev. A. Voice/Fax Module. International Input Impedance, Dec. 1991. Labeled MT69337-41 •Addendum Stock Number 801-1747-102, Rev. A. Input Level Attenuation Addendum, Oct. 1991. Labeled MT69346-49 •Addendum Stock Number 801-1747-101, Rev. A. Voice/Fax Module. Terminal Block Installation Addendum. Sep. 1991. Labeled MT69333-36.
MICOM. Marathon. A Data/Voice Network Server. Network Management System Module User's Manual. Stock Number 800-1748, Rev. C. Dec. 1991. Labeled MT69287-332.
MICOM. Marathon 5K. A Data/Voice Network Server. Startup Guide. Stock Number 800-1745, Rev. B. Dec. 1991. Labeled MT64696-64793.
MICOM. Marathon 5K. A Data Voice Network Server. Users Manual. Stock Number 800-1705, Rev. A. Jan. 1991. Labeled MT69001-69282 •Fax Addendum. Stock Number 801-1705-101, Rev. A. Jan. 1991. Labeled MT69283-86.
Product Watch, "Micom Leads in the Multiport Bridging Race", 16. HP Professional. 1 page. Undated and Labeled MT46656.
Netrunner Shoots High and Low. LAN Computing, 16. Sep. 1993, 1 page. Labeled MT-69602.
"Mitel MT8841 Calling Number Identification Circuit", *Mitel Microelectronics Digital/Analog Communications Handbook*. Doc. No. 9161-952-007-NA, Issue 9, pp. 8-93 - 8-102 (1993).
"Mitel MT8841 Calling Number Identification Circuit, Issue 4", 16 pages (1995).
"Mitsubishi Still Color Picture TV Phone", *Techno Japan*, 23(6) (Jun. 1990).
Mobile/Cellular Technology. The Website for Mobile Communications. Diagram of IS-54B time slot structure. 1 page. Retrieved from the Internet on April. 27, 2004 http://www.mobilecomms-technology.com/projects/indiana/indiana5.html.
"MultiX25—X.25 PAD, The New MultiX25 PAD 8 Port X.25 Packet Assembler/Disassembler for Public and Private Data Networks", *MultiTech Systems*.
MultiTech Systems. "The New MultiModem X.25, V.32TERBO X.25 Desktop Modem". 1 page. (1993).
MultiTech Systems. Technical Specifications. 1 page (1993).
MultiTech Systems. "The New MultiMuxX25, 8 and 16 port X.25 PADs for Private and Public Data Networks" 4 pages. (Feb 1990).
"Network Speech. System Implications of Packetized Speech", *Massachusetts Institute of Tech., Lexington, Lincoln Laboratory*, 30 pages (1976).
"Northern Telecom's Displayphone", *What Telephone*, pp. 56-59 (year unknown).
"One Per Desk (OPD)", Product Description, 24 pages (dated 2000).
"Output Throttle Mechanism", *IBM Technical Disclosure Bulletin*, 32(11):274-279 (1990).
"PC-Based ISDN Visual Communication System, Preliminary Information", *Artel Technology*, 2 pages (date unknown).
"Pen Telephone Brochure", *Shimadzu*, Published Prior to Applicant's Invention.
"PICFON Card Brochure", *Specom Technologies Corp.*, Published Prior to Applicant's Invention.
"Picturetel, PictureTel's High Performance VideoConferencing is Redefining the Way the World Meets", *PictureTel Corporation*, 3 pages (date unknown).
"Privateline.com:Mobile Telephone History", 4 pages. Retrieved from the Internet on Apr. 27, 2004 http://www.privateline.com/PCS/history10.htm.
"Radish System Lets Phone Users Send Voice, Data Simultaneously", *PC Week*, 9(19):53 (May 11, 1992).
"Report on the MBone evaluations", 3 pages (date unknown).
"Series V: Data Communication over the Telephone Network, Error control, Error-correcting procedures for DCEs using asynchronous-to-synchronous conversion", *ITU-T Recommendation* V. 42, pp. 1-66 (1996).
"Speech Data Adaptive Multiplexer", *IBM Technical Disclosure Bulletin*, 27(2):969 (Jul. 1994).
"STU-III Handbook for Industry", *Department of Defense Security Institute*, 10 pages (Feb. 1997).
"T7540 Digital Telephone CODEC Preliminary Data Sheet", *AT&T Microelectronics*, pp. 1-64 (Jan. 1991).
"T7540 Digital Telephone CODEC Data Sheet and Addendum", *AT&T Microelectronics*, pp. 1-4 (Jul. 1991).
"TechTips—A Periodic Round-up of Technical Applications, Notes and Information on MultiTech's Data Communications Products", *MultiTech Systems*, 2(2) (May 1992).
"Telewriter Product Description", *Optel Communications, Inc.*, Published Prior to Applicants Invention.

"Telewriting Terminal Equipment", *CCITT*, Recommendation T. 150, pp. 228-277 (1988).
"The Photophone", *GTE Product Brochure*, (Feb. 15, 1990).
"Token-Ring Migration to Switched LAN Interconnect—A technical White Paper", pp. 1-19 (date unknown).
"Videowriter '91 Product Description", *Optel Communications, Inc.* (1991).
"Voice/Data Concentrator", *IBM Technical Disclosure Bulletin*, pp. 3066-3067 (Jan. 1979).
"We DSP 16C Digital Signal Processor/CODEC Preliminary Data Sheet", *AT&T Microelectronics*, pp. 1-64 (May 1991).
"X.25 Devices and Protocol Operation" Internetworking Technologies Handbook, Fourth Edition. Chapter 17 (pp. 17-1 to 17-10). Table of Contents. All contents are Copyright © 1992-2002 Cisco Systems, Inc. All rights reserved. Retrieved from the Internet on May 12, 2004 - http://www.ciscopress.com/bookstore/LargeCover. asp?isbn=1587051192.
"Z84C01 Z80 CPU with Clock Generator/Controller", *Zilog Intelligent Peripheral Controllers*, pp. 43-73 (1991).
"Z84C90 CMOS Z80 KIO Serial/Parallel/counter/timer", *Zilog Intelligent Peripheral Controllers*, pp. 205-224 (1991).
Abbiate et al., "Voice and Data Transmission", *IBM Technical Disclosure Bulletin*, 27(1B):524-525 (1984).
Addeo et al., "Personal Multi-Media Multi-Point Communication Services for Broadband Networks", *Globecom '86: IEEE Global Telecommunications Conference*, Dec. 1-4, 1986, Houston, Texas, Conference Record, vol. 1 of 3, pp. 0053-0057 (1988).
Ades et al., "Protocols for Real Time Voice Communication on a Packet Local Network", *University of Cambridge Computer Laboratory*, 6 pages (date unknown).
Adolphs et al., "Adapters for the Public ISDN", *Electrical Communication*, 61(1) 9 pages (1987).
Adolphs et al., "Subsets, Terminals, and Terminal Adapters for the Public ISDN", *Electrical Communication*, 61(1):72-80 (1987).
Aguilar et al., "Architecture for a Multimedia Teleconferencing System", ACM 0-89791-201-2/86/0800-0126, pp. 126-136 (1986).
Ahuja et al., "The Rapport Multimedia Conferencing System", *Conference on Office Information Systems*, Mar. 23-25, 1988, Palo Alto, California, Association for Computing Machinery, Inc., pp. 1-8 (1988).
Aikoh et al., "A New TDM Technique for Voice, Data and Video Transmission", *Globecom '87*, Nov. 15-18, 1987, Tokyo, Japan, pp. 28.7.7-28.7.5 (1987).
Akaiwa et al., "An Integrated Voice and Data Radio Access System", *IEEE*, pp. 255-258 (1992).
Akiyama et al., "Digital Sketchphone--Telewriting Terminal for INS Model System—" Review of the Electrical Communication Laboratories, 33(2):250-259 (1985).
Anderson et al., "Toolkit Support for Multiuser Audio/Video Applications", pp. 230-241 (date unknown).
Andrews et al., "Faster Packets For Tomorrow's Telecommunications", *AT&T Technology*, 3(4):25-33 (date unknown).
Angebranndt et al., "Integrating Audio and Telephony in a Distributed Workstation Environment", *Proceedings of the Summer 1991 Usenix Conference*, Jun. 10-14, 1991, Nashville, Tennessee, pp. 419-435 (1991).
Aoki et al., "Protocol Processing for High-Speed Packet Switching Systems", *Proceedings of the International Seminar*, Zurich, Switzerland, Mar. 11-13, 1986, pp. 125-130 (1986).
Arango et al., "Touring Machine: A Software Platform for Distributed Multimedia Applications", Submitted to the *1992 IFIP International Conference on Upper Layer Protocols, Architectures, and Applications*, Vancouver, Canada, May 1992, 12 pages (1992).
Armbruster, Heinrich, "Broadband ISDN—The Network of the Future: Applications and Compliance with User Requirements", *Globecom '86: IEEE Global Telecommunications Conference*, Dec. 1-4, 1986, Houston, Texas, Conference Record, vol. 1 of 3, pp. 0484-0490 (1986).
Arthurs et al., "Traffic Analysis Tools for Integrated Digital Time-Division Link Level Multiplexing of Synchronous and Asynchronous Message Streams", *IEEE Journal on Selected Areas in Communications*, SAC-1(6):1112-1123 (1983).

*ATT&T Modem Designer's Guide*, AT&T Microelectronics (Oct. 25, 1993).
Ball et al., "A Multimedia Network Interface", 6 pages (date unknown).
Barberis et al., "Analysis and Optimal Design of a Packet-Voice Receiver", IEEE Transactions on Communications, COM-28(2):217-227 (1980).
Barberis et al., "Coded Speech in Packet-Switched Networks: Models and Experiments", *IEEE Journal on Selected Areas in Communications*, SAC-1(6):1028-1038 (1983).
Beadle et al., "The Human Side of Multimedia Telecommunications", Appears in *Proceeding of the 2nd Australian Multimedia Communications, Applications and Technology Workshop, AOTC Ltd*, Melbourne, Jul. 13-14, 1992, 11 pages (1992).
Beckmann, William H., "Voice and Data Integration: An Applications Perspective", *Localnet '84*, Proceedings of the conference held in San Diego USA, Oct. 1, Online Publications, New York, pp. 303-327 (1984).
Bellamy, John, "Digital Telephony" John Wiley & Sons, New York, pp. 392-412 (1982).
*Bellcore Technical Reference TR-NWT-000030*, Issue 2,(Oct. 1992).
Bially et al., "Voice Communication in Integrated Digital Voice and Data Networks", *IEEE Transactions on Communications*, COM-28(9):1478-1490 (1980).
Blair et al., "Incorporating Multimedia in Distributed Open Systems", Presented at *EUUG Spring Conference*, Tromso, Norway, Apr. 1991, 12 pages (1991).
Blair et al., "Orchestration Services for Continuous Media Communications", Presented at *4th Bangor Communication Symposium*, Bangor, Gwynedd, May 27-28, 1992, 10 pages (1992).
Blane et al., "Voice/Data Multiplexing in a Multi-Signal Processor-Synchronized Architecture", *IBM Technical Disclosure Bulletin*, 28(5):2059-2060 (1985).
Boese et al., "The Multimedia SCP", *IEEE/IEICE Global Telecommunications Conference 1987*, Nov. 15-18, 1987, Tokyo, Japan, Conference Record, vol. 1 of 3, pages 112 and 116 (1991).
Borgnis-Desbordes et al., "Variable-Speed Data Transmission", *IBM Technical Disclosure Bulletin*, 27(4A):2269-2270 (1984).
Borgnis-Desbordes et al., "Voice and Data Transmission", *IBM Technical Disclosure Bulletin*, 25(8):4474-4475 (1983).
Brown, Howard, "British Telecom's ISDN", *Computer Communications*, 11(4):177-180 (1988).
Bubenik et al., "Multipoint Connection Management in High Speed Networks", *INFOCOM '91 : Proceedings of the Tenth Annual Joint Conference of the IEEE Computer and Communications Societies*, pp. 59-68 (1991).
Busse, "Marathon Integrates Traffic" Voice, fax, and LAN data can be sent over one line. Apr. 19, 1993 Infoworld. Labeled MT06141.
Cain, Roger W., "Microprocessor Based 9600 BPS Modem", *ICASSP 85: IEEE International Conference on Acoustics, Speech, and Signal Processing*, Mar. 26-29, 1985, Tampa, Florida, Proceedings, vol. 4 of 4, pp. 1633-1636 (1985).
Callens et al., "Speech Data Adaptive Multiplexer", *IBM Technical Disclosure Bull.*, 27:969 (Jul. 1984).
Campbell et al., "A Continuous Media Transport and Orchestration Service", Presented at *ACM SIGCOMM '92*, Maryland, USA, 12 pages (1992).
Casale et al., "Statistical voice/high speed data multiplexing on a 64 kbit/s channel", *Phoenix Conference on Computers and Communications*, Scottsdale, AZ., 459-464 (Mar. 27, 1991).
Casner et al., "First IETF Internet Audiocast", Reprinted from *ACM SIGCOMM Computer Communications Review*, vol. 22, No. 3 (Jul. 1992), ISI Reprint Series ISI/RS-92-293, pp. 1-6 (1992).
Casner et al., "N-Way Conferencing with Packet Video", Reprinted from the Proceedings of The Third International Workshop on Packet Video, 22-23 Mar. 1990 in Morristown, New Jersey, ISI Reprint Series ISI/RS-90-252, pp. 1-6 (1990).
Cerf, V., "Packet Satellite Technology Reference Sources", *Defense Advanced Research Projects Agency*, 5 pages (dated 1982).
Chao, H. Jonathan, "Design of Transmission and Multiplexing Systems for Broadband Packet Networks", *IEEE Journal on Selected Areas in Communications*, 6(9):1511-1520 (1988).

Chao et al., "A Packet Video System Using The Dynamic Time Division Multiplexing Technique", *Globecom '86: IEEE Global Telecommunications Conference, Conference Record*, vol. 3 of 3, pp. 0767-0772 (1986).

Chen et al., "A Fair Integrated Voice/Data Protocol for Token Ring Networks", *Globecom '90: IEEE Telecommunications Conference & Exhibition*, Dec. 2-5, 1990, San Diego, California, Conference Record, vol. 3 of 3, pp. 1416-1420 (1990).

Chen et al., "Integrated Voice/Data Switching", *IEEE Communications Magazine*, 26(6):16-26 (1988).

Chen, Juin-Hwey, "A Robust Low-Delay CELP Speech Coder at 16 Kbits/s", CH2682-3/89/0000-1237, IEEE, pp. 1237-1241 (1989).

Chiariglione et al., "Multimedia Communication at the Basic ISDN Access", CH2190-7/85/0000-0363, IEEE, pp. 363-367 (1985).

Chiou et al., "*Gatenet*: A Voice/Data Internet Transport System", *IEEE Infocom '86: Fifth Annual Conference*, Apr. 8-10, 1986, Miami, Florida, pp. 39-46 (1986).

Chlamtac, Imrich, "An Ethernet Compatible Protocol for Real-Time Voice/Data Integration", *Computer Networks and ISDN Systems*, 10(2):81-96 (1985).

Chlamtac et al., "Performance of Integrated Services (Voice/Data) CSMA/CD Networks", ACM 0-89791-169-5/85/007/0087, pp. 87-93 (1985).

Choi et al., "An Efficient Multiplexing Technique for Packet-Switched Voice/Data Networks", *Proceedings of the IEEE*, 76(9):1254-1256 (1988).

Chujo et al., "Personal Communication Terminals for ISDN", *Globecom '87*, Nov. 15-18, 1987, Tokyo, Japan, pp. 19.4.1 - 19.4.5 (1987).

Claiborne, "Natural MicroSystems Corp. Watson 1200; Hardware Review; one of three evaluations of voice-mail expansion boards in 'Voice-mail boards link telephone and PC.'; evaluation", *PC Week*, 7(40):124 (1990).

Clark et al., "Supporting Real-Time Applications in an Integrated Services Packet Network: Architecture and Mechanism", ACM 0-89791-526-7/92/0008/0014, pp. 14-26 (1992).

Cohen, Danny, "A Network Voice Protocol NVP-II", USC/Information Sciences Institute, 71 pages (dated 1981).

Cohen, Danny, "Packet communication of online speech", *1981 National Computer Conference*, May 4-7, 1981, Chicago Illinois, Conference Proceedings, pp. 169-176 (1981).

Cohen, Danny, "Satellite Communication of Real-Time Packet Video Images", Preprinted from the *Proceedings of the Seventh International Conference on Computer Communication*, Sydney, Australia, Oct. 30, Nov. 2, 1984, pp. 1-8 (1984).

Cohen, Danny, "Specifications for the Network Voice Protocol (NVP)", *NSC Note 68*, 35 pages (1977).

Cohen, Danny, "Using Local Area Networks for Carrying Online Voice", *Local Computer Networks*, North-Holland Publishing Company, Amsterdam, pp 13-21 (1982).

Cohen, Danny, "A Voice Message System", *Proceedings of the IFIP TC-6 International Symposium on Computer Message Systems*, Apr. 6-8, 1981, Ottawa, Canada, pp. 17-28 (1981).

Cole, Randy, "Packet Voice: When it Makes Sense", *Speech Technology*, pp. 52-61 (Sep./Oct. 1982).

Cole, Randy, "PVP-A Packet Video Protocol", *Information Sciences Institute, University of Southern California*, 15 pages (dated 1981).

Coulson et al., "Group Presentation of Multimedia Applications in IXION", In *Computer Communications*, 14(4):205-215 (1991).

Crauwels et al., "Voice Response for Data Processing Equipment", *IBM Technical Disclosure Bulletin*, 24(11B):5890-5895 (1982).

Crowcroft et al., "Multimedia TeleConferencing over International Packet Switched Networks", *TriComm '91: IEEE Conference on Communications Software: Communications for Distributed Applications & Systems*, Apr. 18-19, 1991, Chapel Hill, North Carolina, pp. 23-33 (1991).

Cruz et al., "Tools to Support Conversational Multimedia", *Globecom '91: IEEE Global Telecommunications Conference*, Dec. 2-5, 1991, Phoenix, Arizona, Conference Record, vol. 3 of 3, pp. 2064-2068 (1991).

Csenger, Network World. "Micom boosts voice compression, adds fax feature to muxes". Nov. 7, 1994. 1 page. Labeled MT46914.

Cuperman et al., "Backward Adaptive Configurations for Low-delay Vector Excitation Coding", *Advances in Speech Coding*, pp. 13-23 (Jan. 1, 1996).

*Data Sources*, 11(2):G-38 (1992).

Davies et al., "Experiences of Handling Multimedia in Distributed Open Systems", *Published in Proc. 3rd Usenix International Symposium on Experiences with Distributed and Multiprocessor Systems*, Newport Beach, CA, USA, Mar. 1992, 19 pages (1992).

Davies et al., "A Technological Perspective on Multimedia Computing", *Computer Communications*, 14(5):1-19 (1992).

Decina et al., "Voice by the Packet?", *IEEE Journal on Selected Areas in Communications*, SAC-1(6):961-962 (1983).

Delgrossi et al., "HeiTP-A Transport Protocol for ST-II", 0-7803-0608-2/92/53, IEEE 1 page (1992).

DeSchon, Annette, "Voice Terminal (VT) Program", *USC Information Sciences Institute*, 20 pages (dated 1991).

DeTreville et al., "A Distributed Experimental Communications System", *IEEE Journal on Selected Areas in Communications*, SAC-1(6):1070-1075 (1983).

Devault et al., "The 'Prelude' ATD Experiment: Assessments and Future Prospects", *IEEE Journal on Selected Areas in Communications*, 6(9):1528-1537 (1988).

Doll, Dixon R., "Data Communications: Facilities, Networks, and Systems Design", John Wiley & Sons, New York (1978).

Donovan, Terry, "The mux and modem march on", *Communicate*, pp. 30-33 (1990).

Dunlap, Jr. et al., "Personal Computer Communications Via Telephone Facilities", *IEEE Journal on Selected Areas in Communications*, SAC-3(3):399-407 (1985).

Dunlop, John, "Techniques for the integration of packet voice and data on IEEE 802.3 LANs", *Computer Communications*, 12(5):273-280 (1989).

Economou et al., "FBC-Net: a reverse round robin LAN for voice and data traffic", *Computer Communications*, 14(1):44-52 (1991).

Eigen, Daryl J., "Narrowband and Broadband ISDN CPE Directions", *IEEE Communications Magazine*, pp. 39-46 (Apr. 1990).

Eigen et al., "Subscriber Access to Broadband ISDN", CH2298-9/86/0000-1410, IEEE, pp. 1410-1415 (1986).

Elbert, Bruce R., "Private Telecommunication Networks", Artech House, Inc., Norwood, Massachusetts (1989).

Elhakeem et al., "Spread-Spectrum Access to Mixed Voice-Data Local Area Networks", *IEEE Journal on Selected Areas in Communications*, SAC-1(6):1054-1057 (1983).

Erskine et al., "VoicePump: Voice-Over-Data Modem technology Utilizing ASM-CELP Speech Compression at 4800, 7200 and 9600 Bits per Second", *Proceedings of the International Conference on Signal Processing Applications and Technology*, 2:1425-1429 (Sep. 28, 1993).

Falk et al., "Integration of Voice and Data in the Wideband Packet Satellite Network", *IEEE Journal on Selected Areas in Communications*, SAC-1(6):1076-1083 (1983).

Fang, Russell J.P., "Personal and Thin-Route Communications via K-Band Satellite Transponders", CH2981-9-91-0000-1177, IEEE, pp. 1177-1182 (1991).

Feltman, "A Free Ride for Data". Apr. 1994 LAN Magazine. pp. 67-77. Labeled MT69895.

Ferrari et al., "A Scheme for Real-Time Channel Establishment in Wide-Area Networks", *IEEE Journal on Selected Areas in Communications*, 8(3):368-379 (1990).

Field et al., "α-Channel, A Network Level Abstraction to Support Real-Time Communication", *Computer Science Department*, University of Pittsburgh, 12 pages (date unknown).

Forgie, James W., "Voice Conferencing in Packet Networks", *ICC '80: International Conference on Communications*, Jun. 8-12, 1980, Seattle, Washington, Conference Record, vol. 1 of 3, 21.3.1 - 21.3.4 (1980).

Forgie et al., "An Efficient Packetized Voice/Data Network Using Statistical Flow Control", *1977 International Conference on Communications*, Jun. 12-15, Chicago, Illinois, vol. 3 of 3, pp. 44-48 (1977).

Forgie, James W., "Speech transmission in packet-switched store-and-forward networks", *AFIPS Conference Proceedings*, 1975 National Computer Conference, May 19-22, 1975, Anaheim, California, pp. 137-142 (1975).

Forsdick et al., "Explorations into Real-time Multimedia Conferencing", *Computer Message Systems*, 85:331-347 (1986).

Frangoudes et al., "Software for Broadband Systems: An ISDN Based Approach", pp. 286-291 (date unknown).

Friedman et al., "Packet Voice Communications Over PC-Based Local Area Networks", *IEEE Journal on Selected Areas in Communications*, 7(2):211-218 (1989).

Gaddis et al., "A Call Model For Multipoint Communication in Switched Networks", From *ICC '92: Proceedings of the IEEE International Conference on Communications*, pp. 609-615 (1992).

Gergaud et al., "Voice and Data Transmission", *IBM Technical Disclosure Bulletin*, 25(6):2727-2728 (1982).

Gergaud, C., "Voice Data Integration on a Transmission Link", *IBM Technical Disclosure Bulletin*, 26(11):5780-5781 (1984).

Gitman et al., "Economic Analysis of Integrated Voice and Data Networks: A Case Study", *Proceedings of the IEEE*, 66(11):1549-1570 (1978).

Gitman et al., "Issues in Integrated Network Design", *ICC 77: 1977 International Conference on Communications*, Jun. 12-15, Chicago, Illinois, Conference Record, vol. 3 of 3, pp. 38.1-36 - 38.1-43 (1977).

*Globecom '85: IEEE Global Telecommunications Conference*, Dec. 2-5, 1985, New Orleans, Louisiana, Conference Record, vol. 1 of 3, 1 page (2 copies) (1985).

*Globecom '92: IEEE Global Telecommunications Conference*, Dec. 6-9, 1992, Orlando, Florida, Conference Record, vol. 1 of 3, 1 page (1992).

Gold, Bernard, "Digital Speech Networks", Proceedings of the IEEE, 65(12):1636-1658 (1977).

Golestani, S. Jamaloddin, "Duration-Limited Statistical Multiplexing of Delay-Sensitive Traffic in Packet Networks", *IEEE Infocom '91: Tenth Annual Joint Conference of the IEEE Computer and Communications Societies*, Proceedings, vol. 1, pp. 0323-0332 (1991).

Gonet, P., "Fast packet approach to integrated broadband networks", *Computer Communications*, 9(6):292-298 (1986).

Gopalakrishnan et al., "Integrating voice and data SALAN: an experimental local area network", *Computer Communications*, 9(4):186-194 (1986).

Goutmann, Michel M., "Digital Conferencing Units, Third Quarterly Report", Defense Technical Information Center, AD18849, 36 pages (1974).

Gruber et al., "Performance Requirements for Integrated Voice/Data Networks", *IEEE Journal on Selected Areas in Communications*, SAC-1(6):981-1005 (1983).

Gulick et al., "Interface the ISDN to your PC with a Voice/Data Board", *Electronic Design*, 35(29):85-88 (Dec. 10, 1987).

Guy, "Rapid Relay Technology". The Foundation of MICOM's Data/Voice Network Servers and Data/Voice Internetwork Nodes. Undated and Labeled MT69809-41.

Guy, "Supplemental Technology Overview". MICOM Communications Corp. Simi Velley, CA. Undated and Labeled MT46725-35.

Guy, "Fast Packet Multiplexing: A Technical Overview". MICOM Communications Corp. Simi Valley, CA. Undated and Labeled MT46708-16.

Hardwick, "The Data Link Layer", ISDN Design Professional and Technical Series. Title Page, Table of Contents, and pp. 46-48.

Hart et al., "A Low Cost System for Interactive Transmission of Text and Voice in Distance Education", *Second Symposium on Computer Conferencing and Allied Technologies*, University of Guelph, Guelph, Ontario, Canada, Jun. 1-4, 1987, pp. 263-269 (1987).

Hattori et al., "Integrated Digital Switching System with Queueing Storage Facility", *IEEE Transactions on Communications*, COM-30(8):1900-1905 (1982).

Heggestad, Harold M., "Voice and Data Communications on an Experimental Wideband Internetwork System", *Journal of Telecommunication Networks*, pp. 131-146 (date unknown).

Hoberecht, William L., "A Layered Network Protocol for Packet Voice and Data Integration", *IEEE Journal on Selected Areas in Communications*, SAC-1(6): 1006-1013 (1983).

Honda et al., "Communications Processing Gateway Switching System", Review of the Electrical Communication Laboratories, 32(6):957-966 (1984).

Hopper, Andy, "Design and Use of High-Speed Networks in Multimedia Applications", Published in *Proceedings of 3$^{rd}$ IFIP Conference on High Speed Networking Berlin*, Mar. '91, 15 pages (1991).

Hopper, Andy, "Digital Video on Computer Workstations", To be published in *Proceedings of Eurographics '92*, Sep. 1992, 15 pages (dated 1992).

Hopper, Andy, "Pandora-an experimental system for multimedia applications", published in *Operating Systems Review*, pp. 1-16 (dated Jan. 12, 1990).

Hosoda et al., "A 32 kbit/s ADPCM Algorithm Having High Performance for Both Voice and 9.6 kbit/s Modem Signals", *IEEE Journal on Selected Areas in Communications*, pp. 262-272 (1988).

Huang et al., "MHTP-A Multimedia High-Speed Transport Protocol", *Globecom '92: IEEE Global Telecommunications Conference*, Dec. 6-9, 1992, Conference Record, vol. 3 of 3, pp. 1364-1369 (1992).

Huang et al., "Multifunction Workstation Integrated Voice/Data/Graphics for the ISDN Environment", *IEEE Pacific Rim Conference on Communications, Computers and Signal Processing*, May 9-10, 1991, Victoria, B.C., Canada, Conference Proceedings, vol. 2 of 2, pp. 441-444 (1991).

Huang, Nian-Chyi, "An Integrated Voice/Data Network Architecture using Virtual Circuit Switching", CH2190-7/85/0000-0542, IEEE, pp. 542-546 (1985).

Huelamo et al., "End User Premises Equipment and Terminals for Broadband Applications", *Electrical Communication*, 64(2/3), 11 pages (1990).

Ibe et al., "Treenet: an Integrated Metropolitan Area Network", *Globecom '85: IEEE Global Telecommunications Conference*, Dec. 2-5, 1985, New Orleans, Louisiana, Conference Record, vol. 1 of 3, pp. 262-266 (1985).

Ichikawa et al., "High-Speed Packet Switching Systems for Multimedia Communications", *IEEE Journal on Selected Areas in Communications*, SAC-5(8):1336-1345 (1987).

Isozaki, Kiyoshi, "Commercial Captain System", *JTR*, pp. 246-253 (Oct. 1983).

Jacobson, V., "TCP Extensions for High Performance", *Network Working Group*, 35 pages (dated 1992).

Jacobson et al., "TCP Extension for High-Speed Paths", *Network Working Group*, 20 pages (dated 1990).

Jacobson, D.W., "Design and Implementation of an Integrated Voice, Data, and Video Services Network", *IEEE Pacific Rim Conference on Communications, Computers and Signal Processing*, Jun. 1$^{st}$ -2$^{nd}$, 1989 Victoria, B.C., Canada, pp. 500-505 (1989).

Janakiraman, Natesa, "An Overview of Recent Developments in the Designs and Applications of Customer Premises Switches", *IEEE Communications Magazine*, 23(10):32-45 (1985).

Jander, Mary, "A Voice/Data/Fax Multiplexer", *New Products/WAN*, 19(6):146 (1990).

Jander, Mary, "Voice over packet networks: A solution available now", *Data Communications*, 19(2):129 (1990).

Jeffay et al., "Designing a Workstation-Based Conferencing System Using the Real-Time Producer/Consumer Paradigm", Defense Technical Information Center, AD-A242 046, 20 pages (1990).

Jeffay et al., "Kernel Support for Live Digital Audio and Video", *University of North Carolina at Chapel Hill, Department of Computer Science*, pp. 10-20 (date unknown).

Jenq, Yih-Chyun, "Performance Analysis of a Packet Switch Based on Single-Buffered Banyan Network", *IEEE Journal on Selected Areas in Communications*, SAC-1(6):1014-1038 (1983).

Johnson et al., "A Local Access Network for Packetized Digital Voice Communication", *IEEE Transactions on Communications*, COM-29(5):679-688 (1981).

Johnston et al., *AT&T News Release*, Monday, Jan. 6, 1992, 2 pages.

Jordan et al., "Communications and Networking for the IBM PC", Robert J. Brady Company, Bowie Maryland, 3 pages (1983).

JP 63054052, Patent Abstracts of Japan, vol. 15, No. 397 (E-1120), Oct. 8, 1991.

JP 3162052, Patent Abstracts of Japan, vol. 12, No. 273 (E-639), Jul. 29, 1988.

Kadoch et al., "A Distributed Queue Metropolitan Area Network for Combined Video, Voice, Wideband Data and Narrowband Data", *IEEE Global Telecommunications Conference & Exhibition*, Nov. 27-30, 1989, Dallas, Texas, Conference Record, vol. 1 of 3, pp. 0152-0156 (1989).

Kamae, T., "Visual Terminals and User Interfaces", pp. 257-278 (date unknown).

Kamae, T., "Voice/Data Integration in the INS Model System and Local Area Networks", *IEEE Communications Magazine*, 24(12):7-15 (1986).

Kamae et al., "Customer Equipment for New Services in INS Model System", *Proceedings of the Seventh International Conference on Computer Communication*, Sydney, Australia, Oct. 30 - Nov. 2, 1984, pp. 72-76 (1984).

Kapauan et al., "Wideband Packet Access for Workstations: Integrated Voice/Data/Image Services on the UNIX PC", CH2298-9/86/0000-1439, IEEE, pp. 1439-1441 (1986).

Kashorda et al., "Simultaneous Voice/Data Transmission over a Single 64 Kb/s ISDN Bearer Channel", *Third IEE Conference on Telecommunications*, Institution of Electrical Engineers, London, pp. 281-300 (1991).

Kessler, Gary C., "ISDN: Concepts, Facilities, and Services", McGraw-Hill, Inc., New York, pp. 224-231 (1990).

Kim, Byung G., "Characterization of Arrival Statistics of Multiplexed Voice Packets", *IEEE Journal on Selected Areas in Communications*, SAC-1(6):1133-1141 (1983).

Kim, Byung G., "Integrated Voice/Data Multiplexers with Slotted and Nongated Packet Services", *IEEE Transactions on Communications*, 36(2):228-231 (1988).

Kim et al., "Dynamic Flow Control Protocols for Packet-Switching Multiplexers Serving Real-Time Multipacket Messages", *IEEE Transactions on Communications*, COM-34(4):348-356 (1986).

Kimura et al., "Basic Scheme for the INS Network", *Review of the Electrical Communications Laboratories*, 33(5):751-756 (1985).

King, Tony, "Pandora: An Experiment in Distributed Multimedia", To be published in the *Proceedings of Eurographics '92*, Sep. 1992, 12 pages (1992).

Kishimoto et al., "Simultaneous Transmission of Voice and Handwriting Signals: Sketchphone System", *IEEE Transaction on Communication*, COM-29, 12, pp. 1982-1986, (Dec. 1981).

Kitawaki et al., "Speech Coding Technology for ATM Networks", *IEEE Communications Magazine*, pp. 21-27 (Jan. 1990).

Kleckner, C. C., "A New Family of Modems for Faster Data Communications", 3 pages (date unknown).

Kobayashi et al., "Videotex Terminals for the INS Model System", *Review of the Electrical Communication Laboratories*, 33(2):277-283 (1985).

Komiya et al., "An approach to the multifunction graphic terminal for the ISDN environment", *IEEE Global Telecommunications Conference and Exhibition*, 1:32-36 (Nov. 28, 1988).

Kositpaiboon et al., "Packetized Radiographic Image Transfers over Local Area Networks for Diagnosis and Conferencing", *IEEE Journal on Selected Areas in Communications*, 7(5):842-856 (1989).

Kramer, Matt, "Integrated voice/data circus comes to town", *PC Week*, 7(11):63, 4 pages (1990).

Krol, Ed, "Faster Than a Speeding Modem . . . Able to Cary Voice and Data over a Single Telephone Line . . . It's ISDN", *UIUCnet V5-7*, 3 pages (1992).

Kuhar, E., "Digital Data Communication over Twisted Pair Voice Telephone Wiring", *IBM Technical Disclosure Bulletin*, 25(7A):3482-3487 (1982).

Laube, M., "Audiographic Terminal", *Electrical Communication*, 60(1) (1986).

Lee et al., "Performance Analysis of Statistical Voice/Data Multiplexing Systems with Voice Storage", *IEEE Transactions on Communications*, COM-33(8):809-819 (1985).

Leung et al., "A Set of Operating System Mechanisms to Support Multi-Media Applications", *1988 International Zurich Seminar on Digital Communications*, Mar. 8-10, 1988, Eth Zurich, Switzerland, pp. B4.1 - B4.6 (1988).

Leung et al., "A Software Architecture for Workstations Supporting Multimedia Conferencing in Packet Switching Networks", *IEEE Journal on Selected Areas in Communications*, 8(3):380-390 (1990).

Leung et al., "The Throughput Efficiency of the Go-Back-N ARQ Scheme Under Markov and Related Error Structures", *IEEE Transactions on Communications*, 36(2):231-234 (1988).

Leydekklers et al., "Synchronization of Multimedia Data Streams in Open Distributed Environments", pp 94-104 (date unknown).

Lichtenberg et al., "Digital PABX Range for the Evolving ISDN", *Electrical Communication*, 61(1), 10 pages (1987).

Little et al., "Scheduling of Bandwidth-Constrained Multimedia Traffic", pp. 120-131 (date unknown).

Liu et al., "A Modified ATM Scheme for Low Bit Rate Multi-Media Applications", CH 3006-4/91/0000-1033, IEEE, pp. 1033-1036 (date unknown).

Loudermilk et al., "CDPD: a network that wants the airwaves: cellular technology is primed for growth", PC Week, 9(49):26 5 pages (1992).

Loudermilk, Stephen, "Radish system lets phone users send voice, data simultaneously", *PC Week*, 9:(19):53 (1992).

Mahmoud et al., "An Integrated Voice/Data System for VHF/UHF Mobile Radio", *IEEE Journal on Selected Areas in Communications*, SAC-1(6):1098-1111 (1983).

Maise et al., "Experiments in Wideband Packet Technology", *Digital Communications: New Directions in Switching and Networks, Proceedings of the International Seminar*, Zurich, Switzerland, Mar. 11-13, 1986, IEEE Switzerland Chaper on Digital Communication Systems, pp. 135-139 (1986).

Malek, Manu, "Integrated Voice and Data Communications Overview", *IEEE Communications Magazine*, 26(6):5-15 (1988).

Malyat et al., "Using Reservation-Virtual-Time CSMA with Split-Channel Reservation for Packet Voice and Data", pp. 209-212 (date unknown).

McBain, Alistiar, "The GEC 420 DataPhone—terminal for the ISDN", Computer Communications, 11(1):32-36 (1988).

McCanne, Steven, "A Distributed Whiteboard for Network Conferencing", Computer Science Division, Electrical Engineering and Computer Science, University of California, Berkeley, 13 pages (1992).

McNamara, R.P., "Metronet: An Overview of a CATV Regional Data Network", *Eascon '81: IEEE Electronics and Aerospace Systems Conventions*, Nov. 16-19, 1981, Washington, D.C., pp. 249-253 (1981).

McNamara, R.P., "Some Considerations of the Voice-Data Capabilities of Broadband Cable Networks", *Compcon 82: Twenty-Fourth IEEE Computer Society International Conference*, Feb. 22-25, 1982, San Francisco, California, digest of papers, pp. 312-314 (1982).

Mednick, Ralph, "Office Information Network: An Integrated LAN", *Globecom '85: IEEE Global Telecommunications Conference*, Dec. 2-5, 1985, New Orleans, Louisiana, Conference Record. vol. 1 of 3, pp. 451-456 (1985).

Mera et al., "Multimedia Communication Terminal for Broadband Network", *Globecom '87*, Nov. 15-18, 1987, Tokyo, Japan, pp. 19.2.1 - 19.2.5 (1987).

Merritt, Ian H., "Providing Telephone Line Access to a Packet Voice Network", *Information Sciences Institute*, ISI/RR-83-107, 15 pages (1983).

Metcalfe et al., "Ethernet: Distributed Packet Switching for Local Computer Networks", reprinted from *Communications of the ACM*, 19(5):395-404 (1976).

Mills et al., "A Data and Voice System for the General Service Telephone Network", *Proceedings of the International Conference on Industrial Electronics, Control, and Instrumentation*, pp. 1143-1148 (Nov. 1987).

Mochizuki et al., "Digital Videotex System", *Review of the Electrical Communication Laboratories*, 32(6):1044-1050 (1984).

Montgomery, Warren A., "Techniques for Packet Voice Synchronization", *IEEE Journal on Selected Areas in Communications*, SAC-1(6):1022-1028 (1983).

Morikawa et al., "Hardware Design of Integrated Centralized Extension System", *Review of the Electrical Communication Laboratories*, 32(2):325-332 (1984).

Mowafi et al., "Integrated Voice/Data Packet Switching Techniques for Future Military Networks", *IEEE Transactions on Communications*, COM-28(9):1655-1662 (1980).

Muraoka et al., "Communication Processing Services in INS Model System", *Proceedings of the Seventh International Conference on Computer Communication*, Sydney, Australia, Oct. 30, Nov. 2, 1984, pp. 66-71 (1984).

Musser et al., "A Local Area Network as a Telephone Local Subscriber Loop", *IEEE Journal on Selected Areas in Communications*, SAC-(6):1046-1069 (1983).

Nash et al., "Simultaneous Transmission of Speech and Data over an Analog Telephone Channel", CH2190-7/85/0000-0094, IEEE, pp. 4.2.1-4.2.4 (1985).

Newman, Bill, "An ISDN Data and Voice Terminal Based on a Personal Computer", *Globecom '85: IEEE Global Telecommunications Conference*, Dec. 2-5, 1985, New Orleans, Louisiana, Conference Record, vol. 3 of 3, pp. 1048-1052 (1985).

Newton, Brochures. "Every Man's Network", including "The Network Goes Digital", "Understanding the New Networking", "Some Case Studies", "A Commonly Asked Networking Questions", "How to Manage a Network", "A Networking Glossary". pp. 4-19. Undated and Labeled MT69492-507.

Nicolaou, Cosmos, "An Architecture for Real-Time Multimedia Communication Systems", *IEEE Journal on Selected Areas in Communications*, 8(3):391-400 (1990).

Noerpel et al., "Radio Link Access Procedure for a Wireless Access Communications System", *IEEE*, 2:1111-1115 (1994).

Nojima et al., "Integrated Services Packet Network Using Bus Matrix Switch", *IEEE Journal on Selected Areas in Communications*, SAC-5(8):1284-1292.

Nussbaum, Eric, "Communications Network Needs and Technologies—A Place for Photonic Switching?", EH0301-2/91/0000/0441, IEEE, pp. 441-448 (1988).

O'Leary, G.C., "Local Access Area Facilities for Packet Voice", *Proceedings of the Fifth International Conference on Computer Communication*, Oct. 27-30, 1980, Atlanta, Georgia, pp. 281-286 (1980).

O'Leary et al., "A modular approach to packet voice terminal hardware design", *1981 National Computer Conference*, May 4-7, 1981, Chicago Illinois, Conference Proceedings, pp. 183-189 (1981).

Ohmori et al., "Facsimile Intelligent Communication System, Present and Future", *Review of the Electrical Communication Laboratories*, 31(4):463 (1983).

Oltmanns et al., "A Voice and Communications System for the IBM PC", *Speech Technology*, pp. 94-99 (Mar./Apr. 1986).

Opderbeck, H., "Throughput Degradations for Single Packet Messages", *UCLA-NMC, Network Working Group*, 6 pages (dated 1974).

Palmer et al., "DECspin: A Networked Desktop Videoconferencing Application", *Digital Technical Journal*, 5(2):1-13 (1993).

Palmer et al., "Desktop Meeting", *LAN Magazine* 6(11):111-121 (1991).

Pasquale et al., "Operating System and Window System Research for Distributed Multi-Media Applications: A Status Report", *UCSD Technical Report CS90-176*, Department of Computer Science and Engineering, University of California, San Diego, 17 pages (dated 1990).

Pennebaker et al. "A High Performance Freeze Frame Videoconferencing System", *IBM T. J. Watson Research Center*, 8 pages (date unknown).

Perkins, Roderick E., "Spider: an Investigation in Collaborative Technologies and their Effects on Network Performance", *Globecom '91: IEEE Global Telecommunications Conference*, Dec. 2-5, 1991, Phoenix, Arizona, Conference Record, vol. 3 of 3, pp. 2074-2080 (1991).

Perkins, D., "The Point-to-Point Protocol for the Transmission of Multi-Protocol Datagrams Over Point-to-Point Links", *Network Working Group*, 48 pages (dated 1990).

Phillips, "Branch-Office Muxes Make every Kbit Count". Multiplexers. Data Communications, Nov. 21, 1990. pp. 75-80. Labeled MT69882-887.

Pierce, Jr., "Don't Just Tell Them, Show Them!", Automation (Aug. 1990).

Product Catalog, title unknown, random collection of pages, 24 pages.

Product Catalog, title unknown, random collection of pages, 100 pages.

Radcliffe, "Video Calls Use Basic Phone Lines", *MacWeek* (Aug. 3, 1992).

Rahnema, "Overview of the GSM System and Protocol Architecture", IEEE Communications Magazine, Apr. 1993, 9 pages.

Rangan et al., "Software Architecture for Integration of Video Services in the Etherphone System", *IEEE Journal on Selected Areas in Communications*, 9(9): 1395-1404 (1991).

Raviraj et al., "An Integrated Services Local Area Network with Hybrid Access", *IEEE Infocom '89: Eighth Annual Joint Conference of the IEEE Computer and Communications Societies*, pp. 439-447 (1989).

Reynolds et al., "Voice File Interchange Protocol (VFIP)", *Network Working Group*, 5 pages (dated 1986).

Roberts, Lawrence G., "The Evolution of Packet Switching", *Proceedings of the IEEE* 66(11):1307-1313 (1978).

*Rockwell Application Note*, Doc. No. 29800N73, Order No. 873, (Oct. 1991).

Romkey, J., "A Nonstandard for Transmission of IP Datagrams over Serial Lines: SLIP", *Network Working Group*, 6 pages (dated 1988).

Rosner, Roy D., "Packet Switching: Tomorrow's Communications Today", Wadsworth, Inc., Belmont, California (1982).

Ross et al., "Approaches to the Integration of Voice and Data Telecommunications", *National Telecommunications Conference*, Nov. 27-29, 1979, Washington, DC, 46.6.1 - 46.6.8 (1979).

Ross, M.J., "Alternatives for Integrating Voice and Data", *1981 International Switching Symposium*, Montreal, Sep. 21-25, 1981, 8 pages (1981).

Rowe, J.W., "Service Protection in Managed Networks", *Third IEE Conference on Telecommunications*, The Insitution of Electrical Engineers, pp. 296-300 (1991).

Ruston et al., "Integrating Computing and Telecommunications: A tale of Two Architectures", pp. 57-68 (date unknown).

Rybczynski et al., "Interworking Between Packet Networks and Integrated Voice/Data Access Systems", *Links for the Future*, IEEE/Elsiver Science Publishers B. V., North-Holland, pp. 1309-1312 (1984).

Saito et al., "Voice Packet Communication System for Private Networks", *Globecom '89: IEEE Global Telecommunications Conference & Exhibition*, Nov. 27-30, 1989, Dallas Texas, Conference Record, vol. 3 of 3, pp. 1874-1878 (1989).

Saltzberg, Burton R., "Theoretical Foundations of Digital Communication", pp. 1-48 (date unknown).

Sammartino et al., "Desktop Multimedia Communications—Breaking the Chains", *ICC '91, International Conference on Communications*, Jun. 23-26, 1991, Denver, Colorado, Conference Record, vol. 1 of 3, pp. 0073-0077 (1991).

Sarin, Sunil, "Computer-Based Real-Time Conferencing Systems", CH0018-9192/85/1000-0033, IEEE, pp. 33-44 (1985).

Sasaki et al., "Variable rate voice coding system", *MILCOM*, 92(1):364-367 (Oct. 11, 1992).

Saunders, Stephen, "Voice Compression: When Less Is More", *Data Communications*, pp. 58-64 (Jul. 1991).

Schooler et al., "An Architecture for Multimedia Connection Management", *Reprinted from the Proceedings IEEE 4th Comsoc International Workshop on Multimedia Communications*, pp. 271-274, Monterey, CA (Apr. 1992), ISI Reprint Series ISI/RS-92-294, 6 pages (1992).

Schooler, Eve M., "Case Study: Multimedia Conference Control in a Packet-switched Teleconferencing System", Reprinted from *Journal of Internetworking: Research and Experience*, 4(2):99-120 (1993).

Schooler, Eve M., "The Connection Control Protocol: Specification", USC/Information Sciences Institute, 30 pages (dated 1992).

Schooler, Eve M., "A Distributed Architecture for Multimedia Conference Control", *ISI Research Report*, pp. 1-18 (1991).

Schooler et al., "Multimedia Conferencing: Has it come of age?", *Information Sciences Institute*, ISI/RS-91-286, 10 pages (1991).

Schooler et al., "A Packet-switched Multimedia Conferencing System", Information Sciences Institute, University of Southern California, pp. 12-22 (date unknown).

Schulzrinne, Henning, "A Transport Protocol for Audio and Video Conferences and other Multiparticipant Real-Time Applications", Dept. of Computer Science, University of Massachusetts at Amherst, 21 pages (dated 1992).

Schulzrinne, Henning, "Voice Communication Across the Internet: A Network Voice Terminal", Dept. of Computer Science, University of Massachusetts at Amherst, 35 pages (dated 1992).

Schwartz, Mischa, "Telecommunication Networks: Protocols Modeling and Analysis", Addison-Wesley Publishing Company, Menlo Park, California (1987).

Scott et al., "Communications Support for Multimedia Workstations", *Third IEE Conference on Telecommunications*, Institution of Electrical Engineers, London, pp. 67-72 (1991).

Seveque et al., "In-House ISDN Applications", *Electrical Communication*, 63(1):17-24 (1989).

Shacham et al., "Speech Transport in Packet-Radio Networks with Mobile Nodes", *IEEE Journal on Selected Areas in Communications*, SAC-1(6):1084-1097 (1983).

Sharrock et al., "A Framed, Movable-Boundary Protocol for Integrated Voice/Data in A LAN", ACM 0-89791-201-2/86/0800-0111, IEEE, pp. 111-119 (1986).

Shepherd et al., "Protocol Support for Distributed Multimedia Applications", Presented at *Second International Workshop on Network and Operating System Support for Digital Audio and Video, IBM ENC*, Heidelberg, Germany, Nov. 18-19 1991, 13 pages (1991).

Sherman, Ken, "Data Communications: A User's Guide", Prentice-Hall, Inc., Englewood Cliffs, New Jersey, pp. 296-407 (1990).

Shieh et al., "Decentralized token-CSMA/CD protocol for integrated voice/data LANs", *Computer Communications*, 14(4):223-230 (1991).

Shoch, John, "Carrying Voice Traffic Through an Ethernet Local Network: A General Overview", *Local Networks for Computer Communications*, North-Holland Publishing Company, Amsterdam, pp. 429-446 (1981).

Sipos, E., "Communication System", *IBM Technical Disclosure Bulletin*, 12(11):2029-2030 (1970).

Smith, Tom, "ACT to intro sub T-1 voice/data/fax mux; SDM-T will support data rates up to 64K bit/sec and compress voice signals by as much as 8-to-1", *Network World*, p. 31 (Apr. 16, 1990).

Smith et al., "Voice/Data Concentrator", *IBM Technical Disclosure Bulletin*, 21(8):3066-3067 (1979).

Smith, "Wrist TVs Still Fiction, but Police Videophones Take Hold", *TE&M* (Dec. 15, 1987).

Sohraby et al., "ISDN Primary Rate Interface Impact on Performance of Integrated on CSMA/CD Networks--A measurement and Simulation Study", *Globecom '90: IEEE Telecommunications Conference & Exhibition*, Dec. 2-5, 1990, San Diego, California, Conference Record, vol. 2 of 3, pp. 0912-0919 (1990).

Sparrell, Duncan, "Wideband Packet Technology", *IEEE Global Telecommunications Conference & Exhibition*, Nov. 28-Dec. 1, 1988, Hollywood, Florida. Conference Record, vol. 3 of 3, pp. 1612-1616 (1988).

Spilling et al., "Digital Voice Communications in the Packet Radio Network", *ICC '80: International Conference on Communications*, Jun. 8-12, 1980, Seattle, Washington, Conference Record, vol. 1 or 3, 21.4.1 - 21.4.7 (1980).

Spragins et al., "Telecommunications - Protocols and Design", *Communications Equipment Interface Design*, Chapter 4, Addision-Wesley Publishing Company, pp. 156, 304, and 327 (1991).

Sriram et al., "Discrete-Time Analysis of Integrated Voice/Data Multiplexers With and Without Speech Activity Detectors", *IEEE Journal on Selected Areas in Communications*, SAC,1(6):1124-1132 (1983).

Stallings, William, "ISDN: An Introduction", Macmillan Publishing Company, New York, 3 pages (1989).

Stallings, "Protocols and Architecture", *Data and Computer Communications*, 2nd Edition, pp. 100-103 (1988).

Stallings, William.. ISDN and Broadband ISDN, Second Edition. Copyright © 1992 by MacMillan Publishing Company, a division of Macmillan, Inc. Entire Book.

Stern, H. P., "An Improved Integrated Voice/Data Mobile Radio System", CH2846-4/90/0000-0311, IEEE, pp. 311-316 (1990).

Stern, H.P., "Design and Performance Analysis of an Integrated Voice/Data Mobile Radio System", CH2682-3/89/0000-0433, IEEE, pp. 0433-0437 (1989).

Stevens, Jim, "Much More Idle Chatter About Reference Models", 9 pages (dated 1987).

Sudhakar et al., "Design and Performance Evaluation Considerations of a Multimedia Medical Database", *IEEE Transactions on Knowledge and Data Engineering*, 5(5):888-894 (1993).

Sunshine et al., "Broad-Band Personal Computer LAN's", *IEEE Journal on Selected Areas in Communication*, SAC-3(3):408-415 (1985).

Swinehart, Daniel C., "Telephone Management in the Etherphone System", *Globecom '87*, Nov. 15-18, 1987, Tokyo, Japan, pp. 30.3.1-30.3.5 (1987).

Taka et al., "Low-Bit-Rate Speech Codecs and Wideband Speech Codecs", *Review of the Electrical Communications Laboratories*, 36(1):46-55 (1988).

Takase et al., "An Experimental B-ISDN System for Man Application Study", *Globecom '91: Global Telecommunications Conference*, Dec. 2-5, 1991, Phoenix, Arizona, Conference Record, vol. 3 of 3, pp. 2100-2104 (1991).

Tamamura et al., "Picture and Audio Information Retrieval Service Using 65Kb/s Digital Network", *Globecom '84: IEEE Global Telecommunications Conference*, Nov. 26-29, 1984, Atlanta, Georgia, Conference Record, vol. 1 of 3, pp. 323-327 (1984).

Tani et al., "High-speed Multimedia Communication System on A Wideband LAN", *Globecom '87*, Nov. 15-18, 1987, Tokyo, Japan. pp. 577-581 (1987).

Terek et al., "Experiences with Audio Conferencing Using the X Window System, UNIX, and TCP/IP", *Proceedings of the Summer 1991 Usenix Conference*, pp. 405-418 (1991).

Thompson, Geoff, "RE: 802.3 Full Duplex vs. CSMA/CD", retrieved from <http://www.hep.net/mail/802exec/tojul97/0334.html>, 5 pages (dated 1996).

Tobagi et al., "Expressnet: A High-Performance Integrated-Services Local Area Network", *IEEE Journal on Selected Areas in Communications*, SAC-1(5):898-913 (1983).

Tomcik et al., "Facsimile Compression Through Demodulation in Packet Networks", *Globecom '92: IEEE Global Telecommunications Conference*, Dec. 6-9, 1992, Orlando, Florida, Conference Record, vol. 3 of 3, pp. 1699-1703 (1992).

Tominaga et al., "Comparison of Coding Schemes for Telewriting Systems", *ICCC* (1986).

Tom Sheldon's Linktionary—Networking Defined and Hyperlinked. "LAP (Link Access Procedure". 2 pages. Retrieved from the Internet Apr. 29, 2004 (Google Search) http://www.linktionary.com/l/lap.html.

Tomsu et al., "ITT 5200 BCS, Digital Integrated Voice and Data Communication System", CH2175-8/85/000-0855, IEEE, pp. 855-862 (1985).

Tsuda et al., "An Approach to Multi-Service Subscriber Loop System Using Packetized Voice/Data Terminals", *The International Symposium on Subscriber Loops and Services*, Mar. 20-24, 1978, Georgia Institute of Technology, Atlanta, Georgia, IEEE cat. no. 78CH1279-9 COM, pp. 161-165 (1978).

Tsuruta et al., "Intelligent Communication Terminal for Integrating Voice, Data and Video Signals", *ICC '86*, Jun. 22-25, 1986, Toronto, Canada, Conference Record, vol. 3 of 3, pp. 1509-1513 (1986).

Turner, Jonathan S., "Design of an Integrated Services Packet Network", *IEEE Journal on Selected Areas in Communications*, SAC-4(3):1373-1380 (1986).

*U.S. West Caller ID*, 1 p. (Jul. 18, 1994).

Ueda et al., "Evaluation of an Experimental Packetized Speech and Data Transmission System", *IEEE Journal on Selected Areas in Communications*, SAC-1(6):1039-1045 (1983).

Ulug et al., "Statistical Multiplexing of Data and Encoded Voice in a Transparent Intelligent Network", Carleton University, Ottawa, Canada, 7 pages (date unknown).

Unagami, Shigeyuki, "Prospects of High-speed Voice Band Modems", *Technical Survey*, 73(10):1082-1086 (1990).

Vakulenko et al., "The UPS-2.4 Modem", Originally published in *Electrosryz*, No. 3, 1989, pp. 45-49, Scripts Technica, Inc., pp. 23-27 (1990).

Vin et al., "Hierarchical Conferencing Architectures for Inter-Group Multimedia Collaboration", *Proceedings of the ACM Conference on Organizational Computing Systems*, Atlanta, Georgia, Nov. 5-8, 1991, 12 pages (1991).

Vin et al., "Multimedia Conferencing in the Etherphone Environment", *Computer*, 24(10):69-79 (1991).

Wakerly, John, "A Voice/Data/Packet Switching Architecture", CH2135-2/85/0000/CT94301, IEEE, pp. 194-199 (1985).

Wang et al., "Priority Statistical Multiplexer Design for SNA*/SDLC Access to a Virtual-Circuit Packet Network", *AT&T Technical Journal*, 67(6):69-86 (1988).

Wee, Jean, "Coming to S'pore: worldwide face-to-face contact through PCs", *Business Times*, 1 page (Mar. 23, 1991).

Weinstein et al., "Experience with Speech Communication in Packet Networks", *IEEE Journal on Selected Areas in Communications*, SAC-1(6):963-980 (1983).

Weiss, Christoph, "Connection of Video Communication Equipment to a Broadband Network", CH2298-9/86/0000-1428, IEEE, pp. 1428-1433 (1986).

Weiss, Christoph, "Desk Top Video Conferencing—An Important Feature of future Visual Communications", *ICC '90: IEEE International Conference on Communications, Conference Record*, vol. 1 of 4, pp. 0134-0139 (1990).

White, Patrick E., "The Role of the Broadband Integrated Services Digital Network", *IEEE Communications Magazine*, 29(3):116-119 (1991).

Wieselthier et al., "A Movable-Boundary Channel-Access Scheme for Integrated Voice/Data Networks", *IEEE Infocom '91: Tenth Annual Joint Conference of the IEEE Computer and Communications Societies*, Apr. 7-11, 1991, Bal Harbour, Florida, pp. 0721-0731 (1991).

Williams et al., "Maximum Utilisation of an Existing Optical Trunk Network", *Third IEE Conference on Telecommunications*, The Institution of electrical Engineers, pp. 202-295 (1991).

Wong et al., "An Integrated Services Token-Controlled Ring Network", *IEEE Journal on Selected Areas in Communications*, 7:670-678 (1989).

Wu et al., "Capacity Allocation for Integrated Voice/Data Transmission at a Packet Switched TDM", *IEEE Transactions on Communications*, 40(6):1059-1069 (1992).

Yamada et al., "Multimedia High-Throughput X.25 Packet Switching System", NTT Review, 1(2):82-88 (1989).

Yashiro et al., "High-Speed High-Throughput Packet Switching System for Multimedia Communications", *IEEE Global Telecommunications Conference & Exhibition*, Nov. 28-Dec. 1, 1988, Hollywood, Florida, Conference Record, vol. 1 or 3, pp. 0435-0439 (1988).

Zellweger et al., "An Overview of the Etherphone System and its Applications", 2$^{nd}$ *IEEE Conference on Computer Workstations*, Mar. 7-10, 1988, Santa Clara, California, pp. 160-168 (1988).

Ziegler et al., "Mechanisms for Integrated Voice and Data Conferencing", ACM 089791-405-8/90/0009/0101, IEEE, pp. 101-107 (1990).

Ziegler et al., "Multimedia Conferencing on Local Area Networks", *Computer*, 23(9):52-61 (1990).

*Microsoft Corp.*, v. *Multi-Tech. Sys., Inc.*, Civil Nos. 03-1138 (Fed. Cir. Feb. 3, 2004).

* cited by examiner

COMPUTER-BASED MULTIFUNCTIONAL PERSONAL COMMUNICATION SYSTEM WITH CALLER ID

This patent application is a continuation of U.S. Ser. No. 09/400,607 filed on Sept. 20, 1999, which is a continuation of U.S. application Ser. No. 08/338,340 filed Nov. 10, 1994, now U.S. Pat. No. 6,009,082, which is a Continuation-in-part of U.S. application Ser. No. 08/002,467, filed Jan. 8, 1993 entitled "COMPUTER-BASED MULTIFUNCTION PERSONAL COMMUNICATIONS SYSTEM", now U.S. Pat. No. 5,452,289, the complete applications of which, including any microfiche appendix, are all hereby incorporated by reference.

FIELD OF THE INVENTION

The present invention relates to communications systems and in particular to computer assisted digital communications including data, fax, digitized voice and caller identification information.

BACKGROUND OF THE INVENTION

A wide variety of communications alternatives are currently available to telecommunications users. For example, facsimile transmission of printed matter is available through what is commonly referred to as a stand-alone fax machine. Alternatively, fax-modem communication systems are currently available for personal computer users which combine the operation of a facsimile machine with the word processor of a computer to transmit documents held on computer disk. Modem communication over telephone lines in combination with a personal computer is also known in the art where file transfers can be accomplished from one computer to another. Also, simultaneous voice and modem data transmitted over the same telephone line has been accomplished in several ways.

The increased accessibility provided by telephone services and modems raises problems for controlling access to computer systems. Computer security systems have been developed which incorporate password programs to control access. These programs often monitor the number of times a particular user has logged onto a system. Systems which restrict access by limiting the number of attempted accesses in a given time period or by limiting the number of attempted accesses for a given password enable unauthorized users to "tie up" the system while they attempt to gain unauthorized access. When the system is tied up, authorized users may be prohibited from accessing the system due to repeated unsuccessful attempts by unauthorized users. In addition, such systems fail to guarantee that the unauthorized user will not gain access by guessing a correct password.

Another personal communications system access problem is gracefully restricting access to the personal communications system depending on the date or time of day. For example, the system operator of a BBS might want to restrict modem communications with the BBS between the hours of 8:00 a.m. and 6:00 p.m. to leave time for system maintenance duties.

Therefore, there is a need in the art for an access control system for a personal communications system which quickly rejects unauthorized users, and, preferably denies access before the unauthorized user has an opportunity to illegally enter the system. There is a further need for an access control system which screens callers without the use of a password system. Finally, there is a need in the art for a personal communications access system which screens calls based on date and time.

SUMMARY OF THE INVENTION

The present invention solves the aforementioned problems and shortcomings of the existing art and solves other problems not listed above which will become apparent to those skilled in the art upon reading and understanding the present specification and claims.

The present disclosure describes a complex computer assisted communications system which contains multiple inventions. The subject of the present multiple inventions is a personal communications system which includes components of software and hardware operating in conjunction with a personal computer. The user interface control software operates on a personal computer, preferably within the Microsoft Windows® environment. The software control system communicates with hardware components linked to the software through the personal computer serial communications port. The hardware components include telephone communication equipment, digital signal processors, and hardware to enable both fax and data communication with a hardware components at a remote site connected through a standard telephone line. The functions of the hardware components are controlled by control software operating within the hardware component and from the software components operating within the personal computer.

The major functions of the present system are a telephone function, a voice mail function, a fax manager function, a multi-media mail function, a show and tell function, a terminal function and an address book function. These functions are described in further detail in U.S. patent application Ser. No. 08/002,467 filed Jan. 8, 1993 entitled "COMPUTER-BASED MULTIFUNCTION PERSONAL COMMUNICATIONS SYSTEM", which has been incorporated by reference.

The hardware components of the present system include circuitry to enable digital data communication and facsimile communication over standard telephone lines.

The present disclosure also describes a system for personal communications system access control using a caller ID interface ("CID interface"). Many standard telephone carriers are encoding caller ID information which may be received before answering the telephone. One embodiment of the present invention decodes the incoming caller ID information and compares the present caller's identification information with a preprogrammed access matrix to determine if access to the modem is appropriate. The callers' identification information can be recorded and statistically tracked regardless of whether the callers are authorized and regardless of whether each call is answered.

In one embodiment of the present invention, the caller ID interface incorporates a ring detector, off-hook circuit, dc holding circuit, caller ID decoder, relay switching circuit, memory, and processor. The ring detector circuit is used to enable the caller ID decoder after the first ring, since most caller ID carriers encode the caller ID information using frequency shift keying transmission after the first telephone ring and before the second telephone ring. The caller ID decoder is connected to the telephone line (without answering the call) using the relay switching circuit between the first and second telephone ring to receive the incoming caller ID information. The off-hook circuit is used to hang up on an unwanted caller before actually answering the telephone.

In one embodiment of the present invention the caller ID interface acquires information about incoming calls by decoding the incoming caller ID information and storing it in memory. Statistical tracking of callers is performed on the stored caller ID information if desired by the personal communications system owner. Another embodiment of the present invention screens access by comparing a preprogrammed access matrix to details of the call such as the caller's name, caller's phone number, the time and date the call is made, and the number of previous accesses by that caller in a predefined time frame. A variety of preprogrammed criteria are utilized to control access to the personal communications system. For example, in one embodiment, screening by name and telephone number is performed on an inclusive (or exclusive) basis by preprogramming the caller ID interface with the names or telephone numbers of the callers with (or without) access privileges. The incoming call details obtained from the caller ID information are then compared to the inclusive (or exclusive) caller list to determine if the callers are authorized to access the personal communications system. In an alternate embodiment of the present invention the caller ID interface hangs up on an unauthorized caller, preventing the unauthorized caller even brief access.

Therefore, the present invention solves the deficiencies of the prior art by providing an apparatus and method for rapid database creation of incoming calls using caller ID information. One embodiment of the present invention also quickly rejects unauthorized callers, and may hang up on them instantly, rather than allow access to the modem. The screening process of the present invention need not use a password for caller authorization, since the caller ID information can be used to screen out unwanted callers. Yet another embodiment of the present invention screens incoming calls based on date and time.

DESCRIPTION OF THE DRAWINGS

In the drawings, where like numerals describe like components throughout the several views.

DETAILED DESCRIPTION OF THE PREFERRED EMBODIMENTS

Figure 1:
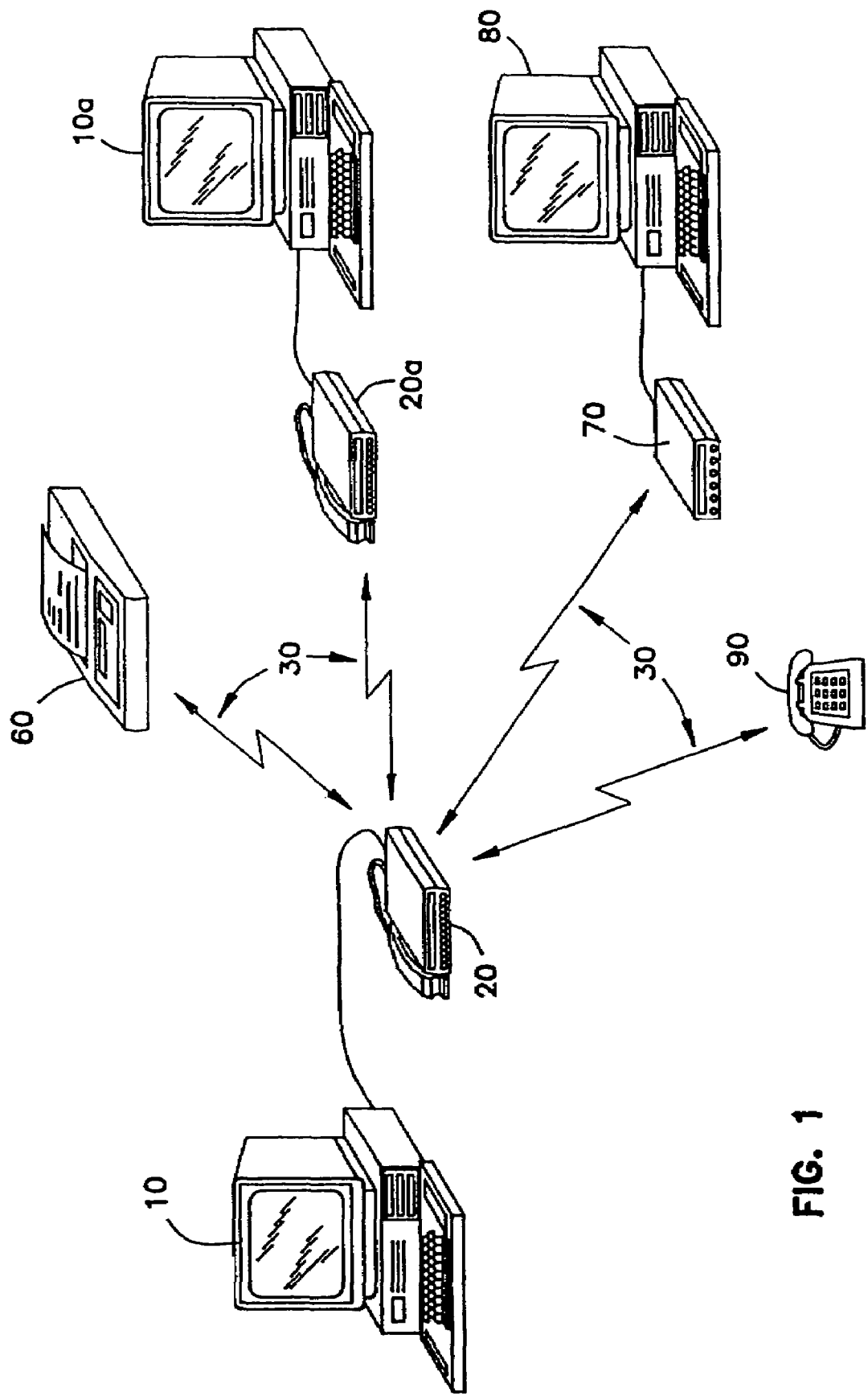
FIG. 1 shows the telecommunications environment within which the present may operate in several of the possible modes of communication.

In the following detailed description, references made to the accompanying drawings which form a part hereof and in which is shown by way of illustration specific embodiment in which the invention may be practiced. These embodiments are described in sufficient detail to enable those skilled in the art to practice and use the invention, and it is to be understood that other embodiments may be utilized in that electrical, logical, and structural changes may be made without departing from the spirit and scope of the present invention. The following detailed description is, therefore, not to be taken in a limiting sense in scope of the present invention as defined by the appended claims FIG. 1 shows a typical arrangement for the use of the present system. Personal computer 10 is running the software components of the present system while the hardware components 20 include the data communication equipment and telephone headset. Hardware components 20 communicate over a standard telephone line 30 to one of a variety of remote sites. One of the remote sites may be equipped with the present system including hardware components 20a and software components running on personal computer 10a. In one alternative use, the local hardware components 20 may be communicating over standard telephone line 30 to facsimile machine 60. In another alternative use, the present system may be communicating over a standard telephone line 30 to another personal computer 80 through a remote modem 70. In another alternative use, the present system may be communicating over a standard telephone line 30 to a standard telephone 90. Those skilled in the art will readily recognize the wide variety of communication interconnections possible with the present system by reading and understanding the following detailed description.

The ornamental features of the hardware components 20 of FIG. 1 are claimed as part of Design Patent Application Number 29/001368, filed Nov. 12, 1992 entitled "Telephone/Modem case for a Computer-Based Multifunction Personal Communications System" assigned to the same assignee of the present inventions and hereby incorporated by reference.

General Overview

The present inventions are embodied in a commercial product by the assignee, MultiTech Systems, Inc. The software component operating on a personal computer is sold under the commercial trademark of MultiExpressPCS™ personal communications software while the hardware component of the present system is sold under the commercial name of MultiModemPCS™, Intelligent Personal Communications System Modem. In the preferred embodiment, the software component runs under Microsoft® Windows® however those skilled in the art will readily recognize that the present system is easily adaptable to run under any single or multi-user, single or multi-window operating system.

The present system is a multifunction communication system which includes hardware and software components. The system allows the user to connect to remote locations equipped with a similar system or with modems, facsimile machines or standard telephones over a single analog telephone line. The software component of the present system includes a number of modules which are described in more detail below.

Figure 2:
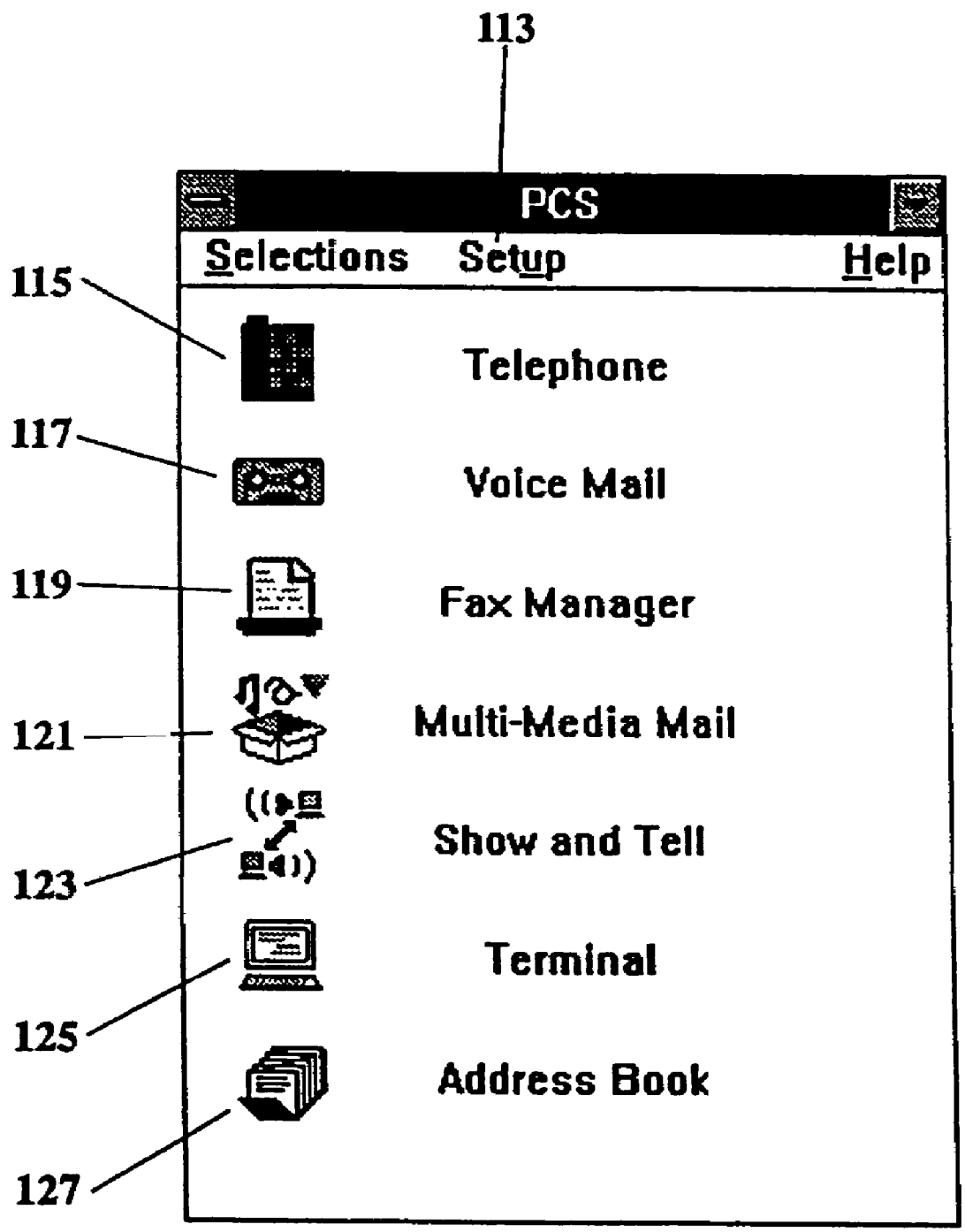
FIG. 2 is the main menu icon for the software components operating on the personal computer.

FIG. 2 is an example of the Windows®-based main menu icon of the present system operating on a personal computer. The functions listed with the icons used to invoke those functions are shown in the preferred embodiment. Those skilled in the art will readily recognize that a wide variety of selection techniques may be used to invoke the various functions of the present system. The icon of FIG. 2 is part of Design Patent Application Number 29/001397, filed Nov. 12, 1992 entitled "Icons for a Computer-Based Multifunction Personal Communications System" assigned to the same assignee of the present inventions and hereby incorporated by reference.

The telephone module allows the system to operate as a conventional or sophisticated telephone system. The system converts voice into a digital signal so that it can be transmitted or stored with other digital data, like computer information. The telephone function supports PBX and Centrex features such a call waiting, call forwarding, caller ID and three-way calling. This module also allows the user to mute, hold or record a conversation. The telephone module enables the handset, headset or hands-free speaker telephone operation of the hardware component. It includes on-screen push button dialing, speed-dial of stored numbers and digital recording of two-way conversations.

The voice mail portion of the present system allows this system to operate as a telephone answering machine by storing voice messages as digitized voice files along with a time/date voice stamp. The digitized voice files can be saved and sent to one or more destinations immediately or at a later time using a queue scheduler. The user can also listen to, forward or edit the voice messages which have been received with a powerful digital voice editing component of the present system. This module also creates queues for outgoing messages to be sent at preselected times and allows the users to create outgoing messages with the voice editor.

The fax manager portion of the present system is a queue for incoming and outgoing facsimile pages. In the preferred embodiment of the present system, this function is tied into the Windows "print" command once the present system has been installed. This feature allows the user to create faxes from any Windows®-based document that uses the "print" command. The fax manager function of the present system allows the user to view queued faxes which are to be sent or which have been received. This module creates queues for outgoing faxes to be sent at preselected times and logs incoming faxes with time/date stamps.

The multi-media mail function of the present system is a utility which allows the user to compose documents that include text, graphics and voice messages using the message composer function of the present system, described more fully below. The multi-media mail utility of the present system allows the user to schedule messages for transmittal and queues up the messages that have been received so that can be viewed at a later time.

The show and tell function of the present system allows the user to establish a data over voice (DOV) communications session. When the user is transmitting data to a remote location similarly equipped, the user is able to talk to the person over the telephone line while concurrently transferring the data. This voice over data function is accomplished in the hardware components of the present system. It digitizes the voice and transmits it in a dynamically changing allocation of voice data and digital data multiplexed in the same transmission. The allocation at a given moment is selected depending on the amount of voice digital information required to be transferred. Quiet voice intervals allocate greater space to the digital data transmission.

The terminal function of the present system allows the user to establish a data communications session with another computer which is equipped with a modem but which is not equipped with the present system. This feature of the present system is a Windows®-based data communications program that reduces the need for issuing "AT" commands by providing menu driven and "pop-up" window alternatives.

The address book function of the present system is a database that is accessible from all the other functions of the present system. This database is created by the user inputting destination addresses and telephone numbers for data communication, voice mail, facsimile transmission, modem communication and the like. The address book function of the present system may be utilized to broadcast communications to a wide variety of recipients. Multiple linked databases have separate address books for different groups and different destinations may be created by the users. The address book function includes a textual search capability which allows fast and efficient location of specific addresses as described more fully below.

Hardware Components

Figure 3:
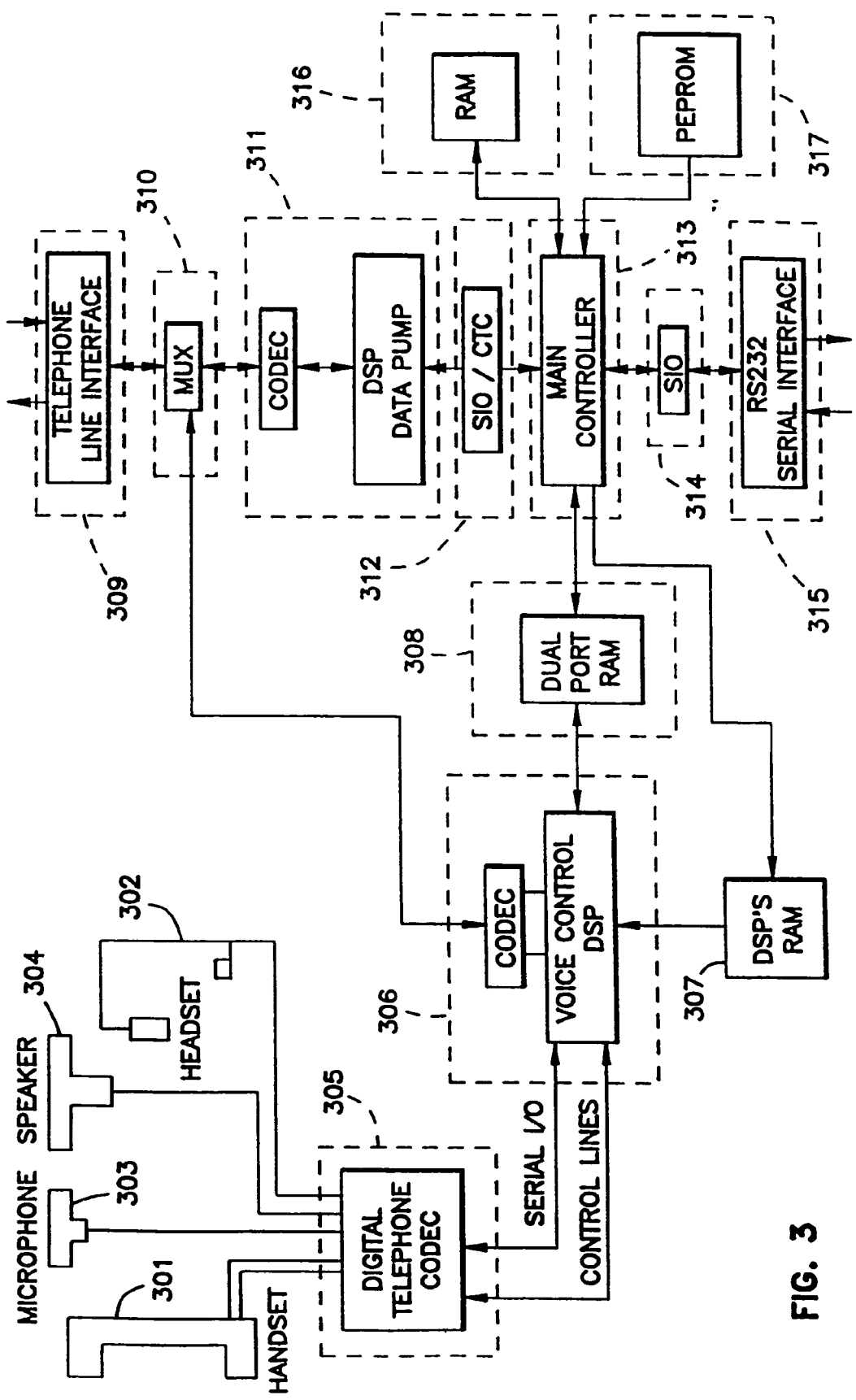
FIG. 3 is a block diagram of the hardware components of the present system.

FIG. 3 is a block diagram of the hardware components of the present system corresponding to reference number 20 of FIG. 1. These components form the link between the user, the personal computer running the software component of the present system and the telephone line interface. As will be more fully described below, the interface to the hardware components of the present system is via a serial communications port connected to the personal computer. The interface protocol is well ordered and defined such that other software systems or programs running on the personal computer may be designed and implemented which would be capable of controlling the hardware components shown in FIG. 3 by using the control and communications protocol defined below.

In the preferred embodiment of the present system three alternate telephone interfaces are available: the telephone handset 301, a telephone headset 302, and a hands-free microphone 303 and speaker 304. Regardless of the telephone interface, the three alternative interfaces connect to the digital telephone coder-decoder (CODEC) circuit 305.

The digital telephone CODEC circuit 305 interfaces with the voice control digital signal processor (DSP) circuit 306 which includes a voice control DSP and CODEC. This circuit does digital to analog (D/A) conversion, analog to digital (A/D) conversion, coding/decoding, gain control and is the interface between the voice control DSP circuit 306 and the telephone interface. The CODEC of the voice control circuit 306 transfers digitized voice information in a compressed format to multiplexor circuit 310 to analog telephone line interface 309.

The CODEC of the voice control circuit 306 is actually an integral component of a voice control digital signal processor integrated circuit, as described more fully below. The voice control DSP of circuit 306 controls the digital telephone CODEC circuit 305, performs voice compression and echo cancellation.

Multiplexor (MUX) circuit 310 selects between the voice control DSP circuit 306 and the data pump DSP circuit 311 for transmission of information on the telephone line through telephone line interface circuit 309.

The data pump circuit 311 also includes a digital signal processor (DSP) and a CODEC for communicating over the telephone line interface 309 through MUX circuit 310. The data pump DSP and CODEC of circuit 311 performs functions such as modulation, demodulation and echo cancellation to communicate over the telephone line interface 309 using a plurality of telecommunications standards including FAX and modem protocols.

The main controller circuit 313 controls the DSP data pump circuit 311 and the voice control DSP circuit 306 through serial input/output and clock timer control (SIO/CTC) circuits 312 and dual port RAM circuit 308 respectively. The main controller circuit 313 communicates with the voice control DSP 306 through dual port RAM circuit 308. In this fashion digital voice data can be read and written simultaneously to the memory portions of circuit 308 for high speed communication between the user (through interfaces 301, 302 or 303/304) and the personal computer connected to serial interface circuit 315 and the remote telephone connection connected through the telephone line attached to line interface circuit 309.

As described more fully below, the main controller circuit 313 includes, in the preferred embodiment, a microprocessor which controls the functions and operation of all of the hardware components shown in FIG. 3. The main controller is connected to RAM circuit 316 and an programmable and electrically erasable read only memory (PEROM) circuit 317. The PEROM circuit 317 includes non-volatile memory in which the executable control programs for the voice control DSP circuits 306 and the main controller circuits 313 operate.

The RS232 serial interface circuit 315 communicates to the serial port of the personal computer which is running the software components of the present system. The RS232 serial interface circuit 315 is connected to a serial input/output circuit 314 with main controller circuit 313. SIO circuit 314 is in the preferred embodiment, a part of SIO/CTC circuit 312.

Functional Operation of the Hardware Components

Referring once again to FIG. 3, the multiple and selectable functions described in conjunction with FIG. 2 are all implemented in the hardware components of FIG. 3. Each of these functions will be discussed in turn.

The telephone function 115 is implemented by the user either selecting a telephone number to be dialed from the address book 127 or manually selecting the number through the telephone menu on the personal computer. The telephone number to be dialed is downloaded from the personal computer over the serial interface and received by main controller 313. Main controller 313 causes the data pump DSP circuit 311 to seize the telephone line and transmit the DTMF tones to dial a number. Main controller 313 configures digital telephone CODEC circuit 305 to enable either the handset 301 operation, the microphone 303 and speaker 304 operation or the headset 302 operation. A telephone connection is established through the telephone line interface circuit 309 and communication is enabled. The user's analog voice is transmitted in an analog fashion to the digital telephone CODEC 305 where it is digitized. The digitized voice patterns are passed to the voice control circuit 306 where echo'cancellation is accomplished, the digital voice signals are reconstructed into analog signals and passed through multiplexor circuit 310 to the telephone line interface circuit 309 for analog transmission over the telephone line. The incoming analog voice from the telephone connection through telephone connection circuit 309 is passed to the integral CODEC of the voice control circuit 306 where it is digitized. The digitized incoming voice is then passed to digital telephone CODEC circuit 305 where it is reconverted to an analog signal for transmission to the selected telephone interface (either the handset 301, the microphone/speaker 303/304 or the headset 302). Voice Control DSP circuit 306 is programmed to perform echo cancellation to avoid feedback and echoes between transmitted and received signals, as is more fully described below.

In the voice mail function mode of the present system, voice messages may be stored for later transmission or the present system may operate as an answering machine receiving incoming messages. For storing digitized voice, the telephone interface is used to send the analog speech patterns to the digital telephone CODEC circuit 305. Circuit 305 digitizes the voice patterns and passes them to voice control circuit 306 where the digitized voice patterns are digitally compressed. The digitized and compressed voice patterns are passed through dual port ram circuit 308 to the main controller circuit 313 where they are transferred through the serial interface to the personal computer using a packet protocol defined below. The voice patterns are then stored on the disk of the personal computer for later use in multi-media mail, for voice mail, as a pre-recorded answering machine message or for later predetermined transmission to other sites.

For the present system to operate as an answering machine, the hardware components of FIG. 3 are placed in answer mode. An incoming telephone ring is detected through the telephone line interface circuit 309 and the main controller circuit 313 is alerted which passes the information off to the personal computer through the RS232 serial interface circuit 315. The telephone line interface circuit 309 seizes the telephone line to make the telephone connection. A pre-recorded message may be sent by the personal computer as compressed and digitized speech through the RS232 interface to the main controller circuit 313. The compressed and digitized speech from the personal computer is passed from main controller circuit 313 through dual port ram circuit 308 to the voice control DSP circuit 306 where it is uncompressed and converted to analog voice patterns. These analog voice patterns are passed through multiplexor circuit 310 to the telephone line interface 309 for transmission to the caller. Such a message may invite the caller to leave a voice message at the sound of a tone. The incoming voice messages are received through telephone line interface 309 and passed to voice control circuit 306. The analog voice patterns are digitized by the integral CODEC of voice control circuit 306 and the digitized voice patterns are compressed by the voice control DSP of the voice control circuit 306. The digitized and compressed speech patterns are passed through dual port ram circuit 308 to the main controller circuit 313 where they are transferred using packet protocol described below through the RS232 serial interface 315 to the personal computer for storage and later retrieval. In this fashion the hardware components of FIG. 3 operate as a transmit and receive voice mail system for implementing the voice mail function 117 of the present system.

The hardware components of FIG. 3 may also operate to facilitate the fax manager function 119 of FIG. 2. In fax receive mode, an incoming telephone call will be detected by a ring detect circuit of the telephone line interface 309 which will alert the main controller circuit 313 to the incoming call. Main controller circuit 313 will cause line interface circuit 309 to seize the telephone line to receive the call. Main controller circuit 313 will also concurrently alert the operating programs on the personal computer through the RS232 interface using the packet protocol described below. Once the telephone line interface seizes the telephone line, a fax carrier tone is transmitted and a return tone and handshake is received from the telephone line and detected by the data pump circuit 311. The reciprocal transmit and receipt of the fax tones indicates the imminent receipt of a facsimile transmission and the main controller circuit 313 configures the hardware components of FIG. 3 for the receipt of that information. The necessary handshaking with the remote facsimile machine is accomplished through the data pump 311 under control of the main controller circuit 313. The incoming data packets of digital facsimile data are received over the telephone line interface and passed through data pump circuit 311 to main controller circuit 313 which forwards the information on a packet basis (using the packet protocol described more fully below) through the serial interface circuit 315 to the personal computer for storage on disk. Those skilled in the art will readily recognize that the FAX data could be transferred from the telephone line to the personal computer using the same path as the packet transfer except using the normal AT stream mode. Thus the incoming facsimile is automatically received and stored on the personal computer through the hardware components of FIG. 3.

A facsimile transmission is also facilitated by the hardware components of FIG. 3. The transmission of a facsimile may be immediate or queued for later transmission at a predetermined or preselected time. Control packet information to configure the hardware components to send a facsimile are sent over the RS232 serial interface between the personal computer and the hardware components of FIG. 3 and are received by main controller circuit 313. The data pump circuit 311 then dials the recipient's telephone number using DTMF tones or pulse dialing over the telephone line interface circuit 309. Once an appropriate connection is established with the remote facsimile machine, standard facsimile handshaking is accomplished by the data pump circuit 311. Once the facsimile connection is established, the digital facsimile picture information is received through the data packet protocol transfer over serial line interface circuit 315, passed through main controller circuit 313 and data pump circuit 311 onto the telephone line through telephone line interface circuit 309 for receipt by the remote facsimile machine.

The operation of the multi-media mail function 121 of FIG. 2 is also facilitated by the hardware components of FIG. 3. A multimedia transmission consists of a combination of picture information, digital data and digitized voice information. For example, the type of multimedia information transferred to a remote site using the hardware components of FIG. 3 could be the multimedia format of the MicroSoft® Multimedia Wave® format with the aid of an Intelligent Serial Interface (ISI) card added to the personal computer. The multimedia may also be the type of multimedia information assembled by the software component of the present system which is described more fully below.

The multimedia package of information including text, graphics and voice messages (collectively called the multimedia document) may be transmitted or received through the hardware components shown in FIG. 3. For example, the transmission of a multimedia document through the hardware components of FIG. 3 is accomplished by transferring the multimedia digital information using the packet protocol described below over the RS232 serial interface between the personal computer and the serial line interface circuit 315. The packets are then transferred through main controller circuit 313 through the data pump circuit 311 on to the telephone line for receipt at a remote site through telephone line interface circuit 309. In a similar fashion, the multimedia documents received over the telephone line from the remote site are received at the telephone line interface circuit 309, passed through the data pump circuit 311 for receipt and forwarding by the main controller circuit 313 over the serial line interface circuit 315.

The show and tell function 123 of the present system allows the user to establish a data over voice communication session. In this mode of operation, full duplex data transmission may be accomplished simultaneously with the voice communication between both sites. This mode of operation assumes a like configured remote site. The hardware components of the present system also include a means for sending voice/data over cellular links. The protocol used for transmitting multiplexed voice and data include a supervisory packet described more fully below to keep the link established through the cellular link. This supervisory packet is an acknowledgement that the link is still up. The supervisory packet may also contain link information to be used for adjusting various link parameters when needed. This supervisory packet is sent every second when data is not being sent and if the packet is not acknowledged after a specified number of attempts, the protocol would then give an indication that the cellular link is down and then allow the modem to take action. The action could be for example; change speeds, retrain, or hang up. The use of supervisory packets is a novel method of maintaining inherently intermittent cellular links when transmitting multiplexed voice and data.

The voice portion of the voice over data transmission of the show and tell function is accomplished by receiving the user's voice through the telephone interface 301, 302 or 303 and the voice information is digitized by the digital telephone circuit 305. The digitized voice information is passed to the voice control circuit 306 where the digitized voice information is compressed using a voice compression algorithm described more fully below. The digitized and compressed voice information is passed through dual port RAM circuit 308 to the main controller circuit 313. During quiet periods of the speech, a quiet flag is passed from voice control circuit 306 to the main controller circuit 313 through a packet transfer protocol described below by a dual port RAM circuit 308.

Simultaneous with the digitizing compression and packetizing of the voice information is the receipt of the packetized digital information from the personal computer over interface line circuit 315 by main controller circuit 313. Main controller circuit 313 in the show and tell function of the present system must efficiently and effectively combine the digitized voice information with the digital information for transmission over the telephone line via telephone line interface circuit 309. As described above and as described more fully below, main controller circuit 313 dynamically changes the amount of voice information and digital information transmitted at any given period of time depending upon the quiet times during the voice transmissions. For example, during a quiet moment where there is no speech information being transmitted, main controller circuit 313 ensures that a higher volume of digital data information be transmitted over the telephone line interface in lieu of digitized voice information.

Also, as described more fully below, the packets of digital data transmitted over the telephone line interface with the transmission packet protocol described below, requires 100 percent accuracy in the transmission of the digital data, but a lesser standard of accuracy for the transmission and receipt of the digitized voice information. Since digital information must be transmitted with 100 percent accuracy, a corrupted packet of digital information received at the remote site must be retransmitted. A retransmission signal is communicated back to the local site and the packet of digital information which was corrupted during transmission is retransmitted. If the packet transmitted contained voice data, however, the remote site uses the packets whether they were corrupted or not as long as the packet header was intact. If the header is corrupted, the packet is discarded. Thus, the voice information may be corrupted without requesting retransmission since it is understood that the voice information must be transmitted on a real time basis and the corruption of any digital information of the voice signal is not critical. In contrast to this the transmission of digital data is critical and retransmission of corrupted data packets is requested by the remote site.

The transmission of the digital data follows the CCITT V.42 standard, as is well known in the industry and as described in the CCITT Blue Book, volume VIII entitled Data Communication over the Telephone Network, 1989. The CCITT V.42 standard is hereby incorporated by reference. The voice data packet information also follows the CCITT V.42 standard, but uses a different header format so the receiving site recognizes the difference between a data packet and a voice packet. The voice packet is distinguished from a data packet by using undefined bits in the header (80 hex) of the V.42 standard. The packet protocol for voice over data transmission during the show and tell function of the present system is described more fully below.

Since the voice over data communication with the remote site is full-duplex, incoming data packets and incoming voice packets are received by the hardware components of FIG. 3. The incoming data packets and voice packets are received through the telephone line interface circuit 309 and passed to the main controller circuit 313 via data pump DSP circuit 311. The incoming data packets are passed by the main controller circuit 313 to the serial interface circuit 315 to be passed to the personal computer. The incoming voice packets are passed by the main controller circuit 313 to the dual port RAM circuit 308 for receipt by the voice control DSP circuit 306. The voice packets are decoded and the compressed digital information therein is uncompressed by the voice control DSP of circuit 306. The uncompressed digital voice information is passed to digital telephone CODEC circuit 305 where it is reconverted to an analog signal and retransmitted through the telephone line interface circuits. In this fashion full-duplex voice and data transmission and reception is accomplished through the hardware components of FIG. 3 during the show and tell functional operation of the present system.

Terminal operation 125 of the present system is also supported by the hardware components of FIG. 3. Terminal operation means that the local personal computer simply operates as a "dumb" terminal including file transfer capabilities. Thus no local processing takes place other than the handshaking protocol required for the operation of a dumb terminal. In terminal mode operation, the remote site is assumed to be a modem connected to a personal computer but the remote site is not necessarily a site which is configured according to the present system. In terminal mode of operation, the command and data information from personal computer is transferred over the RS232 serial interface circuit 315, forwarded by main controller circuit 313 to the data pump circuit 311 where the data is placed on the telephone line via telephone line interface circuit 309.

In a reciprocal fashion, data is received from the telephone line over telephone line interface circuit 309 and simply forwarded by the data pump circuit 311, the main controller circuit 313 over the serial line interlace circuit 315 to the personal computer.

As described above, and more fully below, the address book function of the present system is primarily a support function for providing telephone numbers and addresses for the other various functions of the present system.

Detailed Electrical Schematic Diagrams

Figure 4:
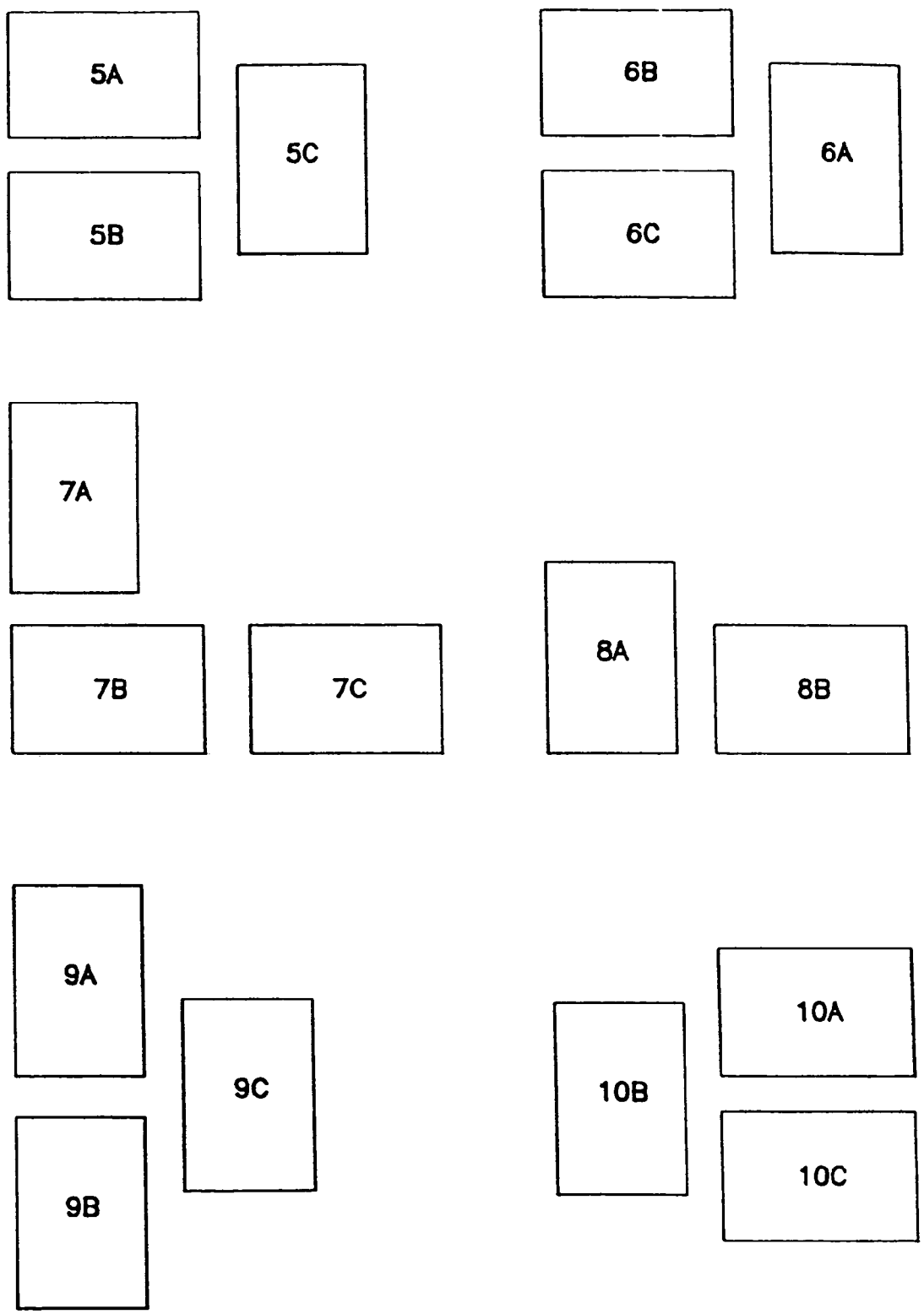
FIG. 4 is a key for viewing the detailed electrical schematic diagrams of FIGS. 5A-10C to facilitate understanding of the interconnect between the drawings.

The detailed electrical schematic diagrams comprise FIGS. 5A-C, 6A-C, 7A-C, 8A-B, 9A-C and 10A-C. FIG. 4 shows a key on how the schematic diagrams may be conveniently arranged to view the passing of signals on the electrical lines between the diagrams. The electrical connections between the electrical schematic diagrams are through the designators listed next to each wire. For example, on the right side of FIG. 5A, address lines A0-A19 are attached to an address bus for which the individual electrical lines may appear on other pages as A0-A19 or may collectively be connected to other schematic diagrams through the designator "A" in the circle connected to the collective bus. In a like fashion, other electrical lines designated with symbols such as RNGL on the lower left-hand side of FIG. 5A may connect to other schematic diagrams using the same signal designator RNGL.

Figure 7A:
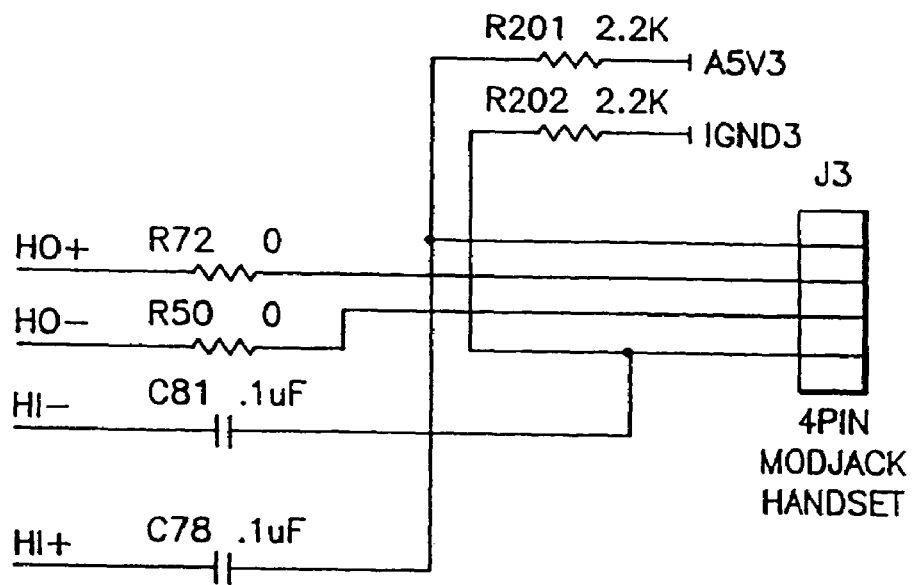
Figure 7A:
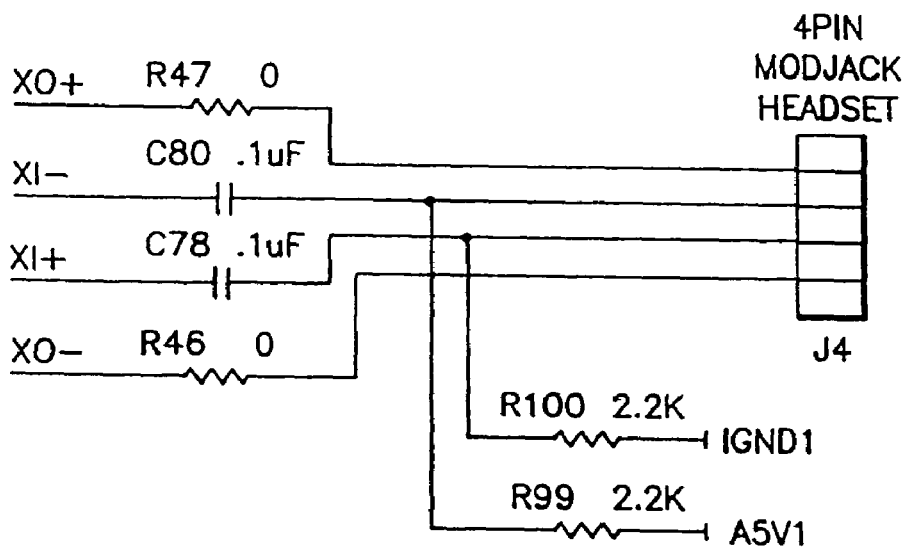
Figure 7A:
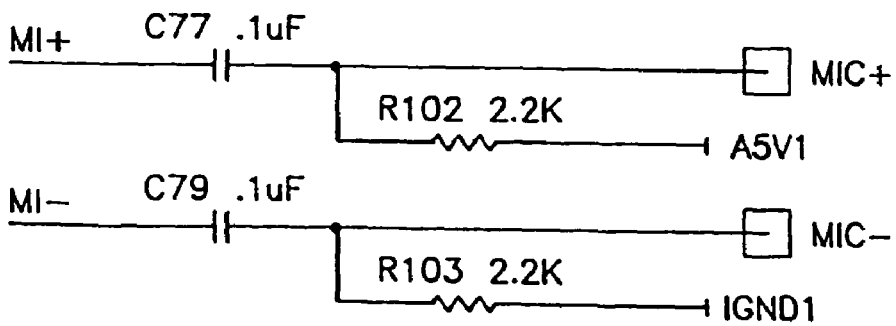
Figure 7B:
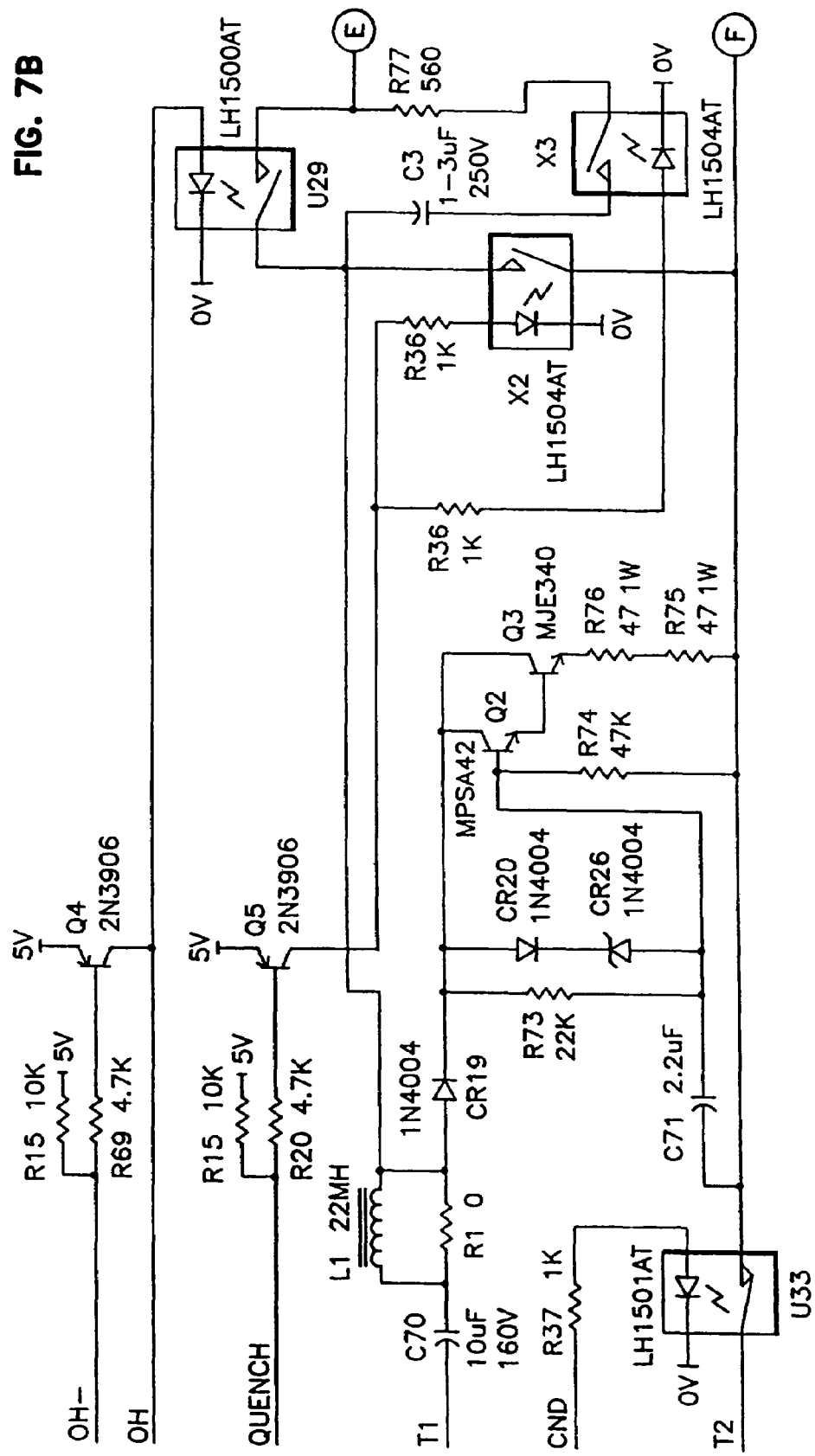
Figure 7C:
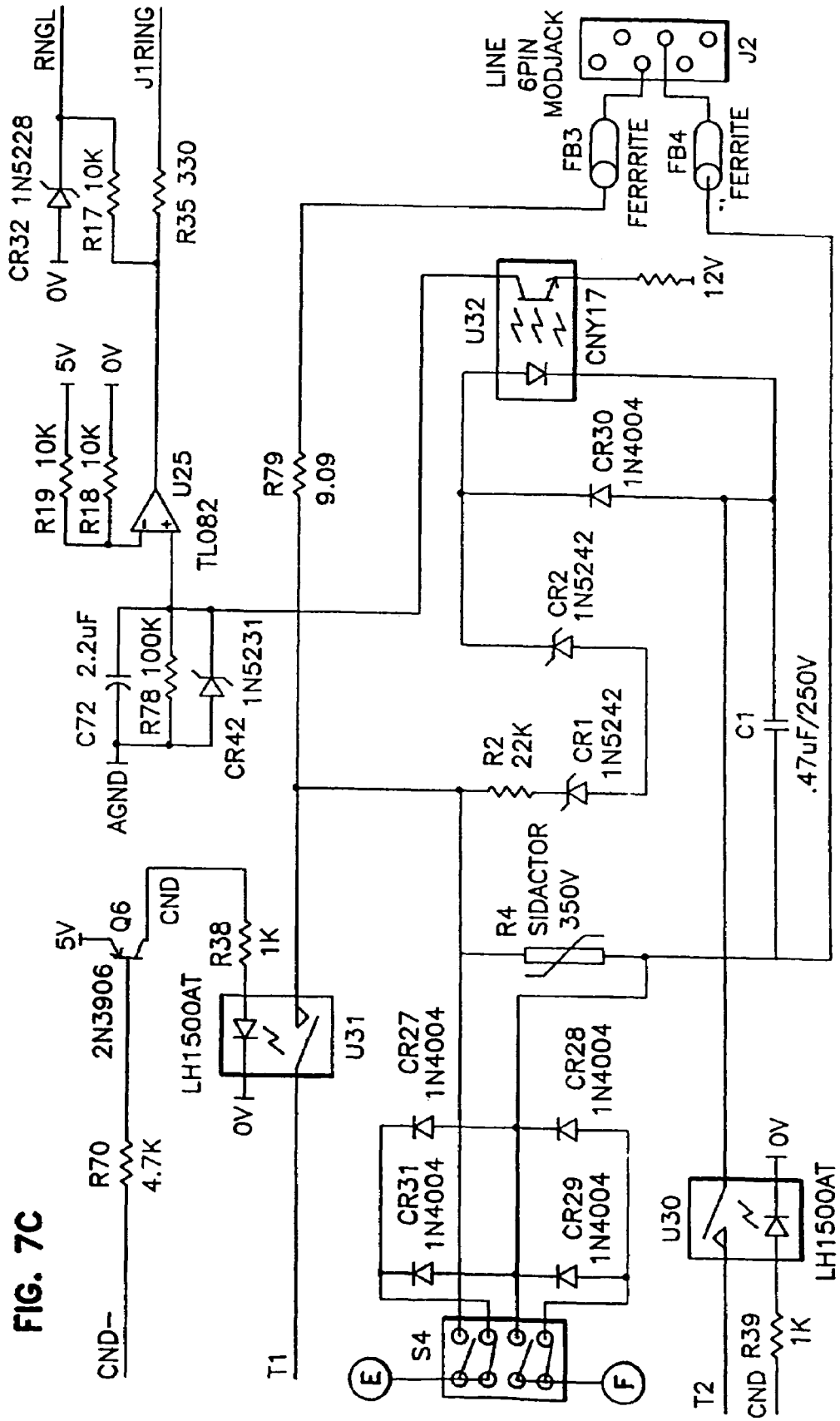

Beginning with the electrical schematic diagram of FIG. 7C, the telephone line connection in the preferred embodiment is through connector J2 which is a standard six-pin modular RJ-11 jack. In the schematic diagram of FIG. 7C, only the tip and ring connections of the first telephone circuit of the RJ-11 modular connector are used. Ferrite beads FB3 and FB4 are placed on the tip and ring wires of the telephone line connections to remove any high frequency or RF noise on the incoming telephone line. The incoming telephone line is also overvoltage protected through SIDACTOR R4. The incoming telephone line may be full wave rectified by the full wave bridge comprised of diodes CR27, CR28, CR29 and CR31. Switch S4 switches between direct connection and full wave rectified connection depending upon whether the line is a non-powered leased line or a standard telephone line. Since a leased line is a "dead" line with no voltage, the full-wave rectification is not needed.

Also connected across the incoming telephone line is a ring detect circuit. Optical isolator U32 (part model number CNY17) senses the ring voltage threshold when it exceeds the breakdown voltages on zener diodes CR1 and CR2. A filtering circuit shown in the upper right corner of FIG. 7C creates a long RC delay to sense the constant presence of an AC ring voltage and buffers that signal to be a binary signal out of operational amplifier U25 (part model number TLO82). Thus, the RNGL and J1RING signals are binary signals for use in the remaining portions of the electrical schematic diagrams to indicate a presence of a ring voltage on the telephone line.

The present system is also capable of sensing the caller ID information which is transmitted on the telephone line between rings. Between the rings, optically isolated relays U30, U31 on FIG. 7C and optically isolated relay U33 on FIG. 7B all operate in the period between the rings so that the FSK modulated caller ID information is connected to the CODEC and data pump DSP in FIGS. 8A and 8B, as described more fully below.

Referring now to FIG. 7B, more of the telephone line filtering circuitry is shown. Some of the telephone line buffering circuitry such as inductor L1 and resistor R1 are optional and are connected for various telephone line standards used around the word to meet local requirements. For example, Switzerland requires a 22 millihenry inductor and 1K resistor in series the line. For all other countries, the 1K resistor is replaced with a 0 ohm resistor.

Relay U29 shown in FIG. 7B is used to accomplish pulse dialing by opening and shorting the tip and ring wires. Optical relay X2 is engaged during pulse dialing so that the tip and ring are shorted directly. Transistors Q2 and Q3 along with the associated discrete resistors comprise a holding circuit to provide a current path or current loop on the telephone line to grab the line.

FIG. 7A shows the telephone interface connections between the hardware components of the present system and the handset, headset and microphone.

Figure 8A:
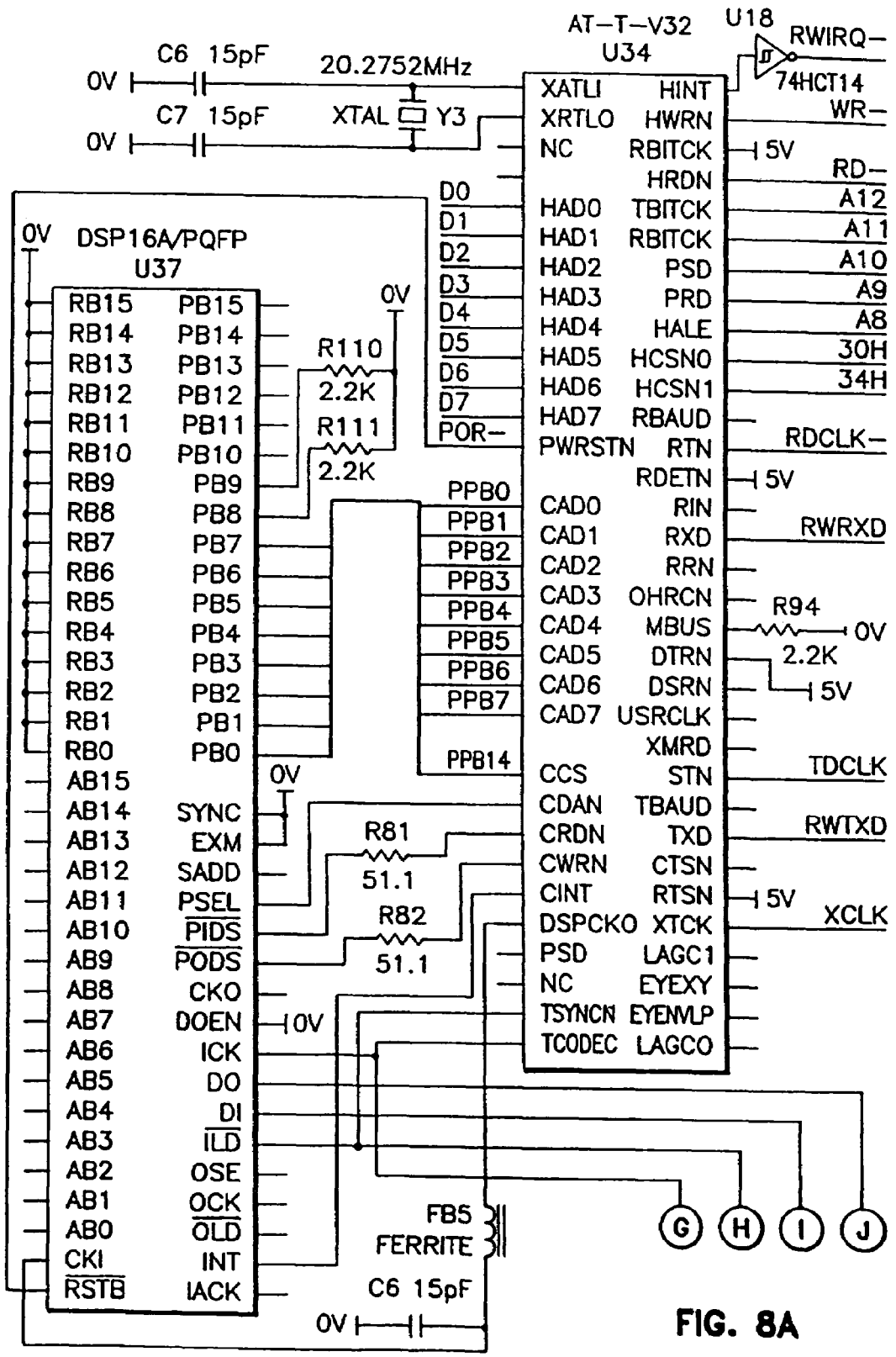
Figure 8B:
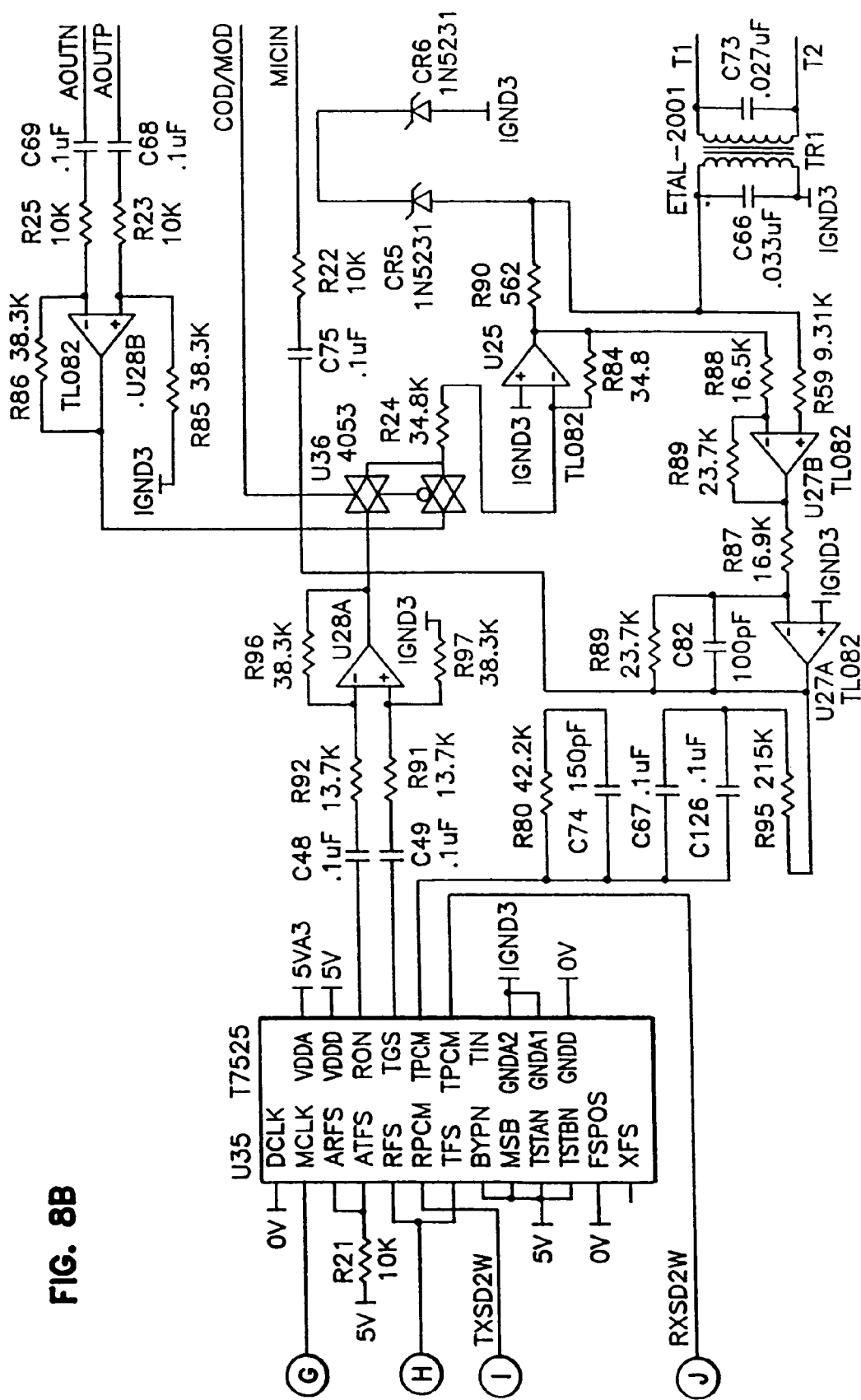

The connections T1 and T2 for the telephone line from FIG. 7B are connected to transformer TR1 shown in the electrical schematic diagram of FIG. 8B. Only the AC components of the signal pass through transformer TR1. The connection of signals attached to the secondary of TR1 is shown for both transmitting and receiving information over the telephone line.

Incoming signals are buffered by operational amplifiers U27A and U27B. The first stage of buffering using operational amplifier U27B is used for echo suppression so that the transmitted information being placed on the telephone line is not fed back into the receive portion of the present system. The second stage of the input buffering through operational amplifier U27A is configured for a moderate amount of gain before driving the signal into CODEC U35.

CODEC chip U35 on FIG. 8B, interface chip U34 on FIG. 8A and digital signal processor (DSP) chip U37 on FIG. 8A comprise a data pump chip set manufactured and sold by AT&T Microelectronics. A detailed description of the operation of these three chips in direct connection and cooperation with one another is described in the publication entitled "AT&T V.32bis/V.32/FAX High-Speed Data Pump Chip Set Data Book" published by AT&T Microelectronics, December 1991, which is hereby incorporated by reference. This AT&T data pump chip set comprises the core of an integrated, two-wire full duplex modem which is capable of operation over standard telephone lines or leased lines. The data pump chip set conforms to the telecommunications specifications in CCITT recommendations V.32bis, V.32, V.22bis, V.22, V.23, V.21 and is compatible with the Bell 212A and 103 modems. Speeds of 14,400, 9600, 4800, 2400, 1200, 600 and 300 bits per second are supported. This data pump chip set consists of a ROM-coded DSP16A digital signal processor U37, and interface chip U34 and an AT&T T7525 linear CODEC U35. The AT&T V.32 data pump chip set is available from AT&T Microelectronics.

The chip set U34, U35 and U37 on FIGS. 8A and 8B perform all A/D, D/A, modulation, demodulation and echo cancellation of all signals placed on or taken from the telephone line. The CODEC U35 performs DTMF tone generation and detection, signal analysis of call progress tones, etc. The transmission of information on the telephone line from CODEC U35 is through buffer U28A, through CMOS switch U36 and through line buffer U25. The CMOS switch U36 is used to switch between the data pump chip set CODEC of circuit 310 (shown in FIG. 3) and the voice control CODEC of circuit 306 (also shown in FIG. 3). The signal lines AOUTN and AOUTP correspond to signals received from the voice control CODEC of circuit 306. CODEC U35 is part of circuit 311 of FIG. 3.

Figure 5A:
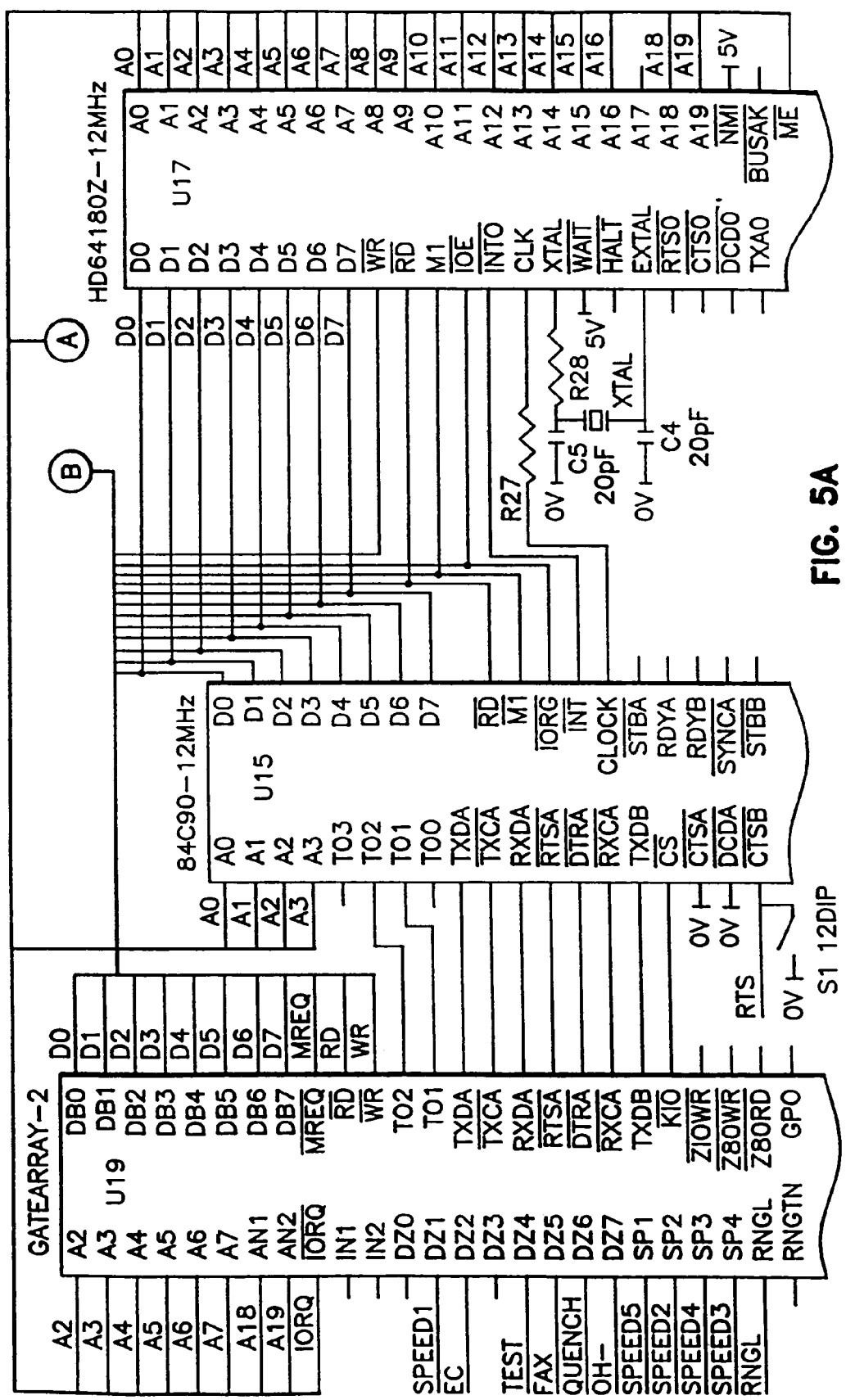
FIGS. 5A-5C, 6A-6C, 7A-7C, 8A-8B, 9A-9C and 10A-10C are detailed electrical schematic diagrams of the circuitry of the hardware components of the present system.
Figure 5B:
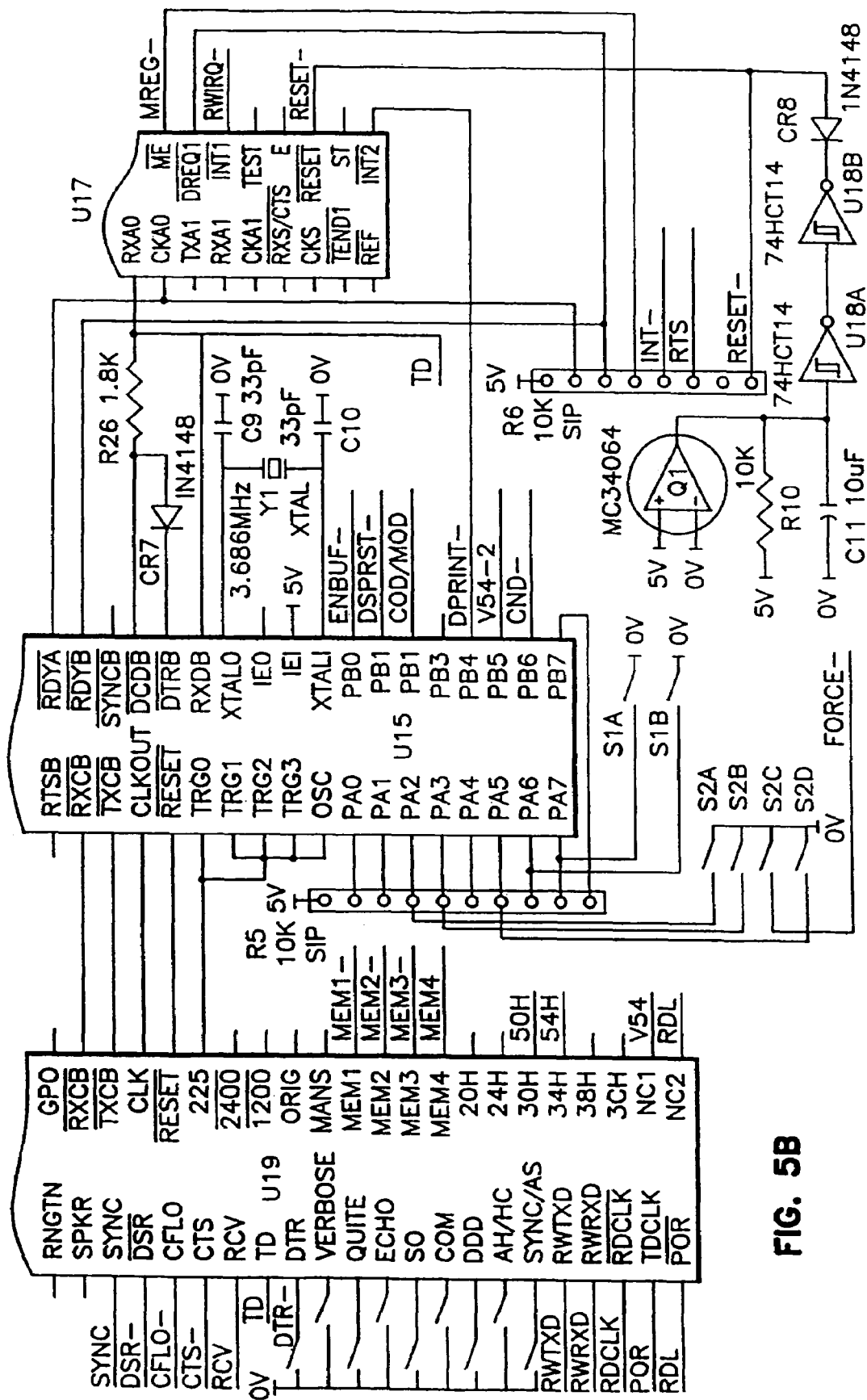
Figure 5C:
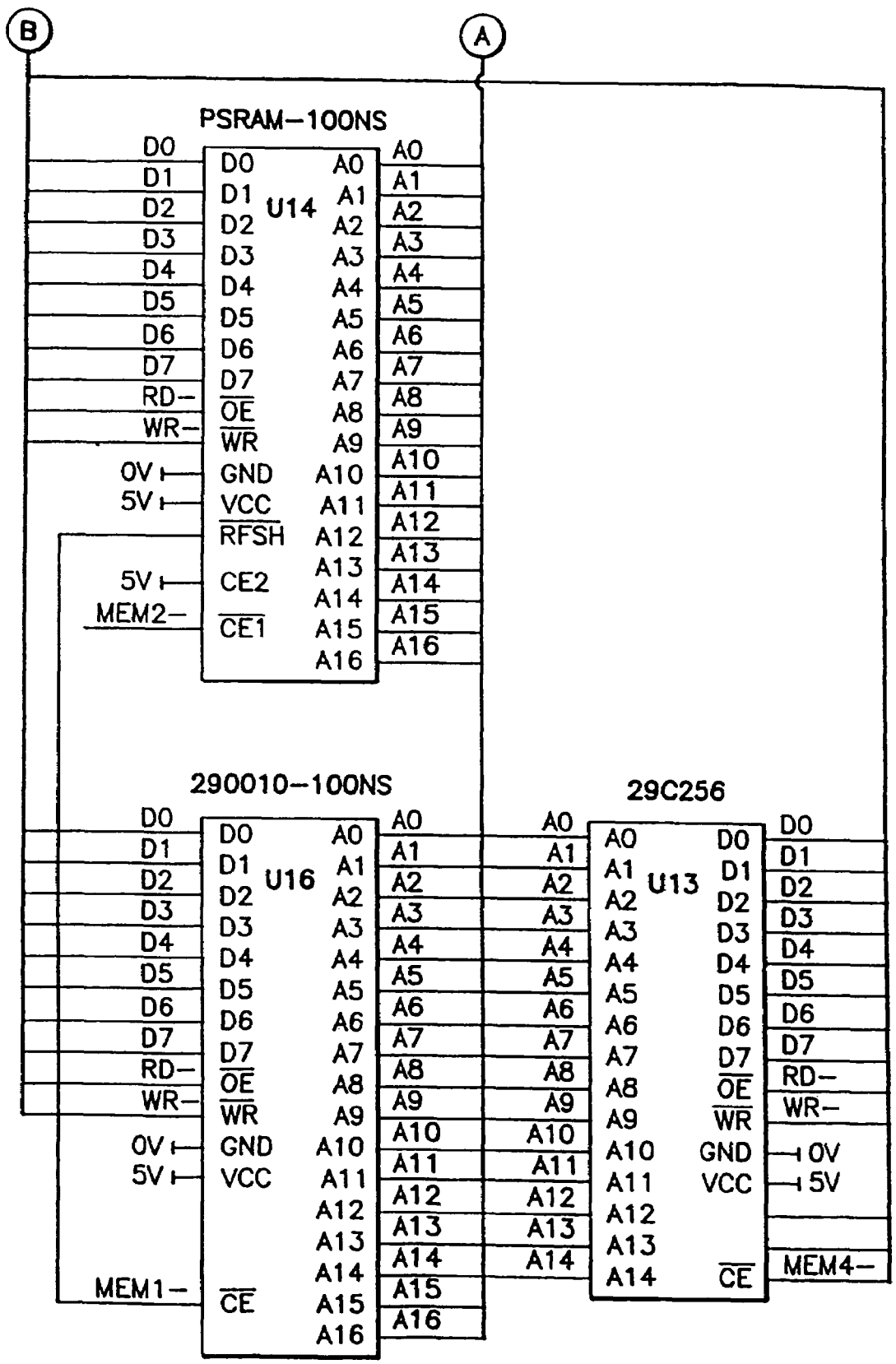

The main controller of controller circuit 313 and the support circuits 312, 314, 316, 317 and 308 are shown in FIGS. 5A-5C. In the preferred embodiment of the present system, the main controller is a Z80180 eight-bit microprocessor chip. In the preferred implementation, microcontroller chip U17 is a Z80180 microprocessor, part number Z84CO1 by Zilog, Inc. of Campbell, Calif. (also available from Hitachi Semiconductor as part number HD64180Z). The Zilog Z80180 eight-bit microprocessor operates at 12 MHz internal clock speed by means of an external crystal XTAL, which in the preferred embodiment, is a 24.576 MHz crystal. The crystal circuit includes capacitors C4 and C5 which are 20 pf capacitors and resistor R28 which is a 33 ohm resistor. The crystal and support circuitry is connected according to manufacturer's specifications found in the Zilog Intelligent Peripheral Controllers Data Book published by Zilog, Inc. The product description for the Z84CO1 Z80180 CPU from the Z84C01 Z80 CPU Product Specification pgs. 43-73 of the Zilog 1991 Intelligent Peripheral Controllers databook is hereby incorporated by reference.

The Z80180 microprocessor in microcontroller chip U17 is intimately connected to a serial/parallel I/O counter timer chip U15 which is, in the preferred embodiment, a Zilog 84C90 CMOS Z80 KIO serial/parallel/counter/timer integrated circuit available from Zilog, Inc. This multi-function I/O chip U15 combines the functions of a parallel input/output port, a serial input/output port, bus control circuitry, and a clock timer circuit in one chip. The Zilog Z84C90 product specification describes the detailed internal operations of this circuit in the Zilog Intelligent Peripheral Controllers 1991 Handbook available from Zilog, Inc. Z84C90 CMOS Z80KIO Product specification pgs. 205-224 of the Zilog 1991 Intelligent Peripheral Controllers databook is hereby incorporated by reference.

Data and address buses A and B shown in FIG. 5A connect the Z80180 microprocessor in microcontroller U17 with the Z80 KIO circuit U15 and a gate array circuit U19, and to other portions of the electrical schematic diagrams. The gate array U19 includes miscellaneous latch and buffer circuits for the present system which normally would be found in discrete SSI or MSI integrated circuits. By combining a wide variety of miscellaneous support circuits into a single gate array, a much reduced design complexity and manufacturing cost is achieved. A detailed description of the internal operations of gate array U19 is described more fully below in conjunction with schematic diagrams of FIGS. 10A-10C.

The memory chips which operate in conjunction with the Z80 microprocessor in microcontroller chip U17 are shown in FIG. 5C. The connections A, B correspond to the connections to the address and data buses, respectively, found on FIG. 5A. Memory chips U16 and U13 ate read-only memory (ROM) chips which are electrically alterable in place. These programmable ROMs, typically referred to as flash PROMs or Programmable Erasable Read Only Memories (PEROMs) hold the program code and operating parameters for the present system in a non-volatile memory. Upon power-up, the programs and operating parameters are transferred to the voice control DSP RAM U12, shown in FIG. 9B.

In the preferred embodiment, RAM chip U14 is a pseudo-static RAM which is essentially a dynamic RAM with a built-in refresh. Those skilled in the art will readily recognize that a wide variety memory chips may be used and substituted for pseudo-static RAM U14 and flash PROMs U16 and U13.

Referring once again to FIG. 3, the main controller circuit 313 communicates with the voice control DSP of circuit 306 through dual port RAM circuit 308. The digital telephone CODEC circuit 305, the voice control DSP and CODEC circuit 306, the DSP RAM 307 and the dual port RAM 308 are all shown in detailed electrical schematic diagrams of FIGS. 9A-9C.

Figure 9A:
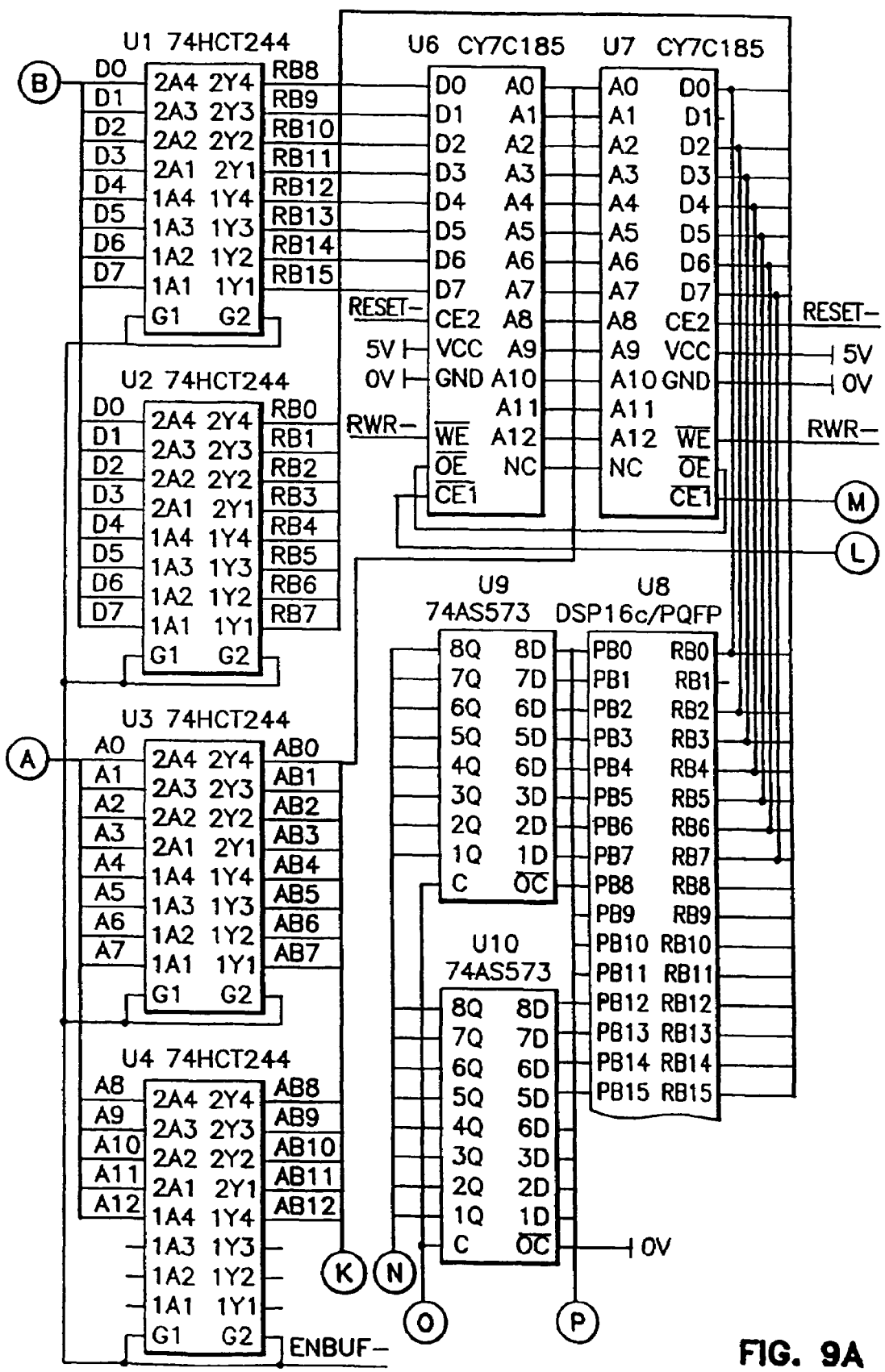

Referring to FIG. 9A, the DSP RAM chips U6 and U7 are shown with associated support chips. Support chips U1 and U2 are in the preferred embodiment part 74HCT244 which are TTL-level latches used to capture data from the data bus and hold it for the DSP RAM chips U6 and U7. Circuits U3 and U4 are also latch circuits for also latching address information to control DSP RAM chips U6 and U7. Once again, the address bus A and data bus B shown in FIG. 9A are multi-wire connections which, for the clarity of the drawing, are shown as a thick bus wire representing a grouping of individual wires.

Figure 9B:
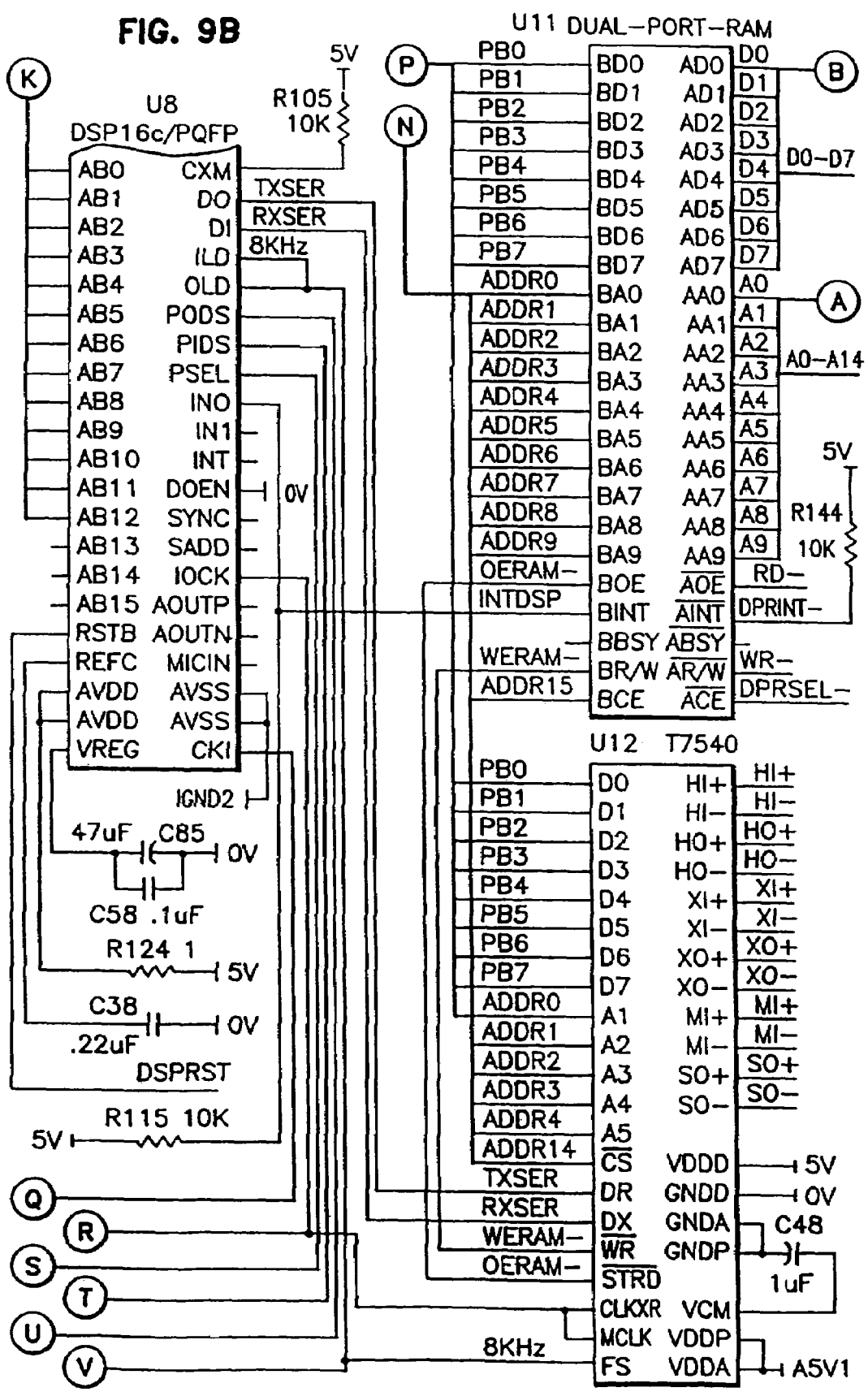

Also in FIG. 9A, the DSP RAMs U6 and U7 are connected to the voice control DSP and CODEC chip U8 as shown split between FIGS. 9A and 9B. DSP/CODEC chip U8 is, in the preferred embodiment, part number WE® DSP16C, digital signal processor and CODEC chip manufactured and sold by AT&T Microelectronics. This is a 16-bit programmable DSP with a voice band sigma-delta CODEC on one chip. Although the CODEC portion of this chip is capable of analog-to-digital and digital-to-analog signal acquisition and conversion system, the actual D/A and A/D functions for the telephone interface occur in digital telephone CODEC chip U12 (corresponding to digital telephone CODEC circuit 305 of FIG. 3). Chip U8 includes circuitry for sampling, data conversion, anti-aliasing filtering and anti-imaging filtering. The programmable control of DSP/CODEC chip U8 allows it to receive digitized voice from the telephone interface (through digital telephone CODEC chip U12) and store it in a digitized form in the dual port RAM chip U11. The digitized voice can then be passed to the main controller circuit 313 where the digitized voice may be transmitted to the personal computer over the RS232 circuit 315. In a similar fashion, digitized voice stored by the main controller circuit 313 in the dual port RAM U11 may be transferred through voice control DSP chip U8, converted to analog signals by telephone CODEC U12 and passed to the user. Digital telephone CODEC chip U12 includes a direct telephone handset interface on the chip.

The connections to DSP/CODEC chip U8 are shown split across FIGS. 9A and 9B. Address/data decode chips U9 and U10 on FIG. 9A serve to decode address and data information from the combined address/data bus for the dual port RAM chip U11 of FIG. 9B. The interconnection of the DSP/CODEC chip U8 shown on FIGS. 9A and 9B is described more fully in the WE® DSP16C Digital Signal Processor/CODEC Data Sheet published May, 1991 by AT&T Microelectronics, which is hereby incorporated by reference.

The Digital Telephone CODEC chip U12 is also shown in FIG. 9B which, in the preferred embodiment, is part number T7540 Digital Telephone CODEC manufactured and sold by AT&T Microelectronics. A more detailed description of this telephone CODEC chip U12 is described in the T7540 Digital Telephone CODEC Data Sheet and Addendum published July, 1991 by AT&T Microelectronics, which is hereby incorporated by reference.

Figure 9C:
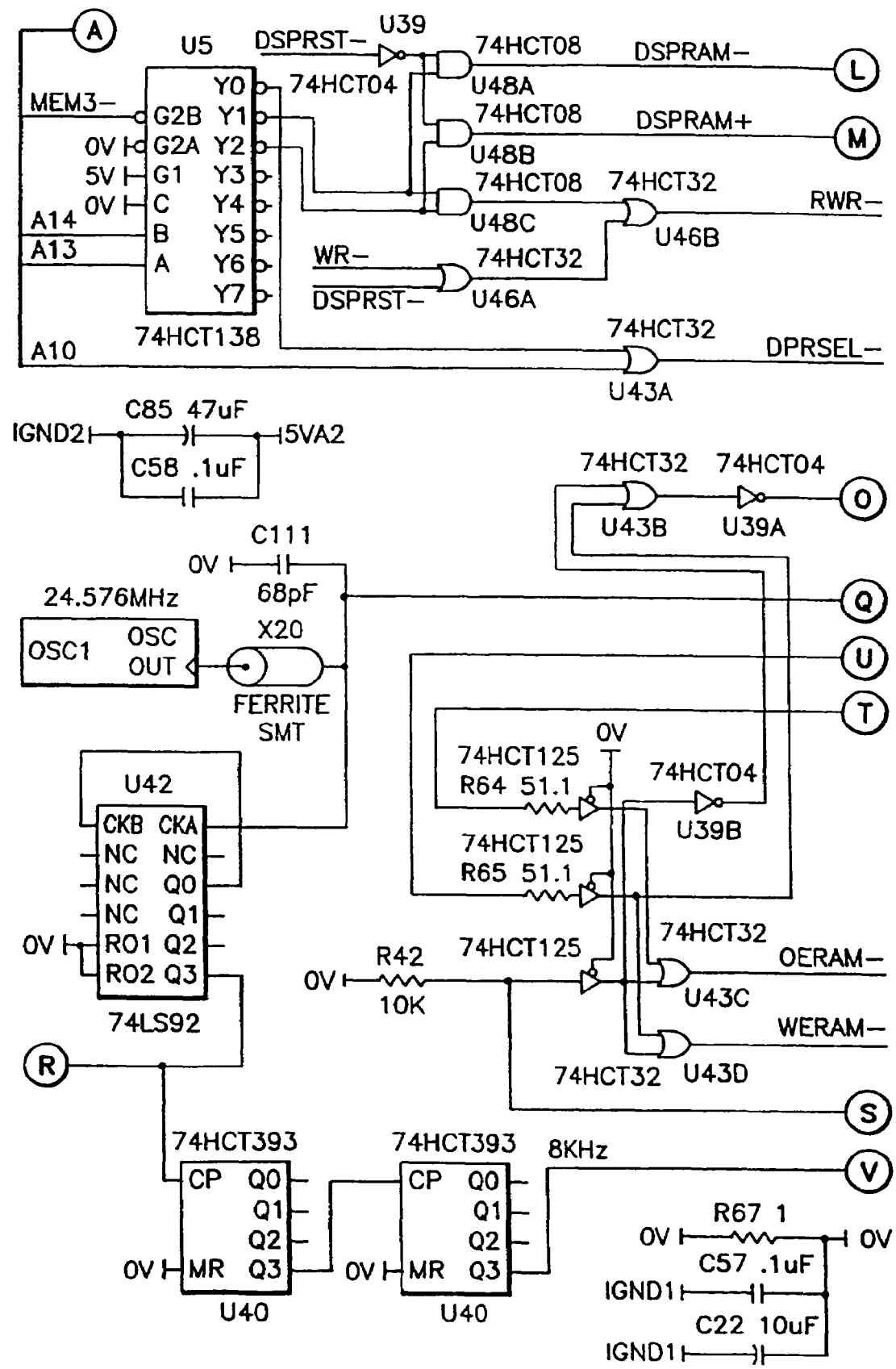

Support circuits shown on FIG. 9C are used to facilitate communication between CODEC chip U12, DSP/CODEC chip U8 and dual port RAM U11. For example, an 8 kHz clock is used to synchronize the operation of CODEC U12 and DSP/CODEC U8.

The operation of the dual port RAM U11 is controlled both by DSP U8 and main controller chip U17. The dual port operation allows writing into one address while reading from another address in the same chip. Both processors can access the exact same memory locations with the use of a contention protocol such that when one is reading the other cannot be writing. In the preferred embodiment, dual port RAM chip U11 is part number CYZC131 available from Cyprus Semiconductor. This chip includes built in contention control so that if two processors try to access the same memory location at the same time, the first one making the request gets control of the address location and the other processor must wait. In the preferred embodiment, a circular buffer is arranged in dual port RAM chip U11 comprising 24 bytes. By using a circular buffer configuration with pointers into the buffer area, both processors will not have a contention problem.

The DSP RAM chips U6 and U7 are connected to the DSP chip U8 and also connected through the data and address buses to the Zilog microcontroller U17. In this configuration, the main controller can download the control programs for DSP U8 into DSP RAMs U6 and U7. In this fashion, DSP control can be changed by the main controller or the operating programs on the personal computer, described more fully below. The control programs stored in DSP chips U6 and U7 originate in the flash PEROM chips U16 and U17. The power-up control routine operating on controller chip U17 downloads the DSP control routines into DSP RAM chips U6 and U7.

Figure 6A:
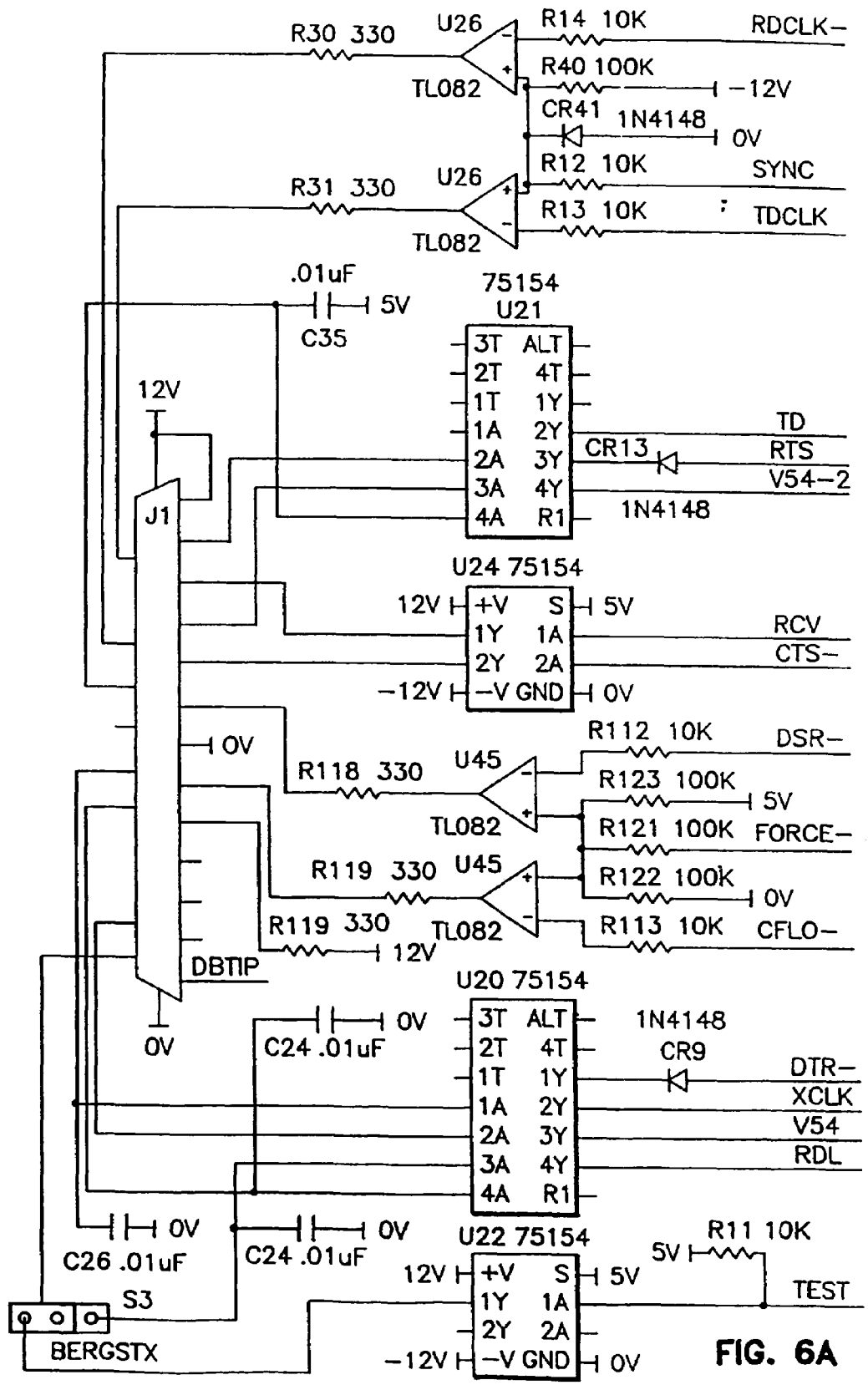
Figure 6B:
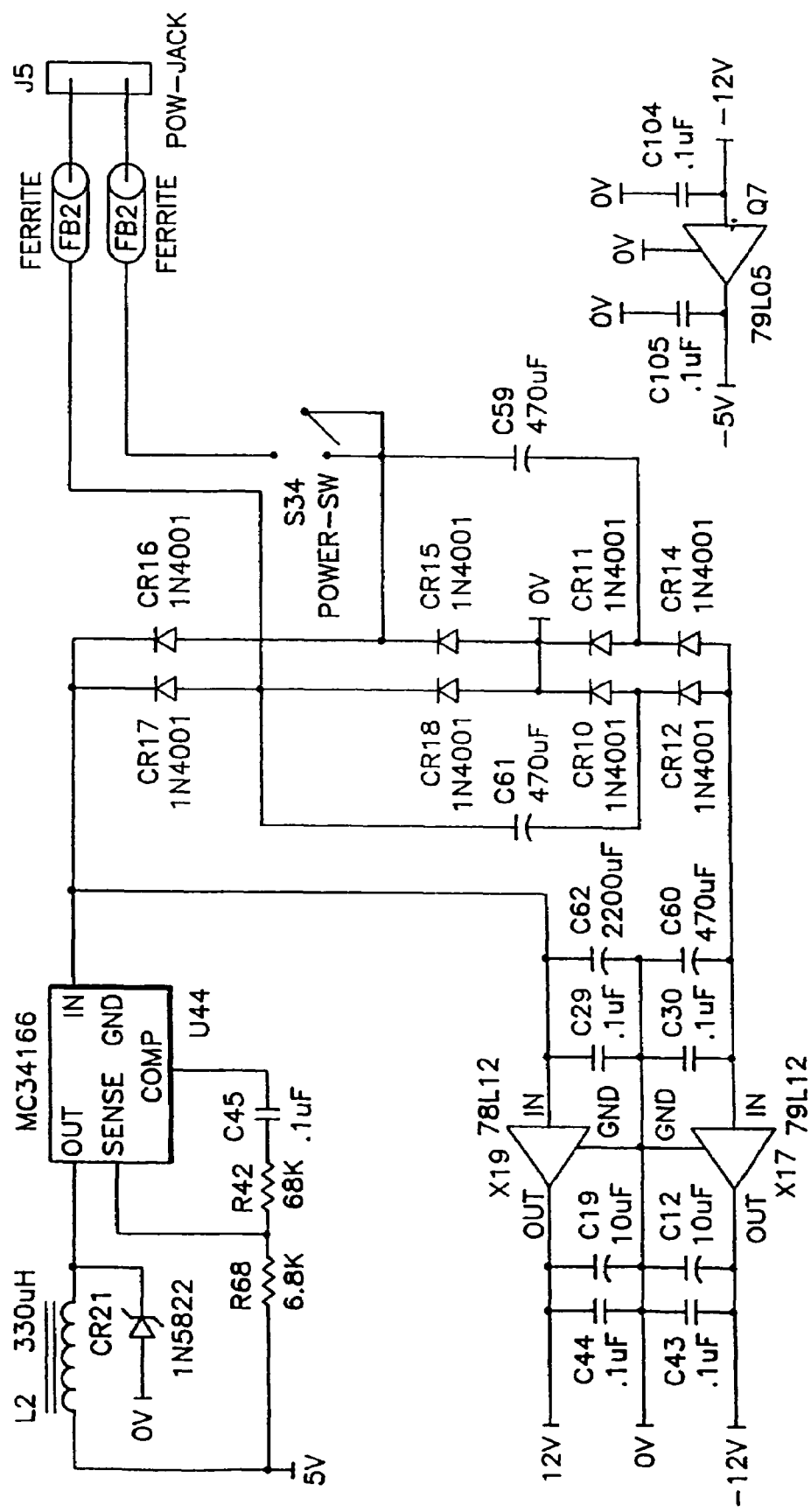
Figure 6C:
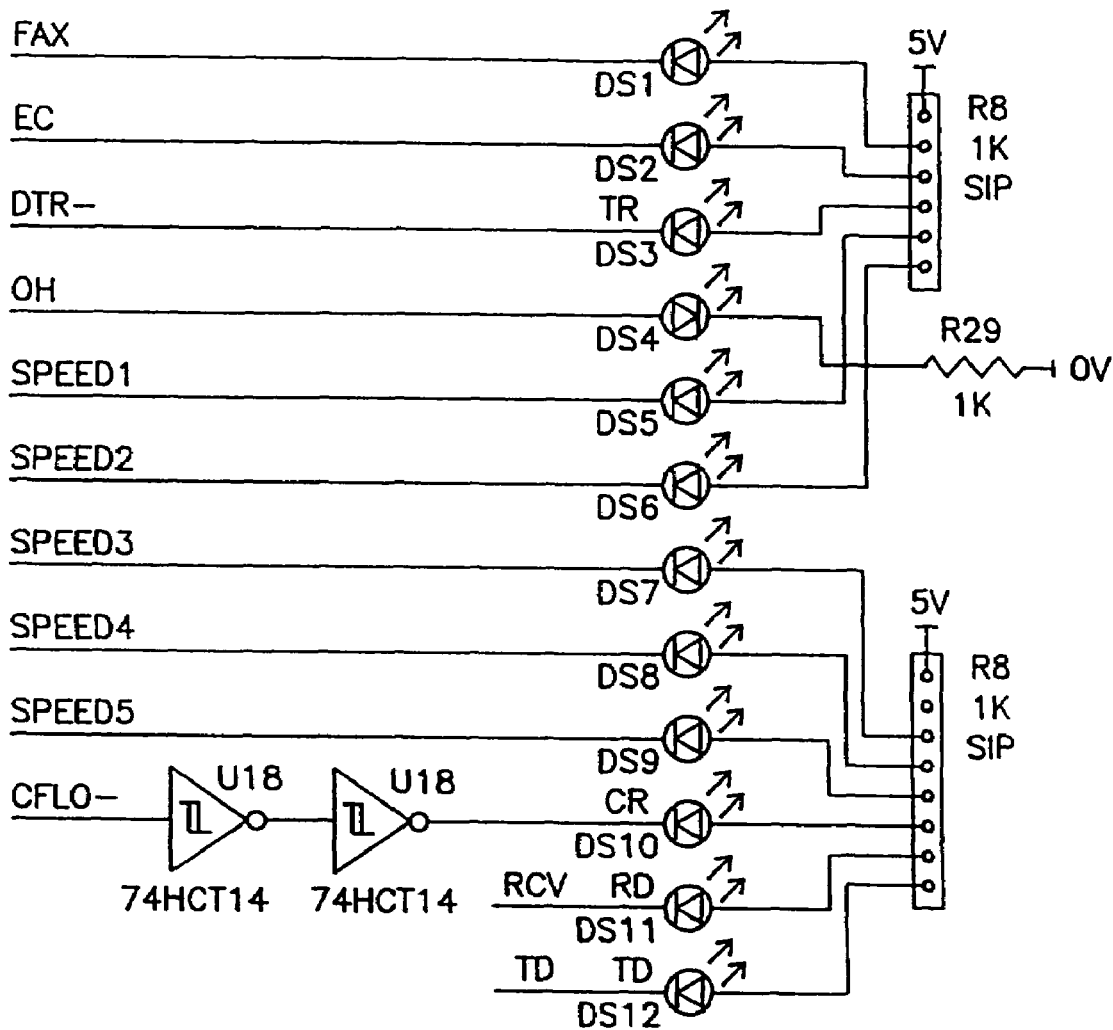

The interface between the main controller circuit 313 and the personal computer is through SIO circuit 314 and RS232 serial interface 315. These interfaces are described more fully in conjunction with the detailed electrical schematic diagrams of FIG. 6A-C. RS232 connection J1 is shown on FIG. 6A with the associated control circuit and interface circuitry used to generate and receive the appropriate RS232 standard signals for a serial communications interface with a personal computer. FIG. 6B is a detailed electrical schematic diagram showing the generation of various voltages for powering the hardware components of the electrical schematic diagrams of hardware components 20. The power for the present hardware components is received on connector J5 and controlled by power switch S34. From this circuitry of FIG. 6B, plus and minus 12 volts, plus five volts and minus five volts are derived for operating the various RAM chips, controller chips and support circuitry of the present system. Figure C shows the interconnection of the status LED's found on the front display of the box 20.

Figure 10A:
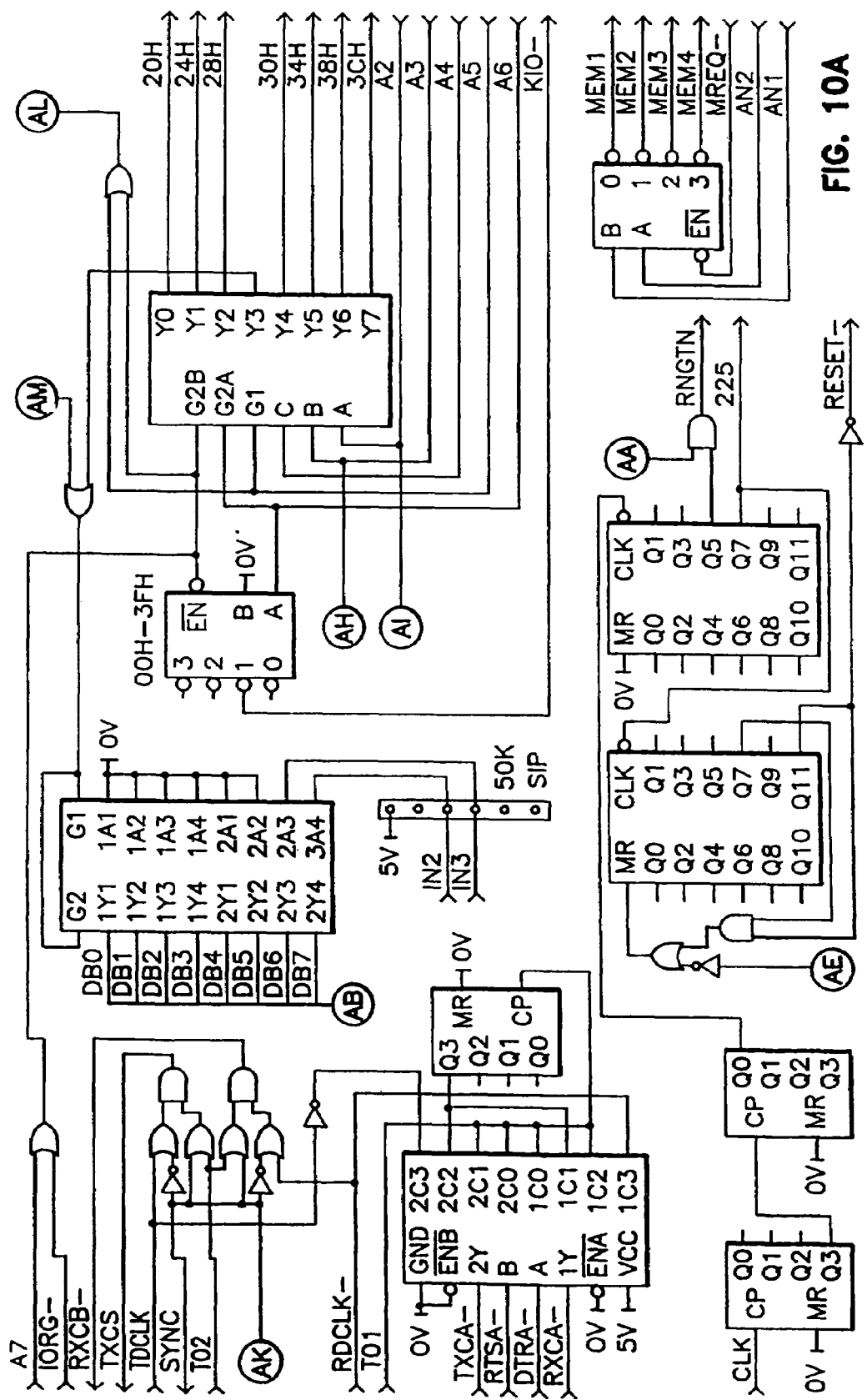
Figure 10B:
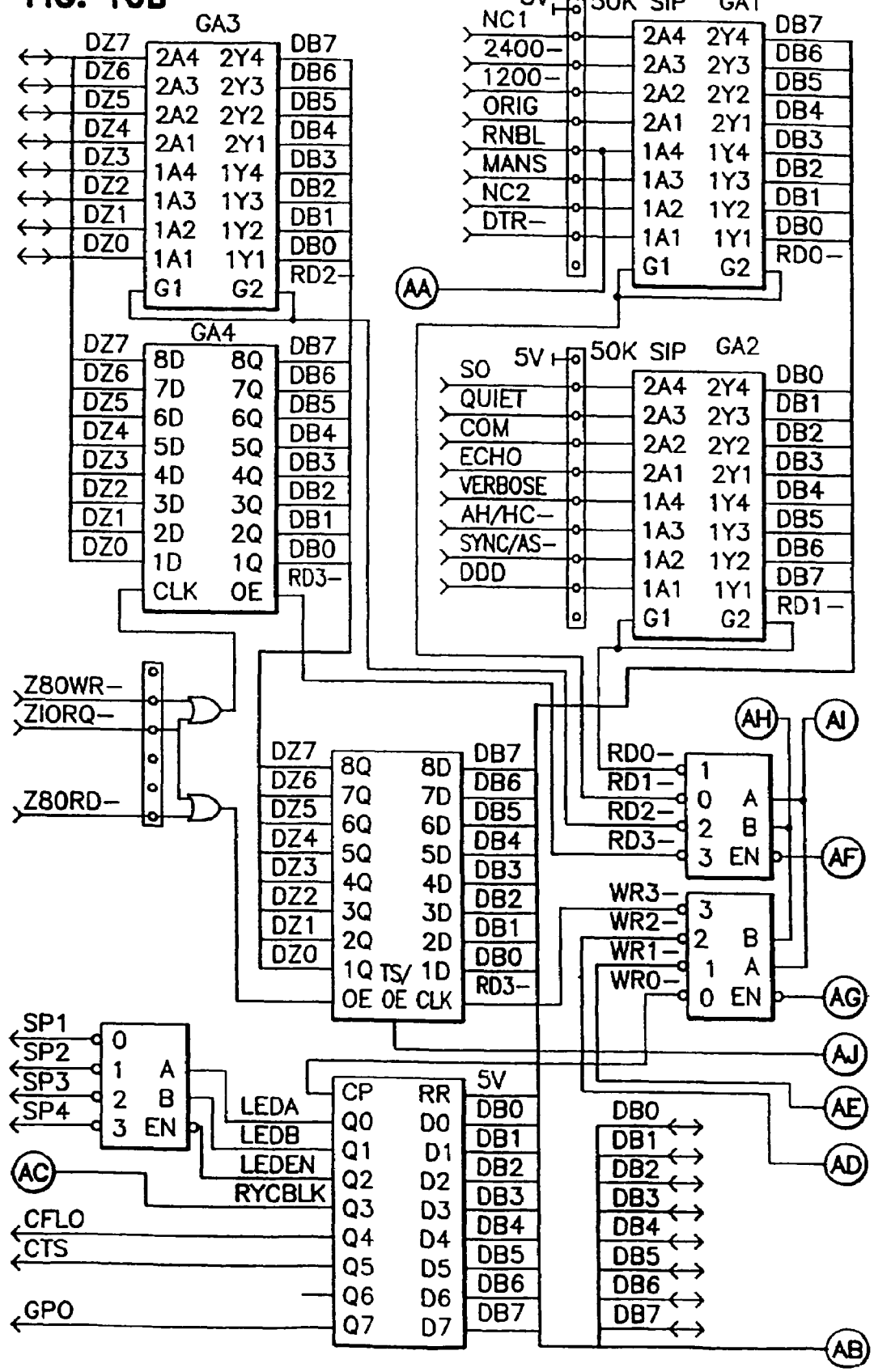
Figure 10C:
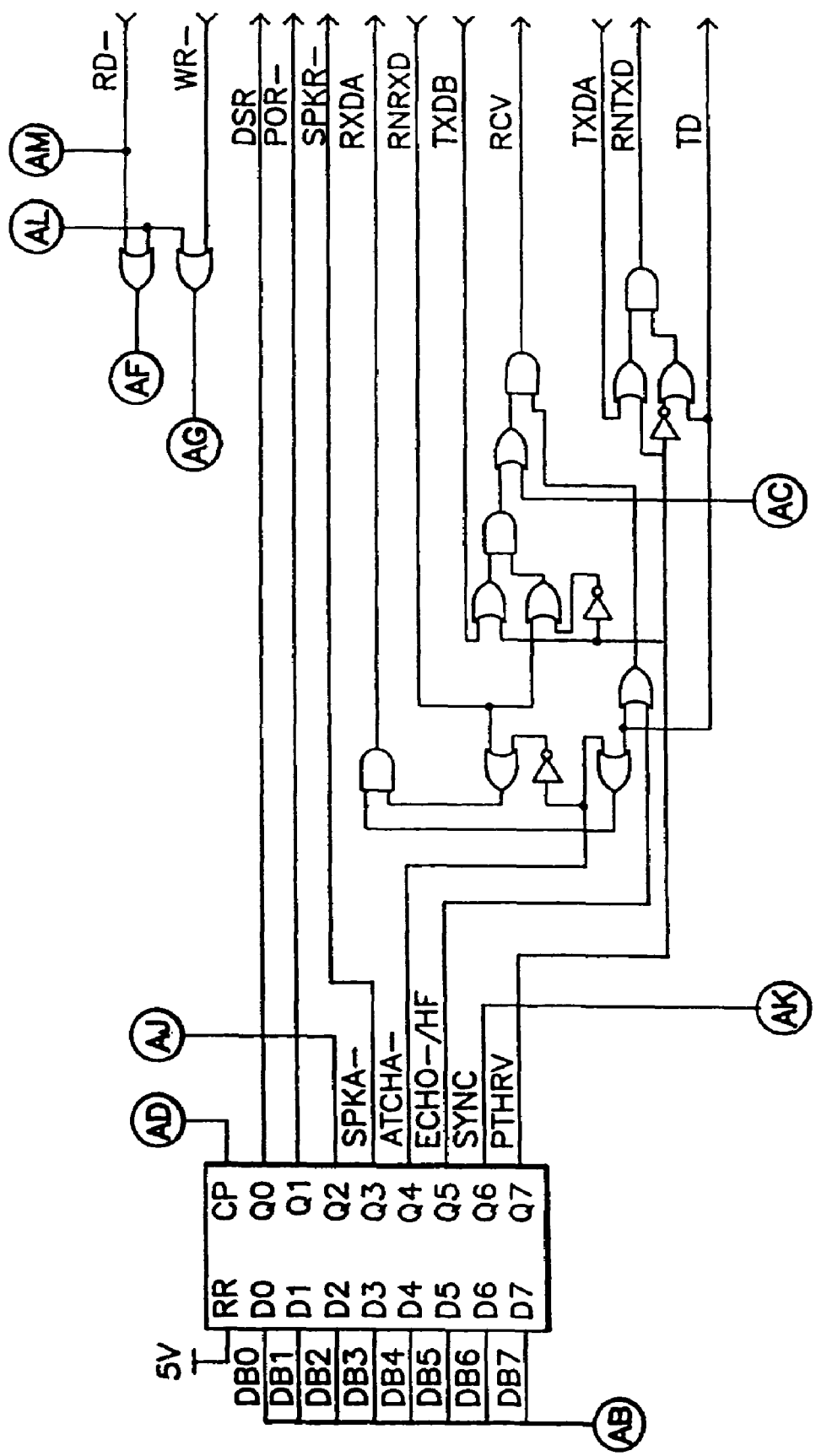

Finally, the "glue logic" used to support various functions in the hardware components 20 are described in conjunction with the detailed electrical schematic diagrams of FIGS. 10A-10C. The connections between FIGS. 10A and 10C and the previous schematic diagrams is made via the labels for each of the lines. For example, the LED status lights are controlled and held active by direct addressing and data control of latches GA1 and GA2. For a more detailed description of the connection of the glue logic of FIGS. 10A-10C, the gate array U19 is shown connected in FIGS. 5A and 5B.

Packet Protocol Between the PC and the Hardware Component

A special packet protocol is used for communication between the hardware components 20 and the personal computer (PC) 10. The protocol is used for transferring different types of information between the two devices such as the transfer of DATA, VOICE, and QUALIFIED information. The protocol also uses the BREAK as defined in CCITT X.28 as a means to maintain protocol synchronization. A description of this BREAK sequence is also described in the Statutory Invention Registration entitled "ESCAPE METHODS FOR MODEM COMMUNICATIONS", to Timothy D. Gunn filed Jan. 8, 1993, which is hereby incorporated by reference.

The protocol has two modes of operation. One mode is packet mode and the other is stream mode. The protocol allows mixing of different types of information into the data stream without having to physically switch modes of operation. The hardware component 20 will identify the packet received from the computer 10 and perform the appropriate action according to the specifications of the protocol. If it is a data packet, then the controller 313 of hardware component 20 would send it to the data pump circuit 311. If the packet is a voice packet, then the controller 313 of hardware component 20 would distribute that information to the Voice DSP 306. This packet transfer mechanism also works in the reverse, where the controller 313 of hardware component 20 would give different information to the computer 10 without having to switch into different modes. The packet protocol also allows commands to be sent to either the main controller 313 directly or to the Voice DSP 306 for controlling different options without having to enter a command state.

Packet mode is made up of 8 bit asynchronous data and is identified by a beginning synchronization character (01 hex) followed by an ID/LI character and then followed by the information to be sent. In addition to the ID/LI character codes defined below, those skilled in the art will readily recognize that other ID/LI character codes could be defined to allow for additional types of packets such as video data, or alternate voice compression algorithm packets such as Codebook Excited Linear Predictive Coding (CELP) algorithm, GSM, RPE, VSELP, etc.

Stream mode is used when large amounts of one type of packet (VOICE, DATA, or QUALIFIED) is being sent. The transmitter tells the receiver to enter stream mode by a unique command. Thereafter, the transmitter tells the receiver to terminate stream mode by using the BREAK command followed by an "AT" type command. The command used to terminate the stream mode can be a command to enter another type of stream mode or it can be a command to enter back into packet mode.

Currently there are 3 types of packets used: DATA, VOICE, and QUALIFIED. Table 1 shows the common packet parameters used for all three packet types. Table 2 shows the three basic types of packets with the sub-types listed.

TABLE 1

Packet Parameters

1. Asynchronous transfer
2. 8 bits, no parity
3. Maximum packet length of 128 bytes
   IDentifier byte = 1
   Information = 127
4. SPEED
   variable from 9600 to 57600
   default to 19200

TABLE 2

Packet Types

1. Data
2. Voice
3. Qualified:
   a. COMMAND
   b. RESPONSE
   c. STATUS
   d. FLOW CONTROL
   e. BREAK
   f. ACK
   g. NAK
   h. STREAM A Data Packet is shown in Table 1 and is used for normal data transfer between the controller 313 of hardware component 20 and the computer 10 for such things as text, file transfers, binary data and any other type of information presently being sent through modems. All packet transfers begin with a synch character 01 hex (synchronization byte). The Data Packet begins with an ID byte which specifies the packet type and packet length. Table 3 describes the Data Packet byte structure and Table 4 describes the bit structure of the ID byte of the Data Packet. Table 5 is an example of a Data Packet with a byte length of 6. The value of the LI field is the actual length of the data field to follow, not counting the ID byte.

TABLE 3

Data Packet Byte Structure byte 1 = 01h (sync byte)
byte 2 = ID/LI (ID byte/length indicator)
bytes 3-127 = data (depending on LI)

| 01   | ID | data | data | data | data | data |
|------|----|------|------|------|------|------|
| SYNC | LI |      |      |      |      |      |

TABLE 4

ID Byte of Data Packet

Bit 7 identifies the type of packet
Bits 6-0 contain the LI or length indicator portion of the ID byte

| 7 | 6 | 5 | 4 | 3 | 2 | 1 | 0 |
|---|---|---|---|---|---|---|---|
| 0 | LI (Length Indicator) = 1 to 127 |||||||

TABLE 5

Data Packet Example
LI (length indicator) = 6

| 01   | 06 | data | data | data | data | data | data |
|------|----|------|------|------|------|------|------|
| SYNC | ID |      |      |      |      |      |      |

The Voice Packet is used to transfer compressed VOICE messages between the controller 313 of hardware component 20 and the computer 10. The Voice Packet is similar to the Data Packet except for its length which is, in the preferred embodiment, currently fixed at 23 bytes of data. Once again, all packets begin with a synchronization character chosen in the preferred embodiment to be 01 hex (01H). The ID byte of the Voice Packet is completely a zero byte: all bits are set to zero. Table 6 shows the ID byte of the Voice Packet and Table 7 shows the Voice Packet byte structure.

TABLE 6

ID Byte of Voice Packet

| 7 | 6 | 5 | 4 | 3 | 2 | 1 | 0 |
|---|---|---|---|---|---|---|---|
| 0 | LI (Length Indicator) = 0 |||||||

TABLE 7

Voice Packet Byte Structure

LI (length indicator) = 0
23 bytes of data

| 01   | 00 | data | data | data | data | data |
|------|----|------|------|------|------|------|
| SYNC | ID |      |      |      |      |      |

The Qualified Packet is used to transfer commands and other non-data/voice related information between the controller 313 of hardware component 20 and the computer 10. The various species or types of the Qualified Packets are described below and are listed above in Table 2. Once again, all packets start with a synchronization character chosen in the preferred embodiment to be 01 hex (01H). A Qualified Packet starts with two bytes where the first byte is the ID byte and the second byte is the QUALIFIER type identifier. Table 8 shows the ID byte for the Qualified Packet, Table 9 shows the byte structure of the Qualified Packet and Tables 10-12 list the Qualifier Type byte bit maps for the three types of Qualified Packets.

TABLE 8

ID Byte of Qualified Packet

| 7 | 6 | 5 | 4 | 3 | 2 | 1 | 0 |
|---|---|---|---|---|---|---|---|
| 1 | LI (Length Indicator) = 1 to 127 | | | | | | |

The Length Identifier of the ID byte equals the amount of data which follows including the QUALIFIER byte (QUAL byte+DATA). If LI=1, then the Qualifier Packet contains the Q byte only.

TABLE 9

Qualifier Packet Byte Structure

| 01 | 85 | QUAL | data | data | data | data |
|----|----|----|------|------|------|------|
| SYNC | ID | BYTE | | | | |

The bit maps of the Qualifier Byte (QUAL BYTE) of the Qualified Packet are shown in Tables 10-12. The bit map follows the pattern whereby if the QUAL byte=0, then the command is a break. Also, bit 1 of the QUAL byte designates ack/nak, bit 2 designates flow control and bit 6 designates stream mode command. Table 10 describes the Qualifier Byte of Qualified Packet, Group 1 which are immediate commands. Table 11 describes the Qualifier Byte of Qualified Packet, Group 2 which are stream mode commands in that the command is to stay in the designated mode until a BREAK+INIT command string is sent. Table 12 describes the Qualifier Byte of Qualified Packet, Group 3 which are information or status commands.

TABLE 10

Qualifier Byte of Qualified Packet: Group 1

| 7 | 6 | 5 | 4 | 3 | 2 | 1 | 0 | |
|---|---|---|---|---|---|---|---|---|
| x | x | x | x | x | x | x | x | |
| 0 | 0 | 0 | 0 | 0 | 0 | 0 | 0 | = break |
| 0 | 0 | 0 | 0 | 0 | 0 | 1 | 0 | = ACK |
| 0 | 0 | 0 | 0 | 0 | 0 | 1 | 1 | = NAK |
| 0 | 0 | 0 | 0 | 0 | 1 | 0 | 0 | = xoff or stop sending data |
| 0 | 0 | 0 | 0 | 0 | 1 | 0 | 1 | = xon or resume sending data |
| 0 | 0 | 0 | 0 | 1 | 0 | 0 | 0 | = cancel fax |

TABLE 11

Qualifier Byte of Qualified Packet: Group 2

| 7 | 6 | 5 | 4 | 3 | 2 | 1 | 0 | |
|---|---|---|---|---|---|---|---|---|
| x | x | x | x | x | x | x | x | |
| 0 | 1 | 0 | 0 | 0 | 0 | 0 | 1 | = stream command mode |
| 0 | 1 | 0 | 0 | 0 | 0 | 1 | 0 | = stream data |
| 0 | 1 | 0 | 0 | 0 | 0 | 1 | 1 | = stream voice |
| 0 | 1 | 0 | 0 | 0 | 1 | 0 | 0 | = stream video |
| 0 | 1 | 0 | 0 | 0 | 1 | 0 | 1 | = stream A |
| 0 | 1 | 0 | 0 | 0 | 1 | 1 | 0 | = stream B |
| 0 | 1 | 0 | 0 | 0 | 1 | 1 | 1 | = stream C |

The Qualifier Packet indicating stream mode and BREAK attention is used when a large of amount of information is sent (voice, data . . . ) to allow the highest throughput possible. This command is mainly intended for use in DATA mode but can be used in any one of the possible modes. To change from one mode to another, a break-init sequence would be given. A break "AT . . . <cr>" type command would cause a change in state and set the serial rate from the "AT" command.

TABLE 12

Qualifier Byte of Qualified Packet: Group 3

| 7 | 6 | 5 | 4 | 3 | 2 | 1 | 0 | |
|---|---|---|---|---|---|---|---|---|
| x | x | x | x | x | x | x | x | |
| 1 | 0 | 0 | 0 | 0 | 0 | 0 | 0 | = commands |
| 1 | 0 | 0 | 0 | 0 | 0 | 0 | 1 | = responses |
| 1 | 0 | 0 | 0 | 0 | 0 | 1 | 0 | = status |

Cellular Supervisory Packet

In order to determine the status of the cellular link, a supervisory packet shown in Table 13 is used. Both sides of the cellular link will send the cellular supervisory packet every 3 seconds. Upon receiving the cellular supervisory packet, the receiving side will acknowledge it using the ACK field of the cellular supervisory packet. If the sender does not receive an acknowledgement within one second, it will repeat sending the cellular supervisory packet up to 12 times. After 12 attempts of sending the cellular supervisory packet without an acknowledgement, the sender will disconnect the line. Upon receiving an acknowledgement, the sender will restart its 3 second timer. Those skilled in the art will readily recognize that the timer values and wait times selected here may be varied without departing from the spirit or scope of the present invention.

TABLE 13

Cellular Supervisory Packet Byte Structure

| 8F | ID | LI | ACK | data | data | data |
|----|----|----|-----|------|------|------|

Speech Compression

The Speech Compression algorithm described above for use in transmitting voice over data accomplished via the voice control circuit 306. Referring once again to FIG. 3, the user is talking either through the handset, the headset or the microphone/speaker telephone interface. The analog voice signals are received and digitized by the telephone CODEC circuit 305. The digitized voice information is passed from the digital telephone CODEC circuit 305 to the voice control circuits 306. The digital signal processor (DSP) of the voice control circuit 306 is programmed to do the voice compression algorithm. The source code programmed into the voice control DSP is in the attached appendix. The DSP of the voice control circuit 306 compresses the speech and places the compressed digital representations of the speech into special packets described more fully below. As a result of the voice compression algorithm, the compressed voice information is passed to the dual port ram circuit 308 for either forwarding and storage on the disk of the personal computer via the RS232 serial interface or for multiplexing with conventional modem data to be transmitted over the telephone line via the telephone line interface circuit 309 in the voice-over-data mode of operation Show and Tell function 123.

Speech Compression Algorithm

To multiplex high-fidelity speech with digital data and transmit both over the over the telephone line, a high available bandwidth would normally be required. In the present invention, the analog voice information is digitized into 8-bit PCM data at an 8 kHz sampling rate producing a serial bit stream of 64,000 bps serial data rate. This rate cannot be transmitted over the telephone line. With the Speech Compression algorithm described below, the 64 kbs digital voice data is compressed into a 9500 bps encoding bit stream using a fixed-point (non-floating point) DSP such that the compressed speech can be transmitted over the telephone line multiplexed with asynchronous data. This is accomplished in an efficient manner such that enough machine cycles remain during real time speech compression to allow to allow for echo cancellation in the same fixed-point DSP.

A silence detection function is used to detect quiet intervals in the speech signal which allows the data processor to substitute asynchronous data in lieu of voice data packets over the telephone line to efficiently time multiplex the voice and asynchronous data transmission. The allocation of time for asynchronous data transmission is constantly changing depending on how much silence is on the voice channel.

The voice compression algorithm of the present system relies on a model of human speech which shows that human speech contains redundancy inherent in the voice patterns. Only the incremental innovations (changes) need to be transmitted. The algorithm operates on 128 digitized speech samples (20 milliseconds at 6400 Hz), divides the speech samples into time segments of 32 samples (5 milliseconds) each, and uses predicted coding on each segment. Thus, the input to the algorithm could be either PCM data sampled at 6400 Hz or 8000 Hz. If the sampling is at 8000 Hz, or any other selected sampling rate, the input sample data stream must be decimated from 8000 Hz to 6400 Hz before processing the speech data. At the output, the 6400 Hz PCM signal is interpolated back to 8000 Hz and passed to the CODEC.

With this algorithm, the current segment is predicted as best as possible based on the past recreated segments and a difference signal is determined. The difference values are compared to the stored difference values in a lookup table or code book, and the address of the closest value is sent to the remote site along with the predicted gain and pitch values for each segment. In this fashion, the entire 20 milliseconds of speech can be represented by 190 bits, thus achieving an effective data rate of 9500 bps.

To produce this compression, the present system includes a unique Vector Quantization (VQ) speech compression algorithm designed to provide maximum fidelity with minimum compute power and bandwidth. The VQ algorithm has two major components. The first section reduces the dynamic range of the input speech signal by removing short term and long term redundancies. This reduction is done in the waveform domain, with the synthesized part used as the reference for determining the incremental "new" content. The second section maps the residual signal into a code book optimized for preserving the general spectral shape of the speech signal.

Figure 11:
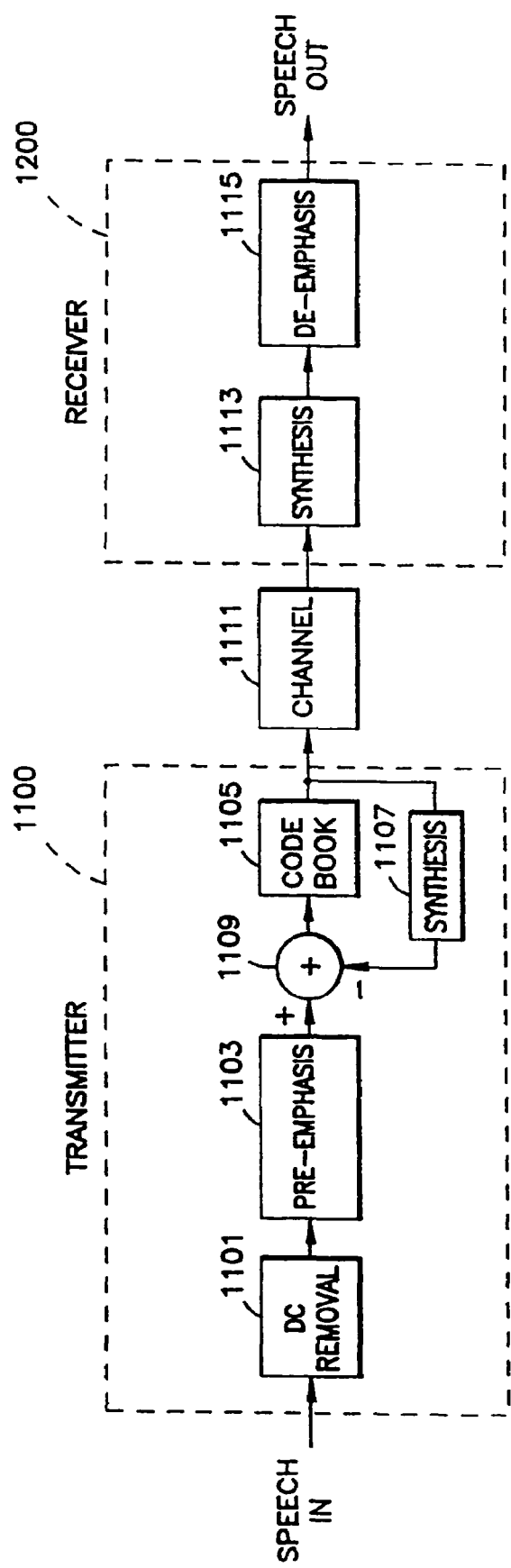
FIG. 11 is a signal flow diagram of the speech compression algorithm.

FIG. 11 is a high level signal flow block diagram of the speech compression algorithm used in the present system to compress the digitized voice for transmission over the telephone line in the voice over data mode of operation or for storage and use on the personal computer. The transmitter and receiver components are implemented using the programmable voice control DSP/CODEC circuit 306 shown in FIG. 3.

The DC removal stage 1101 receives the digitized speech signal and removes the D.C. bias by calculating the long-term average and subtracting it from each sample. This ensures that the digital samples of the speech are centered about a zero mean value. The pre-emphasis stage 1103 whitens the spectral content of the speech signal by balancing the extra energy in the low band with the reduced energy in the high band.

The system finds the innovation in the current speech segment by subtracting 1109 the prediction from reconstructed past samples synthesized from synthesis stage 1107. This process requires the synthesis of the past speech samples locally (analysis by synthesis). The synthesis block 1107 at the transmitter performs the same function as the synthesis block 1113 at the receiver. When the reconstructed previous segment of speech is subtracted from the present segment (before prediction), a difference term is produced in the form of an error signal. This residual error is used to find the best match in the code book 1105. The code book 1105 quantizes the error signal using a code book generated from a representative set of speakers and environments. A minimum mean squared error match is determined in segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

The channel corresponds to the telephone line in which the compressed speech bits are multiplexed with data bits using a packet format described below. The voice bits are sent in packets of 5 frames each, each frame corresponding to 20 ms of speech in 128 samples. The size of the packets depends upon the type of compression used. Three compression algorithms are described which will be called 8K, 9.6K and 16K. The 8K and 9.6K algorithms results in a 24 byte packet while the 16K algorithm produces a packet of 48 bytes for each 20 ms speech segment.

Each frame of 20 ms is divided into 4 sub-blocks or segments of 5 ms each. In each sub-block of the data consists of a plurality of bits for the long term predictor, a plurality of bits for the long term predictor gain, a plurality of bits for the sub-block gain, and a plurality of bits for each code book entry for each 5 ms. The bits for the code book entries consists of four or five table entries in a 256 long code book of 1.25 ms duration. In the code book block, each 1.25 ms of speech is looked up in a 256 word code book for the best match. The table entry is transmitted rather than the actual samples. The code book entries are pre-computed from representative speech segments, as described more fully below.

On the receiving end 1200, the synthesis block 1113 at the receiver performs the same function as the synthesis block 1107 at the transmitter. The synthesis block 1113 reconstructs the original signal from the voice data packets by using the gain and pitch values and code book address corresponding to the error signal most closely matched in the code book. The code book at the receiver is similar to the code book 1105 in the transmitter. Thus the synthesis block recreates the original pre-emphasized signal. The de-emphasis stage 1115 inverts the pre-emphasis operation by restoring the balance of original speech signal.

The complete speech compression algorithm is summarized as follows:

a) Digitally sample the voice to produce a PCM sample bit stream sampled at 16,000 samples per second, 9600 samples per second or 8,000 samples per second.

b) Decimate the sampled data to produce a common sampling rate of 8,000 samples per second from all of the actual sample rates.

c) Remove any D.C. bias in the speech signal.

d) Pre-emphasize the signal.

e) Find the innovation in the current speech segment by subtracting the prediction from reconstructed past samples. This step requires the synthesis of the past speech samples locally (analysis by synthesis) such that the residual error is fed back into the system.

f) Quantize the error signal using a code book generated from a representative set of speakers and environments. A minimum mean squared error match is determined in 5 ms segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

g) At the transmitter and the receiver, reconstruct the speech from the quantized error signal fed into the inverse of the function in step (e) above. Use this signal for analysis by synthesis and for the output to the reconstruction stage below.

h) Use a de-emphasis filter to reconstruct the output.

The major advantages of this approach over other low-bit-rate algorithms are that there is no need for any complicated calculation of reflection coefficients (no matrix inverse or lattice filter computations). Also, the quantization noise in the output speech is hidden under the speech signal and there are no pitch tracking artifacts: the speech sounds "natural", with only minor increases of background hiss at lower bit-rates. The computational load is reduced significantly compared to a VSELP algorithm and variations of the present algorithm thus provides bit rates of 8, 9.6 and 16 Kbit/s, and can also provide bit rates of 9.2 kbits/s, 9.5 kbits/s and many other rates. The total delay through the analysis section is less than 20 milliseconds in the preferred embodiment. The present algorithm is accomplished completely in the waveform domain and there is no spectral information being computed and there is no filter computations needed.

Detailed Description of the Speech Compression Algorithm

The speech compression algorithm is described in greater detail with reference to FIGS. 12 through 15, and with reference to the block diagram of the hardware components of the present system shown at FIG. 3. The voice compression algorithm operates within the programmed control of the voice control DSP circuit 306. In operation, the speech or analog voice signal is received through the telephone interface 301, 302 or 303 and is digitized by the digital telephone CODEC circuit 305. The CODEC for circuit 305 is a companding μ-law CODEC. The analog voice signal from the telephone interface is band-limited to about 3,000 Hz and sampled at a selected sampling rate by digital telephone CODEC 305. The sample rates in the preferred embodiment of the present invention are 8 kb/s, 9.6 kb/s and 16 kb/s. Each sample is encoded into 8-bit PCM data producing a serial 64 kb/s, 76.8 kb/s or 128 kb/s signal, respectively. The digitized samples are passed to the voice control DSP/CODEC of circuit 306. There, the 8-bit μ-law PCM data is converted to 13-bit linear PCM data. The 13-bit representation is necessary to accurately represent the linear version of the logarithmic 8-bit μ-law PCM data. With linear PCM data, simpler mathematics may be performed on the PCM data.

The voice control DSP/CODEC of circuit 306 correspond to the single integrated circuit U8 shown in FIGS. 9A and 9B as a WE® DSP16C Digital Signal Processor/CODEC from AT&T Microelectronics which is a combined digital signal processor and a linear CODEC in a single chip as described above. The digital telephone CODEC of circuit 305 corresponds to integrated circuit U12 shown in FIG. 9(b) as a T7540 companding μ-law CODEC.

The sampled and digitized PCM voice signals from the telephone μ-law CODEC 305 shown in FIG. 3 are passed to the voice control DSP/CODEC circuit 308 via direct data lines clocked and synchronized to a clocking frequency. The sample rates in CODEC 305 in the preferred embodiment of the present invention are 8 kb/s, 9.6 kb/s and 16 kb/s. The digital samples are loaded into the voice control DSP/CODEC one at a time through the serial input and stored into an internal queue held in RAM, converted to linear PCM data and decimated to a sample rate of 6.4 bb/s. As the samples are loaded into the end of the queue in the RAM of the voice control DSP, the samples at the head of the queue are operated upon by the voice compression algorithm. The voice compression algorithm then produces a greatly compressed representation of the speech signals in a digital packet form. The compressed speech signal packets are then passed to the dual port RAM circuit 308 shown in FIG. 3 for use by the main controller circuit 313 for either transferring in the voice-over-data mode of operation or for transfer to the personal computer for storage as compressed voice for functions such as telephone answering machine message data, for use in the multi-media documents and the like.

In the voice-over-data mode of operation, voice control DSP/CODEC circuit 306 of FIG. 3 will be receiving digital voice PCM data from the digital telephone CODEC circuit 305, compressing it and transferring it to dual port RAM circuit 308 for multiplexing and transfer over the telephone line. This is the transmit mode of operation of the voice control DSP/CODEC circuit 306 corresponding to transmitter block 1100 of FIG. 11 and corresponding to the compression algorithm of FIG. 12.

Concurrent with this transmit operation, the voice control DSP/CODEC circuit 306 is receiving compressed voice data packets from dual port RAM circuit 308, uncompressing the voice data and transferring the uncompressed and reconstructed digital PCM voice data to the digital telephone CODEC 305 for digital to analog conversion and eventual transfer to the user through the telephone interface 301, 302, 304. This is the receive mode of operation of the voice control DSP/CODEC circuit 306 corresponding to receiver block 1200 of FIG. 11 and corresponding to the decompression algorithm of FIG. 13. Thus, the voice-control DSP/CODEC circuit 306 is processing the voice data in both directions in a full-duplex fashion.

The voice control DSP/CODEC circuit 306 operates at a clock frequency of approximately 24.576 MHz while processing data at sampling rates of approximately 8 KHz in both directions. The voice compression/decompression algorithms and packetization of the voice data is accomplished in a quick and efficient fashion to ensure that all processing is done in real-time without loss of voice information. This is accomplished in an efficient manner such that enough machine cycles remain in the voice control DSP circuit 306 during real time speech compression to allow real time acoustic and line echo cancellation in the same fixed-point DSP.

In programmed operation, the availability of an eight-bit sample of PCM voice data from the μ-law digital telephone CODEC circuit 305 causes an interrupt in the voice control DSP/CODEC circuit 306 where the sample is loaded into internal registers for processing. Once loaded into an internal register it is transferred to a RAM address which holds a queue of samples. The queued PCM digital voice samples are converted from 8-bit μ-law data to a 13-bit linear data format using table lookup for the conversion. Those skilled in the art will readily recognize that the digital telephone CODEC circuit 305 could also be a linear CODEC.

Sample Rate Decimation

The sampled and digitized PCM voice signals from the telephone μ-law CODEC 305 shown in FIG. 3 are passed to the voice control DSP/CODEC circuit 308 via direct data lines clocked and synchronized to a clocking frequency. The sample rates in the preferred embodiment of the present invention are 8 kb/s, 9.6 kb/s and 16 kb/s. The digital samples for the 9.6K and 8K algorithms are decimated using a digital decimation process to produces a 6.4K and 6K sample rate, respectively. At the 16K sampling rate for the 16K algorithm, no decimation is needed for the voice compression algorithm.

Referring to FIG. 11, the decimated digital samples are shown as speech entering the transmitter block 1100. The transmitter block, of course, is the mode of operation of the voice-control DSP/CODEC circuit 306 operating to receive local digitized voice information, compress it and packetize it for transfer to the main controller circuit 313 for transmission on the telephone line. The telephone line connected to telephone line interface 309 of FIG. 3 corresponds to the channel 1111 of FIG. 11.

A frame rate for the voice compression algorithm is 20 milliseconds of speech for each compression. This correlates to 128 samples to process per frame for the 6.4K decimated sampling rate. When 128 samples are accumulated in the queue of the internal DSP RAM, the compression of that sample frame is begun.

Data Flow Description

The voice-control DSP/CODEC circuit 306 is programmed to first remove the DC component 1101 of the incoming speech. The DC removal is an adaptive function to establish a center base line on the voice signal by digitally adjusting the values of the PCM data. This corresponds to the DC removal stage 1203 of the software flow chart of FIG. 12. The formula for removal of the DC bias or drift is as follows:

$$x(n) = s(n) - s(n-1) + \alpha * x(n-1) \text{ where } \alpha = \frac{32735}{32768}$$

and where n=sample number,
s(n) is the current sample, and
x(n) is the sample with the DC bias removed.
The removal of the DC is for the 20 millisecond frame of voice which amounts to 128 samples at the 6.4K decimated sampling rate which corresponds to the 9.6K ALGORITHM. The selection of α is based on empirical observation to provide the best result.

Figure 12:
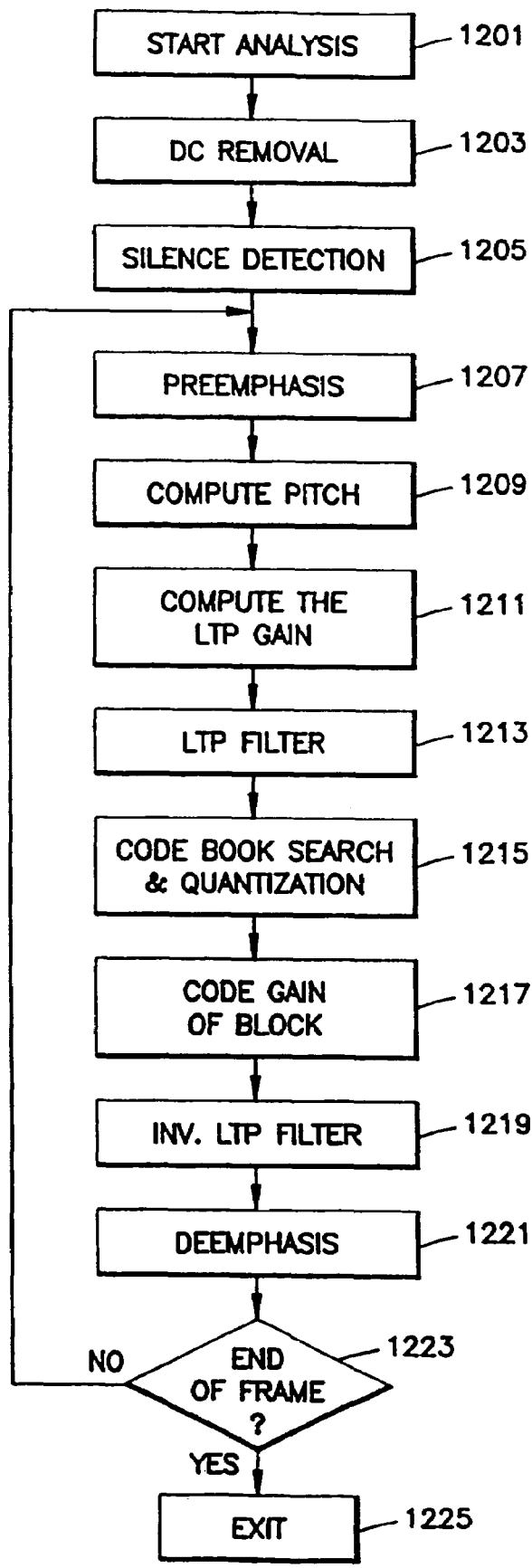
FIG. 12 is a detailed function flow diagram of the speech compression algorithm.
Figure 14:
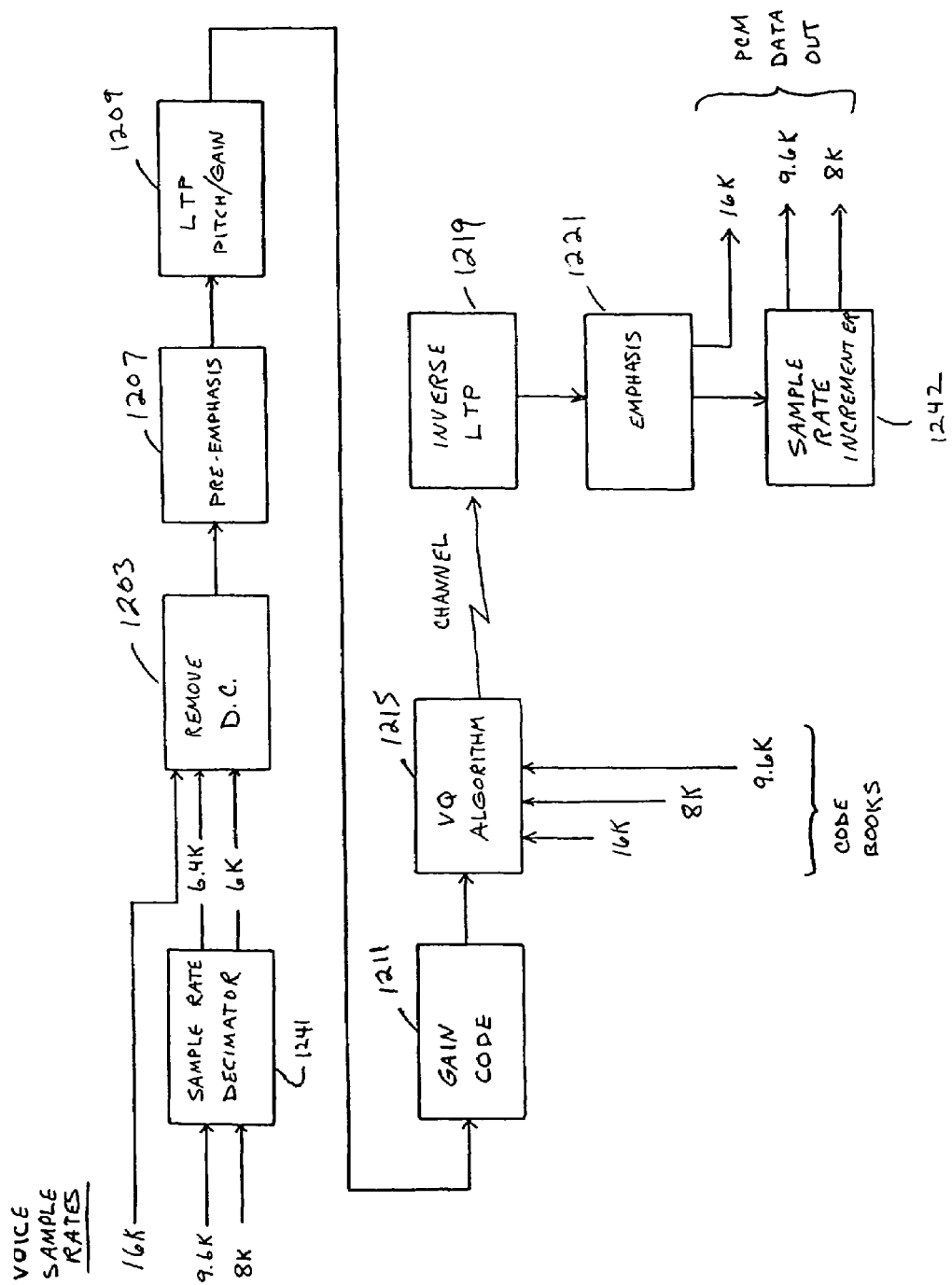
FIG. 14 is a detailed function flow diagram of the echo cancellation algorithm.
Figure 15:
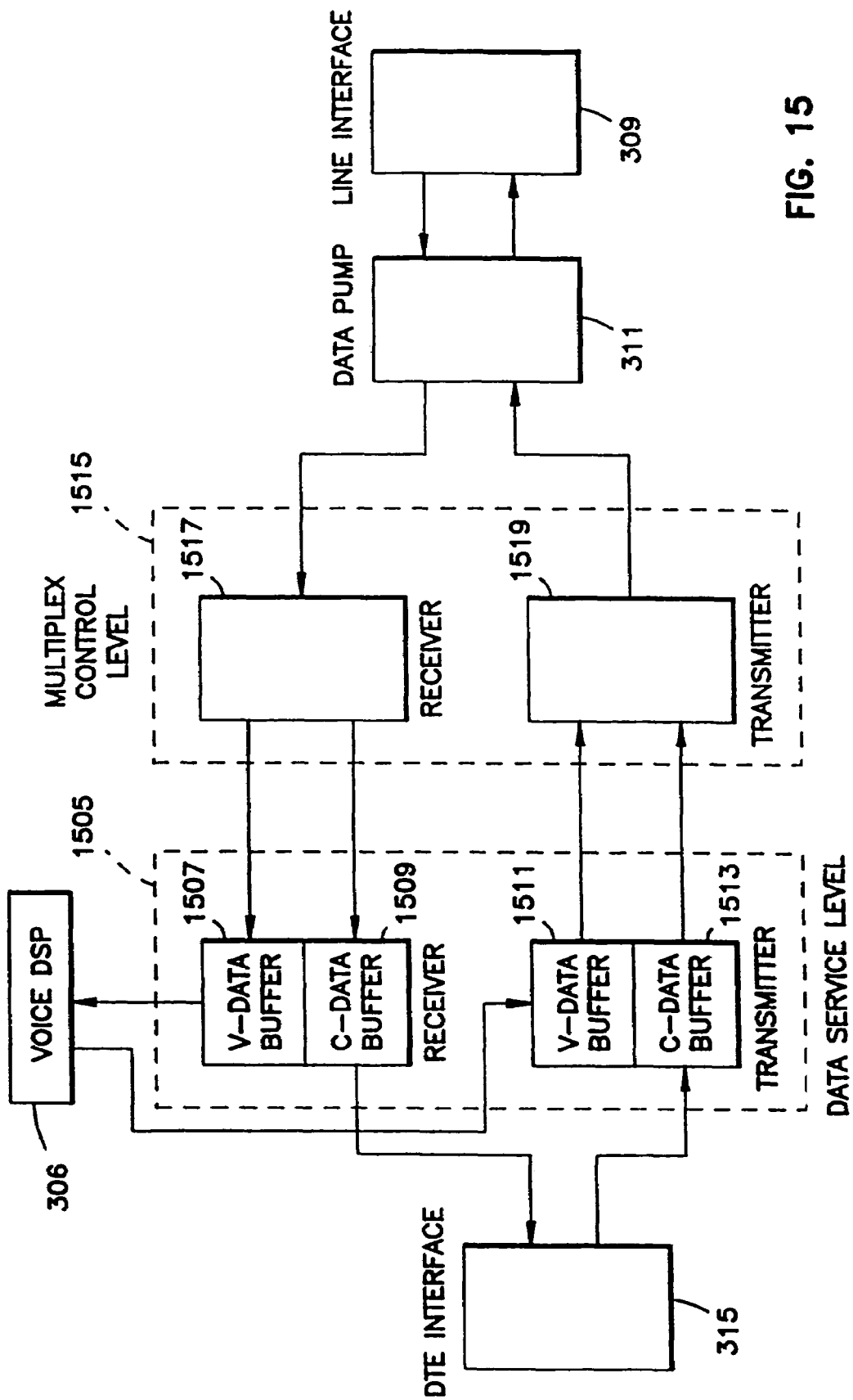
FIG. 15 is a detailed function flow diagram of the voice/data multiplexing function.

Referring again to FIG. 12, the voice compression algorithm in a control flow diagram is shown which will assist in the understanding of the block diagram of FIG. 11. FIG. 14 is a simplified data flow description of the flow chart of FIG. 12 showing the sample rate decimator 1241 and the sample rate incrementor 1242. The analysis and compression begin at block 1201 where the 13-bit linear PCM speech samples are accumulated until 128 samples (for the 6.4K decimated sampling rate) representing 20 milliseconds of voice or one frame of voice is passed to the DC removal portion of code operating within the programmed voice control DSP/CODEC circuit 306. The DC removal portion of the code described above approximates the base line of the frame of voice by using an adaptive DC removal technique.

A silence detection algorithm 1205 is also included in the programmed code of the DSP/CODEC 306. The silence detection function is a summation of the square of each sample of the voice signal over the frame. If the power of the voice frame falls below a preselected threshold, this would indicate a silent frame. The detection of a silence frame of speech is important for later multiplexing of the V-data (voice data) and C-data (asynchronous computer data) described below. During silent portions of the speech, the main controller circuit 313 will transfer conventional digital data (C-data) over the telephone line in lieu of voice data (V-data). The formula for computing the power is $$PWR = \sum_{n=0}^{128-1} x(n) * x(n)$$

where n is the sample number, and
x(n) is the sample value
If the power PWR is lower than a preselected threshold, then the present voice frame is flagged as containing silence. The 128-sample silent frame is still processed by the voice compression algorithm; however, the silent frame packets are discarded by the main controller circuit 313 so that asynchronous digital data may be transferred in lieu of voice data. The rest of the voice compression is operated upon in segments where there are four segments per frame amounting to 32 samples of data per segment. It is only the DC removal and silence detection which is accomplished over an entire 20 millisecond frame.

The pre-emphasis 1207 of the voice compression algorithm shown in FIG. 12 is the next step. The sub-blocks are first passed through a pre-emphasis stage which whitens the spectral content of the speech signal by balancing the extra energy in the low band with the reduced energy in the high band. The pre-emphasis essentially flattens the signal by reducing the dynamic range of the signal. By using pre-emphasis to flatten the dynamic range of the signal, less of a signal range is required for compression making the compression algorithm operate more efficiently. The formula for the pre-emphasis is $$x(n)=x(n)-\rho*x(n-1) \text{ where } \rho=0.5$$

and where n is the sample number,
x(n) is the sample
Each segment thus amounts to five milliseconds of voice which is equal to 32 samples. Pre-emphasis then is done on each segment. The selection of ρ is based on empirical observation to provide the best result.

The next step is the long-term prediction (LTP). The long-term prediction is a method to detect the innovation in the voice signal. Since the voice signal contains many redundant voice segments, we can detect these redundancies and only send information about the changes in the signal from one segment to the next. This is accomplished by comparing the speech samples of the current segment on a sample by sample basis to the reconstructed speech samples from the previous segments to obtain the innovation information and an indicator of the error in the prediction.

The long-term predictor gives the pitch and the LTP-Gain of the sub-block which are encoded in the transmitted bit stream. In order to predict the pitch in the current segment, we need at least 3 past sub-blocks of reconstructed speech. This gives a pitch value in the range of MIN_PITCH (32) to MAX_PITCH (95). This value is coded with 6-bits. But, in order to accommodate the compressed data rate within a 9600 bps link, the pitch for segments 0 and 3 is encoded with 6 bits, while the pitch for segments 1 and 2 is encoded with 5 bits. When performing the prediction of the Pitch for segments 1 and 2, the correlation lag is adjusted around the predicted pitch value of the previous segment. This gives us a good chance of predicting the correct pitch for the current segment even though the entire range for prediction is not used. The computations for the long-term correlation lag PITCH and associated LTP gain factor $\beta j$ (where j=0, 1, 2, 3 corresponding to each of the four segments of the frame) are done as follows:

For j=min_pitch . . . . max_pitch, first perform the following computations between the current speech samples x(n) and the past reconstructed speech samples x'(n)

$$S_{xx'}(j) = \sum_{i=0}^{31} x(i) * x'(i + \text{MAX\_PITCH} - j)$$

$$S_{xx'}(j) = \sum_{i=0}^{31} x'(i + \text{MAX\_PITCH} - j) * x'(i + \text{MAX\_PITCH} - j)$$

The Pitch j is chosen as that which maximizes $$\frac{S_{xx'}^2}{S_{x'x'}}.$$

Since $\beta j$ is positive, only j with positive $S_{xx'}^2$ is considered.

Since the Pitch is encoded with different number of bits for each sub-segment, the value of min_pitch and max_Pitch (range of the synthesized speech for pitch prediction of the current segment) is computed as follows:

```
if (seg_number = 0 or 3)
{
    min_pitch = MIN_PITCH
    max_pitch = MAX_PITCH
}
if (seg_number = 1 or 2)
{
    min_pitch = prev_pitch − 15
    if (prev_pitch < MIN_PITCH + 15)
        min_pitch = MIN_PITCH
    if (prev_pitch > MAX_PITCH + 15)
        min_pitch = MAX_PITCH − 30
    max_pitch = min_pitch + 30
}
```

The prev_pitch parameter in the above equation, is the of the pitch of the previous sub-segment. The pitch j is the encoded in 6 bits or 5 bits as:

encoded bits=j−min_pitch

The LTP-Gain is given by $$\beta = \frac{S_{xx'}(j)}{S_{x'x'}(j)} \quad \text{for } S_{x'x'}(j) \neq 0$$

The value of the $\beta$ is a normalized quantity between zero and unity for this segment where $\beta$ is an indicator of the correlation between the segments. For example, a perfect sine wave would produce a $\beta$ which would be close to unity since the correlation between the current segments and the previous reconstructed segments should be almost a perfect match so $\beta$ is one. The LTP gain factor is quantized from a LTP Gain Encode Table. This table is characterized in Table 14. The resulting index (bcode) is transmitted to the far end. At the receiver, the LTP Gain Factor is retrieved from Table 15, as follows:

$\beta_q$=dlb_tab[bcode]

TABLE 14

| LTP Gain Encode Table | | | | | |
|---|---|---|---|---|---|
| 0.1 | 0.3 | 0.5 | 0.7 | 0.9 | |
| <———\| | \|———\| | \|———\| | \|———\| | \|———\| | \|———> |
| bcode = 0 | 1 | 2 | 3 | 4 | 5 |

TABLE 15

| LTP Gain Decode Table | | | | | |
|---|---|---|---|---|---|
| $\beta$ = 0.0 | 0.2 | 0.4 | 0.5 | 0.8 | 1.0 |
| <———\| | \|———\| | \|———\| | \|———\| | \|———\| | \|———> |
| bcode = 0 | 1 | 2 | 3 | 4 | 5 |

After the Long-Term Prediction, we pass the signal through a pitch filter to whiten the signal so that all the pitch effects are removed. The pitch filter is given by:

$e(n)=x(n)-\beta_q *x'(n-j)$ where j is the Lag, and $\beta_q$ is the associated Gain.

Next, the error signal is normalized with respect to the maximum amplitude in the sub-segment for vector-quantization of the error signal. The maximum amplitude in the segment is obtained as follows:

$G=\text{MAX}\{|e(n)|\}$

The maximum amplitude (G) is encoded using the Gain Encode Table. This table is characterized in Table 16. The encoded amplitude (gcode) is transmitted to the far end. At the receiver, the maximum amplitude is retrieved from Table 17, as follows:

$G_q$=dlg_tab[gcode]

The error signal e(n) is then normalized by $$e(n) = \frac{e(n)}{G_q}$$

TABLE 16

Gain Encode Table

| G = | 16 | 32 | 64 | 128 | 256 | 512 | 1024 | 2048 | 4096 | 8192 |
|---|---|---|---|---|---|---|---|---|---|---|
| < —\| | \|— | \|— | \|— | \|— | \|— | \|— | \|— | \|— | \|— | \|—> |
| | 0 | 1 | 2 | 3 | 4 | 5 | 6 | 7 | 8 | 9 |

(gcode)

TABLE 17

Gain Decode Table

| G = | 16 | 32 | 64 | 128 | 256 | 512 | 1024 | 2048 | 4096 | 8192 |
|---|---|---|---|---|---|---|---|---|---|---|
| | \|— | \|— | \|— | \|— | \|— | \|— | \|— | \|— | \|— | \|— |
| | 0 | 1 | 2 | 3 | 4 | 5 | 6 | 7 | 8 | 9 |

(gcode)

From the Gain and LTP Gain Encode tables, we can see that we would require 4 bits for gcode and 3 bits for bcode. This results in total of 7 bits for both parameters. In order to reduce the bandwidth of the compressed bit stream, the gcode and bcode parameters are encoded together in 6 bits, as follows:

$BG\text{CODE}=6*gcode+bcode$

The encoded bits for the G and LTP-Gain ($\beta$) at the receiver can be obtained as follows:

$gcode=BG\text{CODE}/6$ $bcode=BG\text{CODE}-6*gcode$

Each segment of 32 samples is divided into 4 vectors of 8 samples each. Each vector is compared to the vectors stored in the CodeBook and the Index of the Code Vector that is closest to the signal vector is selected. The CodeBook consists of 512 entries (512 addresses). The index chosen has the least difference according to the following minimalization formula:

$$\text{Min}\left\{\sum_{i=0}^{7}(x_i - y_i)^2\right\}$$

where $x_i$=the input vector of 8 samples, and
$y_i$=the code book vector of 8 samples The minimization computation, to find the best match between the subsegment and the code book entries is computationally intensive. A brute force comparison may exceed the available machine cycles if real time processing is to be accomplished. Thus, some shorthand processing approaches are taken to reduce the computations required to find the best fit. The above formula can be computed in a shorthand fashion as follows.

By expanding out the above formula, some of the unnecessary terms may be removed and some fixed terms may be pre-computed:

$$(x_i - y_i)^2 = (x_i - y_i)*(x_i - y_i)$$
$$= (x_i^2 - x_iy_i - x_iy_i + y_i^2)$$
$$= (x_i^2 - 2x_iy_i + y_i^2)$$

where $x_i^2$ is a constant so it may be dropped from the formula, and the value of $-\frac{1}{2}\Sigma y_i^2$ may be precomputed and stored as the 9th value in the code book so that the only real-time computation involved is the following formula:

$$\text{Min}\left\{\sum_{i=0}^{7}(x_i y_i)\right\}$$

Thus, for a segment of 32 samples, we will transmit 4 CodeBook Indexes (9 bits each) corresponding to 4 subsegments of 8 samples each. This means, for each segment, we have 36 bits to transmit.

After the appropriate index into the code book is chosen, the input speech samples are replaced by the corresponding vectors in the chosen indexes. These values are then multiplied by the $G_q$ to denormalize the synthesized error signal, e'(n). This signal is then passed through the Inverse Pitch Filter to reintroduce the Pitch effects that was taken out by the Pitch filter. The Inverse Pitch Filter is performed as follows:

$y(n)=e'(n)+\beta_q*x'(n-j)$ where $\beta_q$ is the decoded LTP-Gain from Table 16, and j is the Lag.

The Inverse Pitch Filter output is used to update the synthesized speech buffer which is used for the analysis of the next sub-segment. The update of the state buffer is as follows:

$x'(k)=x'(k+\text{MIN\_PITCH})$ where k=0, . . . , (MAX_PITCH–MIN_PITCH)–1 $x'(l)=y(n)$ where l=MAX_PITCH–MIN_PITCH, . . . , MAX_PITCH–1

The signal is then passed through the deemphasis filter since preemphasis was performed at the beginning of the processing. In the analysis, only the preemphasis state is updated so that we properly satisfy the Analysis-by-Synthesis method of performing the compression. In the Synthesis, the output of the deemphasis filter, s'(n), is passed on to the D/A to generate analog speech. The deemphasis filter is implemented as follows:

$s'(n)=y(n)+\rho*s'(n-1)$ where $\rho=0.5$

Figure 13:
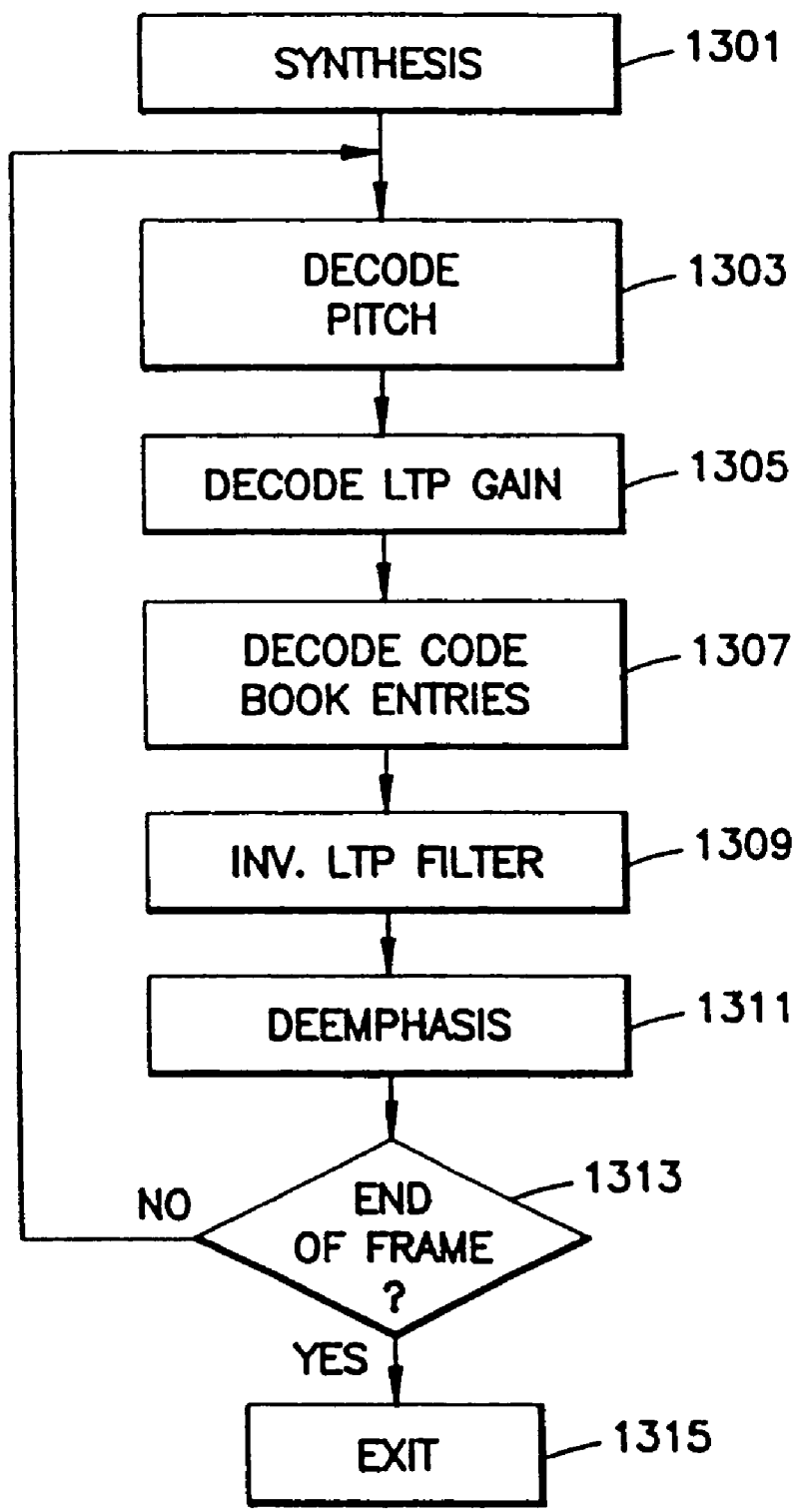
FIG. 13 is a detailed function flow diagram of the speech decompression algorithm.

The voice is reconstructed at the receiving end of the voice-over data link according to the reverse of the compression algorithm as shown as the decompression algorithm in FIG. 13.

If a silence frame is received, the decompression algorithm simply discards the received frame and initialize the output with zeros. If a speech frame is received the pitch, LTP-Gain and GAIN are decoded as explained above. The error signal is reconstructed from the codebook indexes, which is then denormalized with respect to the GAIN value. This signal is then passed through the Inverse filter to generate the reconstructed signal. The Pitch and the LTP-Gain are the decoded values, same as those used in the Analysis. The filtered signal is passed through the Deemphasis filter whose output is passed on to the D/A to put out analog speech.

The compressed frame contains 23 8-bit words and one 6-bit word. Thus a total of 24 words. Total number of bits transferred is 190, which corresponds to 9500 bps as shown in Table 18.

For the 9.6K algorithm, the code book comprises a table of nine columns and 256 rows of floating point data. The first 8 rows correspond to the 8 samples of speech and the ninth entry is the precomputed constant described above as $-\frac{1}{2}\Sigma y_i^2$. An example of the code book data is shown in Table 20 with the complete code book for the 9.6K algorithm described in Appendix B.

TABLE 18

Compressed Frame Packet for 9.6K Algorithm

| 7 | 6 | 5 | 4 | 3 | 2 | 1 | 0 | Bit Number |
|---|---|---|---|---|---|---|---|---|
| S | S | $p_0^5$ | $p_0^4$ | $p_0^3$ | $p_0^2$ | $p_0^1$ | $p_0^0$ | Comp_Frame[0] |
| $V_2^8$ | $V_1^8$ | $V_0^8$ | $p_1^4$ | $p_1^3$ | $p_1^2$ | $p_1^1$ | $p_1^0$ | Comp_Frame[1] |
| $V_5^8$ | $V_4^8$ | $V_3^8$ | $p_2^4$ | $p_2^3$ | $p_2^2$ | $p_2^1$ | $p_2^0$ | Comp_Frame[2] |
| $V_7^8$ | $V_6^8$ | $p_3^5$ | $p_3^4$ | $p_3^3$ | $p_3^2$ | $p_3^1$ | $p_3^0$ | Comp_Frame[3] |
| $V_9^8$ | $V_8^8$ | $BG_0^5$ | $BG_0^4$ | $BG_0^3$ | $BG_0^2$ | $BG_0^1$ | $BG_0^0$ | Comp_Frame[4] |
| $V_{11}^8$ | $V_{10}^8$ | $BG_1^5$ | $BG_1^4$ | $BG_1^3$ | $BG_1^2$ | $BG_1^1$ | $BG_1^0$ | Comp_Frame[5] |
| $V_{13}^8$ | $V_{12}^8$ | $BG_2^5$ | $BG_2^4$ | $BG_2^3$ | $BG_2^2$ | $BG_2^1$ | $BG_2^0$ | Comp_Frame[6] |
| $V_{15}^8$ | $V_{14}^8$ | $BG_3^5$ | $BG_3^4$ | $BG_3^3$ | $BG_3^2$ | $BG_3^1$ | $BG_3^0$ | Comp_Frame[7] |
| $VQ_0^7$ | $VQ_0^6$ | $VQ_0^5$ | $VQ_0^4$ | $VQ_0^3$ | $VQ_0^2$ | $VQ_0^1$ | $VQ_0^0$ | Comp_Frame[8] = LS 8 bits VQ[0] |
| $VQ_1^7$ | $VQ_1^6$ | $VQ_1^5$ | $VQ_1^4$ | $VQ_1^3$ | $VQ_1^2$ | $VQ_1^1$ | $VQ_1^0$ | Comp_Frame[9] = LS 8 bits VQ[1] |
| $VQ_{14}^7$ | $VQ_{14}^6$ | $VQ_{14}^5$ | $VQ_{14}^4$ | $VQ_{14}^3$ | $VQ_{14}^2$ | $VQ_{14}^1$ | $VQ_{14}^0$ | Comp_Frame[22] LS 8 bits VQ[14] |
| $VQ_{15}^7$ | $VQ_{15}^6$ | $VQ_{15}^5$ | $VQ_{15}^4$ | $VQ_{15}^3$ | $VQ_{15}^2$ | $VQ_{15}^1$ | $VQ_{15}^0$ | Comp_Frame[23] LS 8 bits VQ[15] | where BG = Beta/Gain, P = Pitch, VQ = CodeBook Index and S = Spare Bits

Code Book Descriptions

The code books used for the VQ algorithm described above are attached as Appendices A, B and C. Appendix A includes the code book data for the 8K algorithm, Appendix B includes the code book data for the 9.6K algorithm and Appendix C includes the code book data for the 16K algorithm. Table 19 describes the format of the code book for the 9.6K algorithm. The code book values in the appendices are stored in a signed floating point format which is converted to a Q22 value fixed point digital format when stored in the lookup tables of the present invention. There are 256 entries in each code book corresponding to 256 different speech segments which can be used to encode and reconstruct the speech.

TABLE 19

Code Book Format for the 9.6K Algorithm

| ----------Code Book Entries--------- | ---- ½ Sum² Constant---- |
|---|---|
| 8 entries | 1 entry |

TABLE 20

Code Book Example for the 9.6K Algorithm

| 0.786438 | 1.132875 | 1.208375 | 1.206750 | 1.114250 | 0.937688 | 0.772062 | 0.583250 | 3.93769 |
| 0.609667 | 1.019167 | 0.909167 | 0.957750 | 0.999833 | 0.854333 | 1.005667 | 0.911250 | 3.36278 |
| 0.614750 | 1.150750 | 1.477750 | 1.548750 | 1.434750 | 1.304250 | 1.349750 | 1.428250 | 6.95291 |
| 0.657000 | 1.132909 | 1.279909 | 1.204727 | 1.335636 | 1.280818 | 1.162000 | 0.958818 | 5.24933 |
| 0.592429 | 0.897571 | 1.101714 | 1.337286 | 1.323571 | 1.349000 | 1.304857 | 1.347143 | 5.6239 |
| 0.325909 | 0.774182 | 1.035727 | 1.263636 | 1.456455 | 1.356273 | 1.076273 | 0.872818 | 4.628 |

The code books are converted into Q22 format and stored in PROM memory accessible by the Voice DSP as a lookup table. The table data is loaded into local DSP memory upon the selection of the appropriate algorithm to increase access speed. The code books comprise a table of data in which each entry is a sequential address from 000 to 511. For the 9.6K algorithm, a 9×512 code book is used. For the 16K algorithm, a 9×512 code book is used and for the 8K algorithm, a 9×512 code book is used. Depending upon which voice compression quality and compression rate is selected, the corresponding code book is used to encode/decode the speech samples.

Generation of the Code Books

The code books are generated statistically by encoding a wide variety of speech patterns. The code books are generated in a learning mode for the above-described algorithm in which each speech segment which the compression algorithm is first exposed to is placed in the code book until 512 entries are recorded. Then the algorithm is continually fed a variety of speech patterns upon which the code book is adjusted. As new speech segments are encountered, the code book is searched to find the best match. If the error between the observed speech segment and the code book values exceed a predetermined threshold, then the closest speech segment in the code book and the new speech segment is averaged and the new average is placed in the code book in place of the closest match. In this learning mode, the code book is continually adjusted to have the lowest difference ratio between observed speech segment values and code book values. The learning mode of operation may take hours or days of exposure to different speech patterns to adjust the code books to the best fit.

The code books may be exposed to a single person's speech which will result in a code book being tailored to that particular persons method of speaking. For a mass market sale of this product, the speech patterns of a wide variety of speakers of both genders are exposed to the code book learning algorithm for the average fit for a given language. For other languages, it is best to expose the algorithm to speech patterns of only one language such as English or Japanese.

Voice Over Data Packet Protocol

As described above, the present system can transmit voice data and conventional data concurrently by using time multiplex technology. The digitized voice data, called V-data carries the speech information. The conventional data is referred to as C-data. The V-data and C-data multiplex transmission is achieved in two modes at two levels: the transmit and receive modes and data service level and multiplex control level. This operation is shown diagrammatically in FIG. 15.

In transmit mode, the main controller circuit 313 of FIG. 3 operates in the data service level 1505 to collect and buffer data from both the personal computer 10 (through the RS232 port interface 315) and the voice control DSP 306. In multiplex control level 1515, the main controller circuit 313 multiplexes the data and transmits that data out over the phone line 1523. In the receive mode, the main controller circuit 313 operates in the multiplex control level 1515 to de-multiplex the V-data packets and the C-data packets and then operates in the data service level 1505 to deliver the appropriate data packets to the correct destination: the personal computer 10 for the C-data packets or the voice control DSP circuit 306 for V-data.

Transmit Mode

In transmit mode, there are two data buffers, the V-data buffer 1511 and the C-data buffer 1513, implemented in the main controller RAM 316 and maintained by main controller 313. When the voice control DSP circuit 306 engages voice operation, it will send a block of V-data every 20 ms to the main controller circuit 313 through dual port RAM circuit 308. Each V-data block has one sign byte as a header and 23 bytes of V-data.

The sign byte header of the voice packet is transferred every frame from the voice control DSP to the controller 313. The sign byte header contains the sign byte which identifies the contents of the voice packet. The sign byte is defined as follows:

00 hex=the following V-data contains silent sound 01 hex=the following V-data contains speech information If the main controller 313 is in transmit mode for V-data/C-data multiplexing, the main controller circuit 313 operates at the data service level to perform the following tests. When the voice control DSP circuit 306 starts to send the 23-byte V-data packet through the dual port RAM to the main controller circuit 313, the main controller will check the V-data buffer to see if the buffer has room for 23 bytes. If there is sufficient room in the V-data buffer, the main controller will check the sign byte in the header preceding the V-data packet. If the sign byte is equal to one (indicating voice information in the packet), the main controller circuit 313 will put the following 23 bytes of V-data into the V-data buffer and clear the silence counter to zero. Then the main controller 313 sets a flag to request that the V-data be sent by the main controller at the multiplex control level.

If the sign byte is equal to zero (indicating silence in the V-data packet), the main controller circuit 313 will increase the silence counter by 1 and check if the silence counter has reached 5. When the silence counter reaches 5, the main controller circuit 313 will not put the following 23 bytes of V-data into the V-data buffer and will stop increasing the silence counter. By this method, the main controller circuit 313 operating at the service level will only provide non-silence V-data to the multiplex control level, while discarding silence V-data packets and preventing the V-data buffer from being overwritten.

The operation of the main controller circuit 313 in the multiplex control level is to multiplex the V-data and C-data packets and transmit them through the same channel. At this control level, both types of data packets are transmitted by the HDLC protocol in which data is transmitted in synchronous mode and checked by CRC error checking. If a V-data packet is received at the remote end with a bad CRC, it is discarded since 100% accuracy of the voice channel is not ensured. If the V-data packets were re-sent in the event of corruption, the real-time quality of the voice transmission would be lost. In addition, the C-data is transmitted following a modem data communication protocol such as CCITT V.42.

In order to identify the V-data block to assist the main controller circuit 313 to multiplex the packets for transmission at his level, and to assist the remote site in recognizing and de-multiplexing the data packets, a V-data block is defined which includes a maximum of five V-data packets. The V-data block size and the maximum number of blocks are defined as follows:

The V-data block header=80h;

The V-data block size=23;

The maximum V-data block size=5;

The V-data block has higher priority to be transmitted than C-data to ensure the integrity of the real-time voice transmission. Therefore, the main controller circuit 313 will check the V-data buffer first to determine whether it will transmit V-data or C-data blocks. If V-data buffer has V-data of more than 69 bytes, a transmit block counter is set to 5 and the main controller circuit 313 starts to transmit V-data from the V-data buffer through the data pump circuit 311 onto the telephone line. Since the transmit block counter indicates 5 blocks of V-data will be transmitted in a continuous stream, the transmission will stop either at finish the 115 bytes of V-data or if the V-data buffer is empty. If V-data buffer has V-data with number more than 23 bytes, the transmit block counter is set 1 and starts transmit V-data. This means that the main controller circuit will only transmit one block of V-data. If the V-data buffer has V-data with less than 23 bytes, the main controller circuit services the transmission of C-data.

During the transmission of a C-data block, the V-data buffer condition is checked before transmitting the first C-data byte. If the V-data buffer contains more than one V-data packet, the current transmission of the C-data block will be terminated in order to handle the V-data.

Receive Mode

On the receiving end of the telephone line, the main controller circuit 313 operates at the multiplex control level to de-multiplex received data to V-data and C-data. The type of block can be identified by checking the first byte of the incoming data blocks. Before receiving a block of V-data, the main controller circuit 313 will initialize a receive V-data byte counter, a backup pointer and a temporary V-data buffer pointer. The value of the receiver V-data byte counter is 23, the value of the receive block counter is 0 and the backup pointer is set to the same value as the V-data receive buffer pointer. If the received byte is not equal to 80 hex (80h indicating a V-data packet), the receive operation will follow the current modem protocol since the data block must contain C-data. If the received byte is equal to 80h, the main controller circuit 313 operating in receive mode will process the V-data.

For a V-data block received, when a byte of V-data is received, the byte of V-data is put into the V-data receive buffer, the temporary buffer pointer is increased by 1 and the receive V-data counter is decreased by 1. If the V-data counter is down to zero, the value of the temporary V-data buffer pointer is copied into the backup pointer buffer. The value of the total V-data counter is added with 23 and the receive V-data counter is reset to 23. The value of the receive block counter is increased by 1. A flag to request service of V-data is then set. If the receive block counter has reached 5, the main controller circuit 313 will not put the incoming V-data into the V-data receive buffer but throw it away. If the total V-data counter has reached its maximum value, the receiver will not put the incoming V-data into the V-data receive buffer but throw it away.

At the end of the block which is indicated by receipt of the CRC check bytes, the main controller circuit 313 operating in the multiplex control level will not check the result of the CRC but instead will check the value of the receive V-data counter. If the value is zero, the check is finished, otherwise the value of the backup pointer is copied back into the current V-data buffer pointer. By this method, the receiver is insured to de-multiplex the V-data from the receiving channel 23 bytes at a time. The main controller circuit 313 operating at the service level in the receive mode will monitor the flag of request service of V-data. If the flag is set, the main controller circuit 313 will get the V-data from the V-data buffer and transmit it to the voice control DSP circuit 306 at a rate of 23 bytes at a time. After sending a block of V-data, it decreases 23 from the value in the total V-data counter.

Negotiation of Voice Compression Rate

The modem hardware component 20 incorporates a modified packet protocol for negotiation of the speech compression rate. A modified supervisory packet is formatted using the same open flag, address, CRC, and closing flag formatting bytes which are found in the CCITT V.42 standard data supervisory packet, as is well known in the industry and as is described in the CCITT Blue Book, volume VIII entitled *Data Communication over the Telephone Network,* 1989 referenced above. In the modified packet protocol embodiment, the set of CCITT standard header bytes (control words) has been extended to include nonstandard control words used to signal transmission of a nonstandard communication command. The use of a nonstandard control word should cause no problems with other data communication terminals, for example, when communicating with a non-PCS modem system, since the nonstandard packet will be ignored by a non-PCS system.

Table 21 offers one embodiment of the present invention showing a modified supervisory packet structure. It should be noted that Table 21 does not depict the CCITT standard formatting bytes: open flag, address, CRC, and closing flag, but such bytes are inherent to using the CCITT standard. The modified supervisory packet is distinguished from a V.42 standard packet by using a nonstandard control word, such as 80 hex, as the header.

TABLE 21

| Modified Supervisory Packet Structure | | | | | | |
|---|---|---|---|---|---|---|
| 80h | ID | LI | ACK | data | data | data |

The modified supervisory packet is transmitted by the HDLC protocol in which data is transmitted in synchronous mode and checked by CRC error checking. The use of a modified supervisory packet eliminates the need for an escape command sent over the telephone line to interrupt data communications, providing an independent channel for negotiation of the compression rate. The channel may also be used as an alternative means for programming standard communications parameters.

The modified supervisory packet is encoded with different function codes to provide an independent communications channel between hardware components. This provides a means for real time negotiation and programming of the voice compression rate throughout the transmission of voice data and conventional data without the need for conventional escape routines. The modified supervisory packet is encoded with a function code using several methods. For example, in one embodiment, the function code is embedded in the packet as one of the data words and is located in a predetermined position. In an alternate embodiment, the supervisory packet header itself serves to indicate not only that the packet is a nonstandard supervisory packet but also the compression rate to be used between the sites. In such an embodiment, for example, a different nonreserved header is assigned to each function code. These embodiments are not limiting and other methods known to those skilled in the art may be employed to encode the function code into the modified supervisory packet.

Referring once again to FIG. 1, a system consisting of PCS modem 20 and data terminal 10 are connected via phone line 30 to a second PCS system comprised of PCS modem 20A and data terminal 10A. Therefore, calling modem 20 initializes communication with receiving modem 20A. In one embodiment of the present invention, a speech compression command is sent via a modified supervisory data packet as the request for speech compression algorithm and ratio negotiation. Encoded in the speech compression command is the particular speech compression algorithm and the speech compression ratio desired by the calling PCM modem 20. Several methods for encoding the speech compression algorithm and compression ratio exist. For example, in embodiments where the function is embedded in the header byte, the first data byte of the modified supervisory packet could be used to identify the speech compression algorithm using a binary coding scheme (e.g., 00h for Vector Quantization, 01h for CELP+, 02h for VCELP, and 03h for TrueSpeech, etc.). A second data byte could be used to encode the speech compression ratio (e.g., 00h for 9.5 KHz, 01h for 16 KHz, 02h for 8 KHz, etc.). This embodiment of the speech compression command supervisory packet is shown in Table 22.

TABLE 22

Speech Compression Command Supervisory Packet

| 80h | ID | LI | ACK | Algthm | CRatio | data |
|---|---|---|---|---|---|---|

Alternatively, as stated above, the function code could be stored in a predetermined position of one of the packet data bytes. It should be apparent that other function code encoding methods could be used. Again, these methods are given only for illustrative purposes and not limiting.

In either case, the receiving PCS modem 20A will recognize the speech compression command and will respond with an acknowledge packet using, for instance, a header byte such as hex 81. The acknowledge packet will alert the calling modem 20 that the speech compression algorithm and speech compression ratio selected are available by use of the ACK field of the supervisory packet shown in Table 22. Receipt of the acknowledge supervisory packet will cause the calling modem 20 to transmit all voice over data information according to the selected speech compression algorithm and compression ratio.

The frequency of which the speech compression command supervisory packet is transmitted will vary with the application. For moderate quality voice over data applications, the speech compression algorithm need only be negotiated at the initialization of the phone call. For applications requiring more fidelity, the speech compression command supervisory packet may be renegotiated during the call to accommodate new parties to the communication which have different speech compression algorithm limitations or to actively tune the speech compression ratio as the quality of the communications link fluctuates.

Therefore, those skilled in the art will recognize that other applications of the speech compression command supervisory packet may be employed which allow for varying transmission rates of the speech compression command supervisory packet and different and more elegant methods of speech compression algorithm and compression ratio negotiation, depending on the available hardware and particular application. Additionally, a number of encoding methods can be used to encode the supervisory packet speech compression algorithm and the speech compression ratio, and this method was demonstrated solely for illustrative purposes and is not limiting.

Of course a new supervisory packet may be allocated for use as a means for negotiating multiplexing scheme for the various types of information sent over the communications link. For example, if voice over data mode is employed, there exist several methods for multiplexing the voice and digital data. The multiplexing scheme may be selected by using a modified supervisory packet, called a multiplex supervisory packet, to negotiate the selection of multiplexing scheme.

Similarly, another supervisory packet could be designated for remote control of another hardware device. For example, to control the baud rate or data format of a remote modem, a remote control supervisory packet could be encoded with the necessary selection parameters needed to program the remote device.

Those skilled in the art will readily appreciate that there exist numerous other unidirectional and bidirectional communication and control applications in which the supervisory packet may be used. The examples given are not limiting, but are specific embodiments of the present invention offered for illustrative purposes.

Caller ID Interface Hardware

Figure 16:
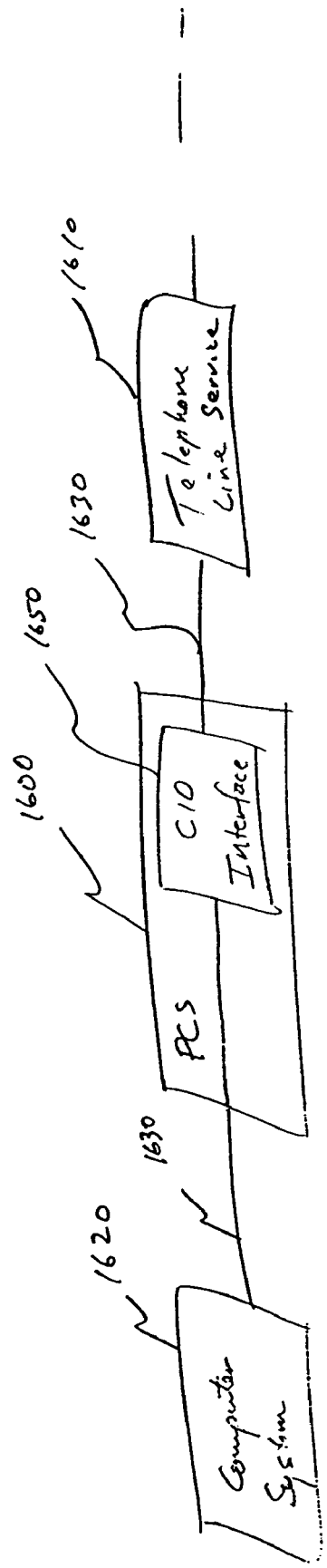
FIG. 16 is a general block diagram showing one embodiment of a caller ID interface for a personal communications system.

FIG. 16 shows one embodiment of the present invention in which a personal communications system (PCS) 1600 is the interface between a standard telephone line service 1610 and a computer system 1620 using telephone lines 1630. Caller ID interface ("CID interface") 1650 provides caller ID functionality to personal communications system 1600.

Figure 17A:
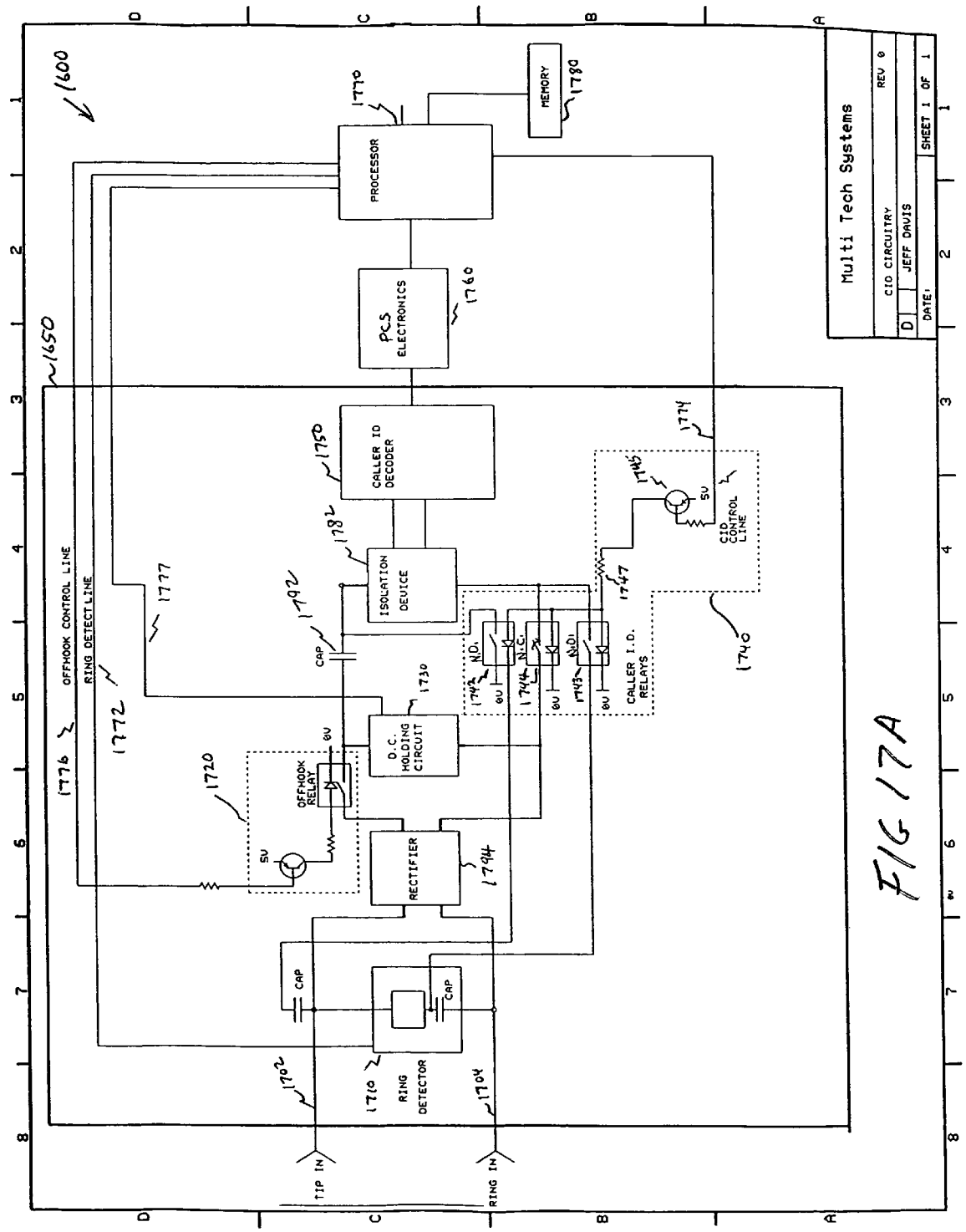
FIG. 17A is a schematic diagram of one embodiment of a caller ID interface for a personal communications system.

FIG. 17A shows one embodiment of the personal communications system 1600 with caller ID interface 1650 as shown in FIG. 16. Caller ID interface 1650 includes ring detector 1710, off-hook circuit 1720, DC holding circuit 1730, caller ID relays 1740, caller ID decoder 1750, processor 1770, and memory 1780. In this embodiment processor 1770 is the personal communications system processor and memory 1780 is a portion of memory in the personal communications system. Alternate embodiments may employ separate processors and memory for the interface without departing from the scope and spirit of the present invention.

Ring detector 1710 signals processor 1770 on signal line 1772 when an incoming call is received on telephone lines 1702 and 1704. Processor 1770 signals caller ID relays 1740 on signal line 1774 to decode the caller ID information as transmitted by the telephone company between the first and second telephone rings. Caller ID relays 1740 route signals on telephone lines 1702 and 1704 to caller ID decoder 1750 via isolation device 1782 when signal 1774 is pulled to a logic "0" state. When signal 1774 is logic low, transistor 1745 conducts and normally open optoisolated relays 1742 and 1743 close briefly while normally closed optoisolated relay 1744 opens. The switching period only needs to be long enough to receive the frequency shift keying caller ID transmissions between the first and second telephone rings. Rectifier 1794 ensures that the telephone line polarity to the dc holding circuit 1730 is consistent regardless of the polarity of the telephone service connections to lines 1702 and 1704.

An access matrix is preprogrammed into the interface memory 1780 which specifies the parameters associated with an authorized caller (Further details on the access matrix and screening modes are discussed below.) If the incoming caller ID information and the access matrix parameters indicate that the caller is authorized, then processor 1770 answers the telephone call by asserting a logic "0" on line 1776 and engaging the telephone current loop using signal 1777 to activate DC holding circuit 1730. When these circuits are activated caller ID relays 1740 are programmed to pass telephone signals 1732 and 1734 through caller ID decoder 1750 to personal communications system electronics 1760 for demodulation and data processing.

If the caller is not authorized access, the caller ID interface 1650 can hang up on the caller by momentarily taking the personal communications system off-hook and returning to on-hook by toggling signal line 1776. In this way, the caller ID interface can hang up on an unwanted caller without providing access to the caller.

Referring now to FIGS. 3, 7B, and 7C, in this embodiment of the present invention telephone line interface 309 includes the caller ID interface 1650 hardware as shown in FIG. 17. Therefore, personal communications system electronics 1760, processor 1770 and memory 1780 of FIG. 17 is amount to the hardware shown in FIG. 3 excluding telephone line interface 309. In this embodiment:

ring detector 1710 is optical isolator U32 (CNY17) and zener diodes CR1 and CR2 of FIG. 7C;

caller ID relays 1742, 1743, and 1744 are relays U30, U31, (of FIG. 7C) and U33 (of FIG. 7B), respectively;

caller ID decoder 1750 is chip set U34, U35, and U37 of FIGS. 8A and 8B (U34 is the interface chip 315, U35 is the Codec 311, and U37 is the DSP/Data Pump 311 as shown in FIG. 3);

dc holding circuit 1730 is CR9, R73, C71, CR20, CR26, R74, R75, R76, and transistors Q2 and Q3;

off hook circuit 1720 is optoisolated relay U29, transistor Q4, resistor R15, and resistor R69 of FIG. 7B;

processor 1770 is main controller 313, which is a Zilog Z80180 microprocessor, part number Z84C01 by Zilog, Inc. of Campbell, Calif.; and memory 1780 is the combination of RAM 316 and PEPROM 317. Isolation device 1782 electrically isolates the caller ID interface from the PCS electronics 1760. Isolation device 1782 is typically a transformer, however, alternate embodiments employ and optocoupler device. The detailed operation of this circuitry is discussed above in the section entitled: "Detailed Electrical Schematic Diagrams".

Figure 17B:
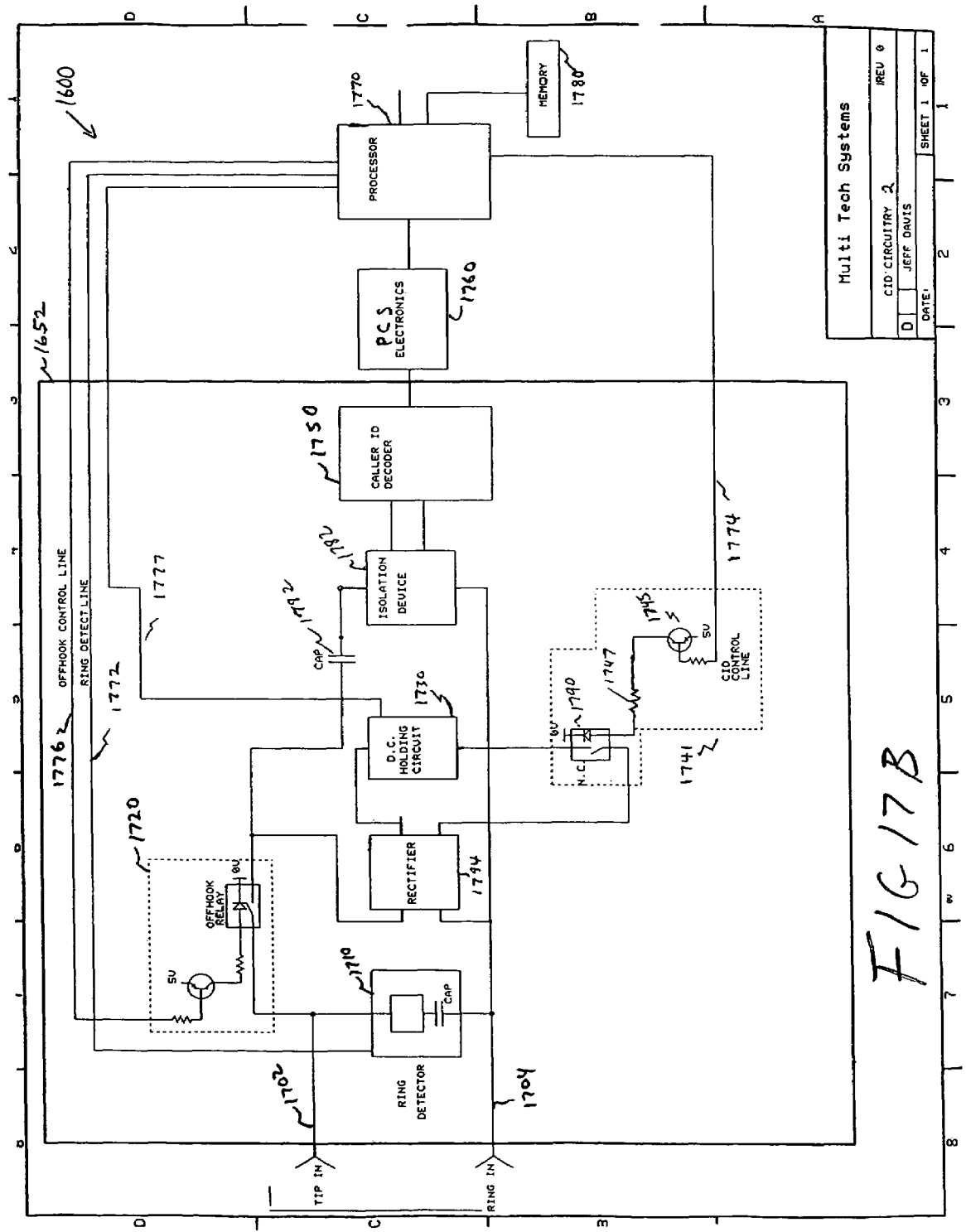
FIG. 17B is a schematic diagram of an alternate embodiment of a caller ID interface for a personal communications system.

An alternative embodiment of the caller ID interface 1652 is described in FIG. 17B. The operation of caller ID interface 1652, shown in FIG. 17B, is similar to the caller ID interface 1650 of FIG. 17A, however, the caller ID interface 1652 incorporates a single relay 1790 to activate dc holding circuit 1730 for purposes of answering the telephone call. The on-hook condition of caller ID interface 1652 is characterized by off-hook relay 1720 (normally open) being open and relay 1790 being open. The caller ID information from telephone lines 1702 and 1704 is decoded after the first ring by closing off-hook relay 1720 to pass the frequency shift keying caller ID signals through capacitor 1792 to caller ID decoder 1750. Therefore capacitor 1792 serves as a dc blocking element to create an ac path to caller ID decoder 1750. Closing off-hook relay 1720 connects the ac loop for frequency shift keying demodulation and decoding and the call is not answered as long as relay 1790 remains open. If the caller ID information indicates an authorized caller, then closing relay 1790 creates the off-hook condition for connecting the caller to the personal communications system 1600. If the caller ID information in conjunction with the access matrix indicates that the caller is unauthorized a quick hang up can be accomplished by briefly toggling relay 1790 and off-hook relay 1720 to answer the call and then hang up.

In yet another embodiment, caller ID decoder 1750 is the Mitel MT8841 Calling Number Identification Circuit as specified in the Mitel Microelectronics Digital/Analog Communications Handbook, Doc. No. 9161-952-007-NA, issue 9 (1993), which is hereby incorporated by reference. Processor 1770 is the Zilog Z182 Microprocessor as specified in the Z180 Family Microprocessors and Peripherals Databook, Doc No. Q2/94 DC 8322-00, which is hereby incorporated by reference.

Those skilled in the art will readily recognize that other caller ID decoders and processors may be used without departing from the scope and spirit of the present invention. Alternate embodiments use sophisticated, multifunction decoding devices and data pumps to perform the functions of caller ID decoder 1750. Additionally, processor 1770 may be replaced with combinational logic to control the operation of the caller ID interface. Finally, alternate relay switching embodiments may be constructed which do not depart from the scope and spirit of the present invention.

Caller ID Encoded Transmissions

Figure 18:
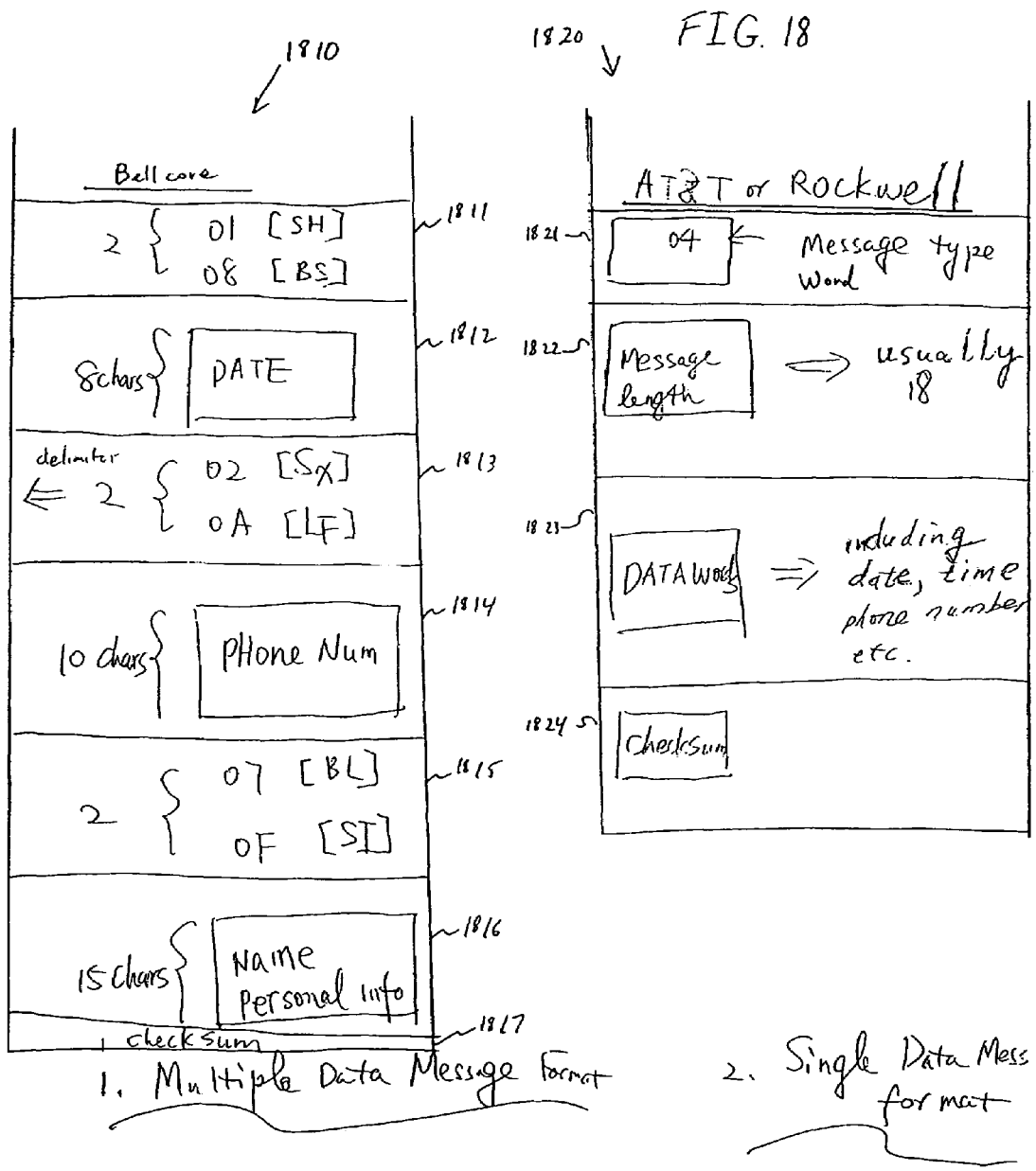
FIG. 18 is a block diagram showing the multiple data message format and single data message format used in standard caller ID encoded transmissions.

In standard telephone caller ID systems the caller ID information is transmitted between the first and second telephone ring. The caller ID information includes a message-type byte, a length byte, and data bytes consisting of date, time, telephone number with area code, telephone owner's name, and check sum byte and is sent using frequency shift keying between the first and second ring. Several industry protocols for caller ID are being developed by telecommunications vendors, including:

1. Bellcore's single data message frame format and multiple data message frame format as described in Bellcore Technical Reference TR-NWT-000030, Issue 2, October 1992, which is hereby incorporated by reference;
2. Rockwell's Calling Number Delivery (CND) as described in Rockwell Application Note, Document No. 29800N73, Order No. 873, October 1991, which is hereby incorporated by reference; and
3. AT&T's Caller ID as described in the AT&T Microelectronics Modem Designer's Guide, Jun. 3, 1993, Doc. MN92-026DMOS, which is hereby incorporated by reference. FIG. 18 summarizes the three caller ID protocols described above. The Bellcore multiple data message frame format 1810 is distinguished from the AT&T or Rockwell single data message frame format 1820 by examining the leading bytes 1811 (01H) and 1821 (04H).

Figure 19:
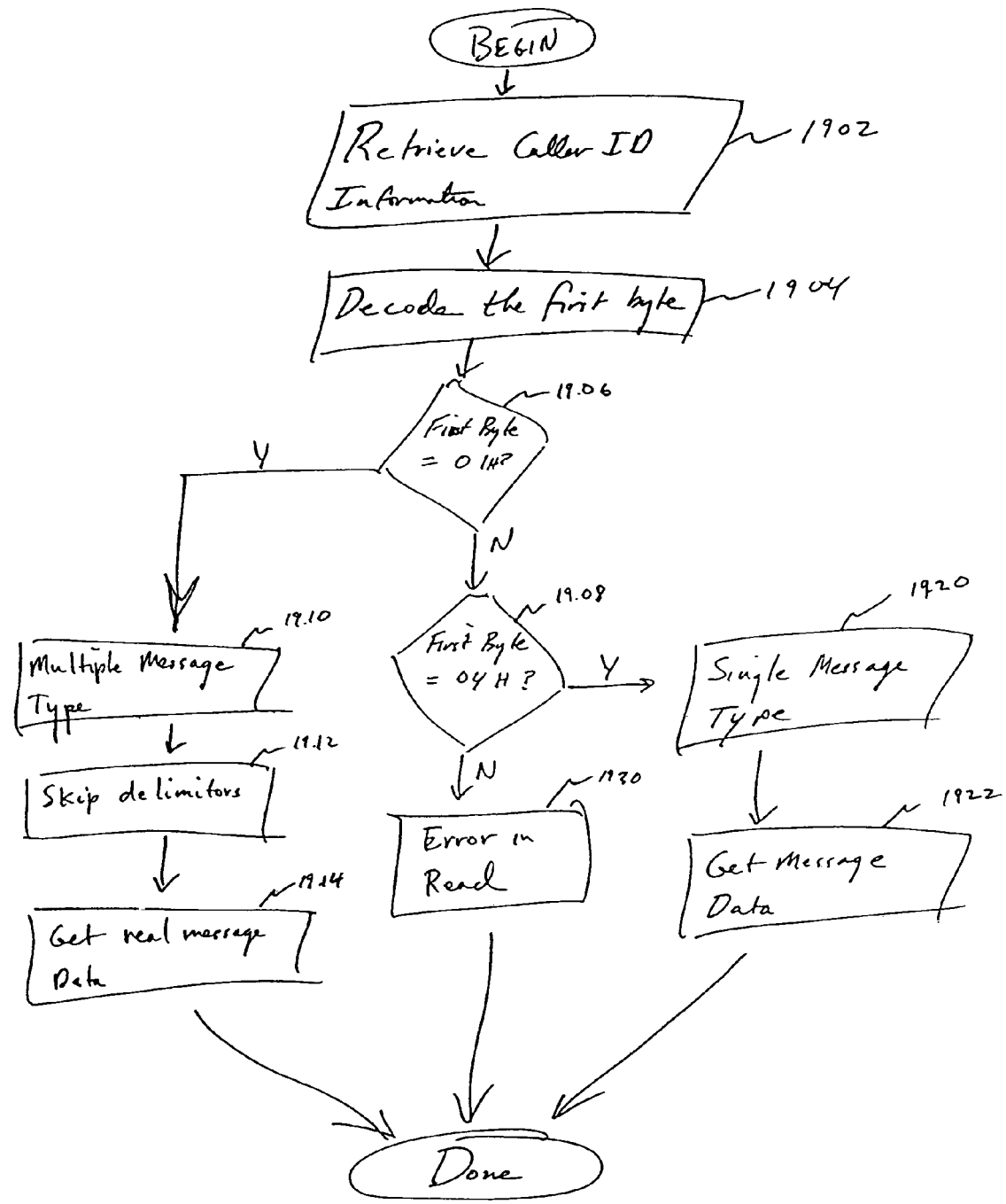
FIG. 19 is a flowchart showing one embodiment of a caller ID message format recognition scheme.

FIG. 19 shows an algorithm which distinguishes between the different protocols for proper decoding of the incoming caller ID information in one embodiment of the present invention. The caller ID information is retrieved from the caller ID decoding hardware 1902 and the first byte is decoded to determine the message type 1904. If the first byte is 01H (1906), then the caller ID protocol is the multiple data message format 1810 of FIG. 18 (1910) and the message data is read after skipping the delimiters (1912, 1914). If the first byte is 04H (1908) then the caller ID information is in the single data message format 1820 of FIG. 18 (1920) and the message data can be read directly (1922). If the first byte is neither 01H or 04H, then the caller ID information is being transmitted by another protocol or an error has been made in the decoding or transmission 1930. Since the above mentioned protocols are the most widely used, the present algorithm provides for automatic switching between formats to ensure that both formats are properly read.

Those skilled in the art would readily recognize that this method could be modified for accommodating future caller ID message protocols without departing from the scope and spirit of the present invention, and that the protocols presented were not intended in an exclusive or limiting sense.

Quick Hang Feature

In one embodiment of the present invention the quick hang feature allows the personal communications system to hang up immediately on an unwanted caller by placing the personal communications system off hook for a duration of one second (using off-hook circuit 1720), and then place the personal communications system back "on hook" again. The personal communications system is then ready to accept another call. This feature minimizes the amount of time an invalid user can tie up a phone line. Other durations are possible without departing from the spirit and scope of the present invention.

Time of Day Synchronization Using Caller ID

In one embodiment of the present invention time synchronization can be accomplished by using the decoded caller ID information which identifies the time of day to synchronize an on-board time-of-day clock.

Call Screening Using Caller ID Information

Figure 20:
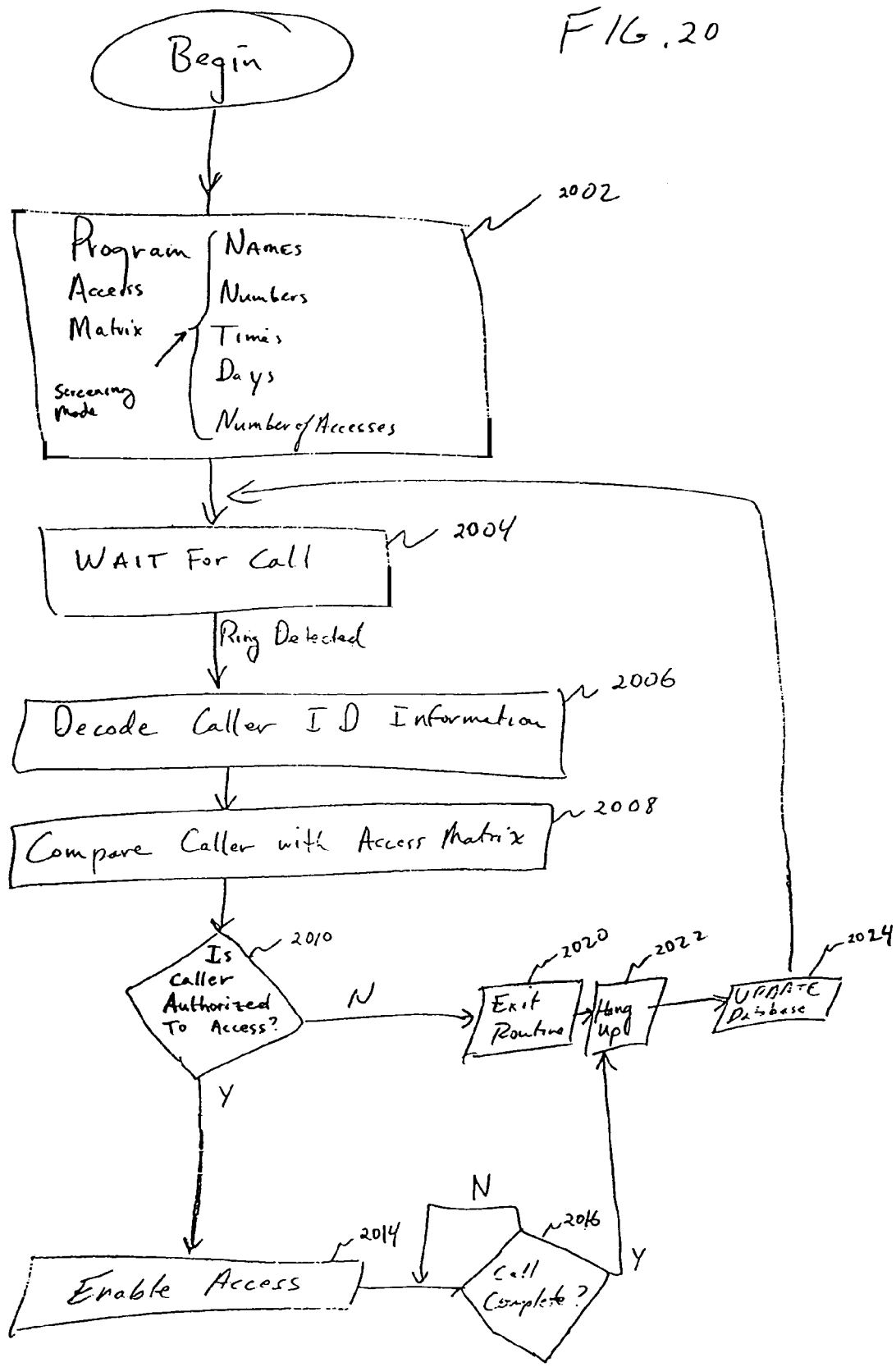
FIG. 20 is a flowchart of the general operation of one embodiment of the present invention.

The information available from decoding caller ID information allows the caller ID interface to screen users by a variety of parameters as specified in a preprogrammed access matrix. The flowchart shown in FIG. 20 describes the overall operation of the screening function. The program access matrix is programmed by specifying the screening mode and specifying the operative parameters to perform the screening, such as caller name, caller telephone number, time and day frames for receiving calls, and number of accesses (2002). In one embodiment of the present invention the receiving personal communications system operates in the following modes or combination of modes which will be described further in the "Screening Modes Using Caller ID" section below:

1. Number Only Mode;
2. Blacklist Mode;
3. Day Only Mode;
4. Time Only Mode;
5. Name Only Mode;
6. S Register 50 Mode; and
7. Hybrid Modes The caller ID interface then detects a ring 2004, decodes the caller ID information 2006, and compares the caller ID information with the access matrix (a function of the screening mode, as described below) 2008, and determines whether the caller is authorized to access the personal communications system 2010. If the caller is not authorized an exit routine is performed 2020 which may be a number of operations including, but not limited to, a friendly error message and a quick hang up 2022. If the personal communications system is compiling a database of callers, the database can be updated with the received caller ID information 2024 before waiting for another call 2004. If the caller is authorized, access is enabled 2014 and allowed until the call is terminated 2016. The hang up procedure 2022 is followed by an database update 2024 before returning to the wait state for another call 2004. The step of determining whether access is authorized 2010 is discussed in detail in the below section on Screening Modes.

Screening Modes Using Caller ID

The following modes are used in one embodiment of the present invention to control access to a personal communications system connected to the caller ID interface. The parameters of each mode become part of the preprogrammed access matrix. A number of examples will be offered following a brief description of the various modes of this embodiment:

Number Only Mode

In the number only mode, the personal communications system compares an incoming caller ID number to phone numbers on a "number only" list. Only incoming calls with numbers matching the phone numbers on the list will be answered. The number list is part of the access matrix which is preprogrammed into the caller ID interface memory.

Blacklist Mode

In the blacklist mode, the personal communications system compares an incoming caller ID number to a list of callers on a "blacklist." Any call which matches a phone number on the "blacklist" will be denied access to the device and the incoming call will be terminated immediately using a preprogrammed exit routine, such as the "quick-hang" feature described above. The blacklist and desired exit routine can be tailored depending on the particular blacklisted caller. For example, a BBS might want to quick hang up on a blacklisted abuser of the bulletin board, but only give a "late dues" message to a blacklisted user who is merely late in paying dues. The access matrix contains all of the blacklist parameters.

Day Only Mode

In the day only mode, the access matrix is programmed to authorize calls only on specific days.

Time Only Mode

In the time only mode, the personal communications system only answers calls during a certain preprogrammed times of the day and ignores calls outside of those specified times. For example, this feature enhances the security to a computer network provided by the present invention during non-business hours.

Name Only Mode

The name only mode authorizes access only to callers whose names are preprogrammed in a name table in the access matrix. This is a means for inclusively authorizing access to the personal communications system. (The blacklist mode is an exclusive means for authorizing access to the personal communications system.)

S Register 50 Mode

The S Register 50 mode provides a limited number of accesses by a particular user. The access matrix is preprogrammed with a predetermined number of calls allowed to a user before that user is black listed. This feature is especially useful for electronic bulletin board service operators because it allows them to screen out unwanted users as soon as the S Register number is reached. The S Register mode also allows for limiting the number of accesses made by a new user of the bulletin board, since in one embodiment of the present invention a new user can be assigned a position in the access matrix and subject to a maximum number of accesses, similar to the known users. This is known as a Temporary Blacklist mode, since after the predetermined number of accesses, the user is temporarily blacklisted until the access counter for that user is reset by the system administrator.

Hybrid Modes

Any combination of the above modes provides a specialized access matrix based on each listed user. For example, access authority can be given to Mr. X at only 6:00 to 7:00 p.m. by programming Mr. X's name and the access times as illustrated in the examples below.

SCREENING MODE EXAMPLES

Several access matrix examples for a BBS and their associated interpretations are described below for each entry in the table, according to one embodiment of the present invention.

TABLE 23

| BLACKLIST MODE | | | | |
|---|---|---|---|---|
| NUMBER | NAME | DAY/TIME | S50 | EXIT ROUTINE |
| (b) 333-3333 | (b) Mr. J | | | quick hang "Illegal Access" |

Table 23 shows two examples of the blacklist mode. Any caller from 333-3333 will receive a quick hang immediately on attempt to access the BBS personal communications system. Additionally, any time Mr. J attempts to call (from any of his phones), the message "Illegal Access" will be displayed prior to hang up by the BBS.

TABLE 24

NAME ONLY MODE

| NUMBER | NAME | DAY/TIME | S50 | EXIT ROUTINE |
|--------|------|----------|-----|--------------|
|        | Mr. Z |         |     |              |
|        | Ms. B |         |     |              |

Table 24 shows that only Mr. and Ms. B can access the BBS personal communications system, regardless of telephone number or day.

TABLE 25

NUMBER ONLY MODE

| NUMBER | NAME | DAY/TIME | S50 | EXIT ROUTINE |
|--------|------|----------|-----|--------------|
| 123-4567 |    |          |     |              |
| 676-8888 |    |          |     |              |

Table 25 shows that only callers from 123-4567 and 676-8888 can access the BBS personal communications system, regardless of name or time of day.

TABLE 26

TIME ONLY MODE

| NUMBER | NAME | DAY/TIME | S50 | EXIT ROUTINE |
|--------|------|----------|-----|--------------|
|        |      | /9-17    |     |              |

Table 26 shows that any caller between 9:00 a.m. and 5:00 p.m. can access the BBS personal communications system (24 hour time format used in this example).

TABLE 27

HYBRID MODES

| NUMBER   | NAME  | DAY/TIME        | S50 | EXIT ROUTINE |
|----------|-------|-----------------|-----|--------------|
| 333-3333 | Mr. A | M-W/6-13, 14-15 | 5   | quick hang   |
| 444-4444 | Ms. B | ALL/9-17        |     |              |
| 555-5555 |       | M-F/9-17        | 10  | "PAY DUES"   |
|          | Mr. C | M-W/            | 3   |              |

Table 27 provides four examples of access matrix entries. In the first line, Mr A. can access the BBS personal communications system from Monday to Wednesday and at the times of 6:00 a.m. to 1:00 p.m. and 2:00 p.m. to 3:00 p.m. Mr. A can only access the BBS personal communications system five (5) times before access is denied and the system administrator is notified. Mr. A will get a quick hang up on his sixth attempt to access the BBS personal communications system, and attempts thereafter, until his access register is reset by the system administrator.

Ms. B can access the BBS personal communications system all days of the week, but only between the hours of 9:00 a.m. to 5:00 p.m. Ms. B can access the BBS personal communications system an unlimited number of times.

Any caller from phone number 555-5555 can access the BBS personal communications system from Monday to Friday between the hours of 9:00 a.m. to 5:00 p.m. A "Pay Dues" message will be displayed to the user before a hang up on the eleventh attempt to access the BBS personal communications system, and subsequent attempted accesses. The system administrator must reset the access counter for future access authorization.

Mr. C can access the BBS personal communications system from any of his phone numbers, and can access at any time on Monday through Wednesday. After three accesses, Mr. C's exit routine will be whatever the default exit routine for the BBS happens to be.

The described screening modes are not limiting and not exclusive. One skilled in the art would readily recognize that other modes and variations of these modes are possible without departing from the scope and spirit of the present invention.

One Embodiment of the Screening Algorithm

The previously described screening modes are not exclusive or limiting to the present invention. Neither is the particular interaction of the screening modes. The following is only one embodiment of a screening algorithm offered to demonstrate the interaction between screening modes in one embodiment of the present invention.

Figure 21:
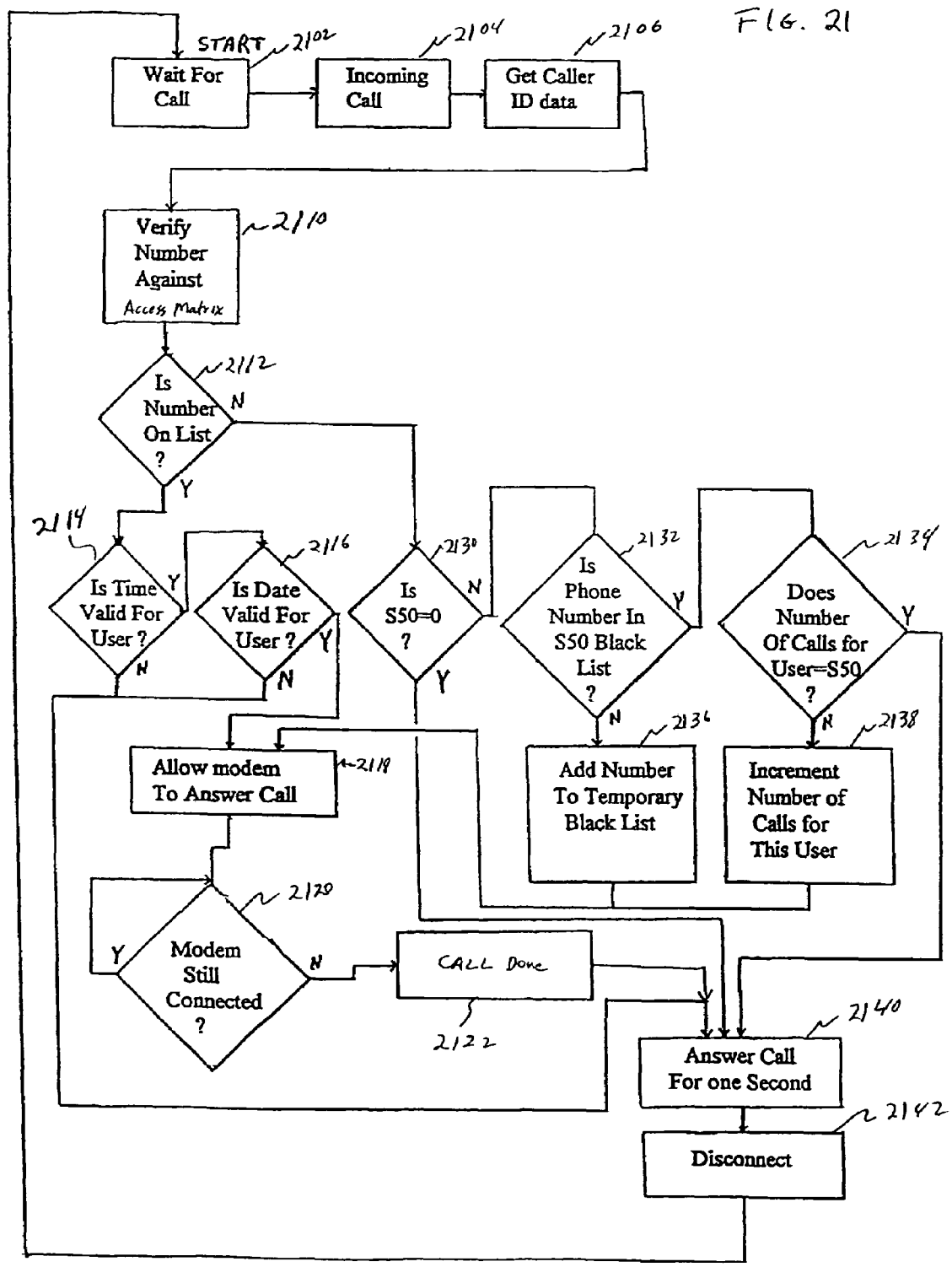
FIG. 21 is a flowchart showing one possible implementation of a screening mode algorithm.

FIG. 21 illustrates one embodiment of the authorization process using the above described screening modes. The caller ID interface waits for a call 2102, and gets the caller ID information upon detecting an incoming call 2104, 2106. The caller ID information is verified against the access matrix, in this example the caller's telephone number is verified 2110, 2112. If the number is on the list, then the time of day is verified 2114 and the date is verified 2116 before the personal communications system is allowed to answer the call 2118. The personal communications system is engaged in the call as long as it is connected 2120 and the call is complete after the connection is lost 2122. The personal communications system then quick hangs up 2140 and disconnects 2142 before waiting for the next call 2102. If the time of day or date is invalid the quick hang procedure is automatically initiated. If the telephone number is not on the number list 2110 the user's number of accesses is checked to ensure that the maximum is not exceeded 2130 and if the number is not on the temporary blacklist 2132 it is added 2136 prior to answering the call 2118. If the number is on the blacklist 2132, a separate S Register 50 for the blacklist is checked 2134 and quick hang is initiated 2140, 2142 if the maximum number of accesses is exceeded, else the register for this caller is incremented 2138 and the call answered 2118, 2120, and 2122. The quick hang procedure, 2140 and 2142, is again followed by waiting for the next call 2102.

CONCLUSION

The present invention was described in terms of a personal communications system interface, however, the methods and apparatus are applicable to a number of data exchange devices. For example, the present invention could be adapted to any system with caller identification information, including, but not limited to applications in the fiber superhighway and similar applications.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and equivalents thereof.

We claim:

1. A communication method comprising:
   providing a graphical user interface program executable on a personal computer with a modem, the modem operable for connection to a telephone line;
   providing a telephone line caller identification interface for use in determining whether a caller is permitted to have access to the modem, wherein providing the caller identification interface comprises:
     programming a memory device with access parameters;
     detecting a telephone call on the telephone line connected to the modem;
     receiving caller identification information without answering the telephone call;
     decoding the caller identification information; and
     comparing the caller identification information with the access parameters to determine whether the access is authorized or unauthorized;
   if access is authorized, allowing the modem to receive incoming packets using the modem communicated from at least one packet switched network, the incoming packets comprising at least compressed incoming digital voice information, wherein each of the incoming packets comprises at least one header, wherein the at least one header comprises information used to route the incoming packets within the communication apparatus, wherein allowing the modem to receive incoming packets further comprises:
     decompressing the compressed incoming digital voice information into incoming digital voice information;
     converting the incoming digital voice information to produce voice signals for conveyance to a local user; and
     conveying the voice signals to the local user;
   if access is unauthorized, placing the telephone line connected to the modem off hook and hanging up so as to prevent access to the modem.

2. The method of claim 1, wherein the step of programming further comprises the step of programming a list of names of authorized caller names.

3. The method of claim 1, wherein the step of programming further comprises the step of programming a list of authorized caller telephone numbers.

4. The method of claim 1, wherein the step of programming further comprises the step of programming a list of authorized times of day to call.

5. The method of claim 1, wherein the step of programming further comprises the step of programming a list of authorized days to call.

6. The method of claim 1, wherein the step of programming further comprise the step of programming a list of authorized caller names, days and times of day to call.

7. The method of claim 1, wherein the step of programming further comprises the step of programming a list of authorized caller telephone numbers, days and times of day to call.

8. The method of claim 1, wherein the step of programming further comprises the step of programming a list of unauthorized caller names.

9. The method of claim 1, wherein the step of programming further comprises the step of programming a list of unauthorized caller numbers.

10. The method of claim 1, wherein the incoming packets comprise incoming voice packets comprising compressed incoming digital voice information and incoming data packets comprising incoming digital data information, wherein each of the incoming voice packets comprises at least one header and wherein each of the incoming data packets comprises at least one header, and further wherein the headers of the incoming voice packets and the incoming data packets comprise information used to route the incoming packets.

* * * * *